US010321047B2

(12) United States Patent
Shinozaki et al.

(10) Patent No.: US 10,321,047 B2
(45) Date of Patent: Jun. 11, 2019

(54) IMAGING-SETTING DEVICE, IMAGING DEVICE, IMAGING SYSTEM, IMAGING-SETTING METHOD, AND NON-TRANSITORY COMPUTER READABLE RECORDING MEDIUM STORING PROGRAM

(71) Applicant: OLYMPUS CORPORATION, Hachioji-shi, Tokyo (JP)

(72) Inventors: Arata Shinozaki, Tokyo (JP); Kensuke Ishii, Tokyo (JP); Saori Matsumoto, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 132 days.

(21) Appl. No.: 15/374,598

(22) Filed: Dec. 9, 2016

(65) Prior Publication Data

US 2017/0094157 A1    Mar. 30, 2017

Related U.S. Application Data

(63) Continuation of application No. PCT/JP2015/063383, filed on May 8, 2015.

(30) Foreign Application Priority Data

Jun. 19, 2014   (JP) ................................ 2014-126664

(51) Int. Cl.
  *H04N 5/232*      (2006.01)
  *G03B 7/091*      (2006.01)
  (Continued)

(52) U.S. Cl.
  CPC .......... *H04N 5/23216* (2013.01); *G03B 7/04* (2013.01); *G03B 7/091* (2013.01); *H04N 5/225* (2013.01);
  (Continued)

(58) Field of Classification Search
  CPC .......... H04N 5/23216; H04N 5/23245; H04N 5/23293; G03B 7/04
  See application file for complete search history.

(56) References Cited

U.S. PATENT DOCUMENTS 9,019,414 B2 *   4/2015   Heo ...................... H04N 5/232
                                                      348/333.02
9,253,407 B2 *   2/2016   Heo ................... H04N 5/23216
                          (Continued)

FOREIGN PATENT DOCUMENTS

JP    2004-325818    * 11/2004
JP    2004-343662      12/2004
                (Continued)

OTHER PUBLICATIONS

International Search Report to corresponding International Patent Application No. PCT/JP2015/063383, dated Jul. 7, 2015 (2 pgs), with translation (2 pgs).

*Primary Examiner* — Lin Ye
*Assistant Examiner* — Chriss S Yoder, III
(74) *Attorney, Agent, or Firm* — John C. Pokotylo; Pokotylo Patent Services

(57) ABSTRACT

An imaging-setting device includes a generation unit that generates a first value of a first control parameter, an input unit that inputs a second value of a second control parameter different from the first control parameter, that changes in accordance with the first value set in an imaging device and first image data generated by the imaging device in which the first value is set from the imaging device, a calculation unit that calculates a first difference between the first value and a third value of the first control parameter and a second difference between the second value and a fourth value of the second control parameter, and a display unit that shows first difference information indicating the first difference and (Continued)

second difference information indicating the second difference, and displays an image based on the first image data.

39 Claims, 29 Drawing Sheets

(51) Int. Cl.
*H04N 5/225* (2006.01)
*H04N 5/235* (2006.01)
*G03B 7/04* (2006.01)

(52) U.S. Cl.
CPC ........... *H04N 5/235* (2013.01); *H04N 5/2351* (2013.01); *H04N 5/2352* (2013.01); *H04N 5/23245* (2013.01); *H04N 5/23293* (2013.01)

(56) References Cited

U.S. PATENT DOCUMENTS

| | | | |
|---|---|---|---|
| 2006/0238625 | A1 | 10/2006 | Sasaki et al. |
| 2009/0276731 | A1* | 11/2009 | Yamakawa ......... G06F 3/04847 |
| | | | 715/833 |
| 2011/0050923 | A1* | 3/2011 | Nomura ................. G03B 7/097 |
| | | | 348/208.99 |

FOREIGN PATENT DOCUMENTS

| | | |
|---|---|---|
| JP | 2005-064782 | 3/2005 |
| JP | 2009-225237 | 10/2009 |
| JP | 2010-118882 | 5/2010 |
| JP | 2012-109866 | 6/2012 |

* cited by examiner

IMAGING-SETTING DEVICE, IMAGING DEVICE, IMAGING SYSTEM, IMAGING-SETTING METHOD, AND NON-TRANSITORY COMPUTER READABLE RECORDING MEDIUM STORING PROGRAM

This application is a continuation application based on a PCT International Application No. PCT/JP2015/063383, filed on May 8, 2015, whose priority is claimed on Japanese Patent Application No. 2014-126664, filed on Jun. 19, 2014. The contents of both the PCT International Application and the Japanese Patent Application are incorporated herein by reference.

BACKGROUND OF THE INVENTION

Field of the Invention

The present invention relates to a technology for setting control parameters for controlling imaging.

Description of Related Art

A technology for making it possible to recognize a state of an imaging device is disclosed. For example, Japanese Unexamined Patent Application, First Publication No. 2005-64782 discloses a technology that makes it possible to recognize whether exposure of an area of interest in an image is appropriate. In the technology disclosed in Japanese Unexamined Patent Application, First Publication No. 2005-64782, a reference exposure level is calculated from image information of a first area in an image, and an exposure level of a comparison target is calculated from image information of a second area in the image. Further, a difference between the reference exposure level and the exposure level of the comparison target is calculated, and difference information indicating the calculated difference is displayed.

In the technology disclosed in Japanese Unexamined Patent Application, First Publication No. 2005-64782, it is possible to recognize a state of one control parameter regarding exposure among a plurality of control parameters for controlling imaging.

SUMMARY OF THE INVENTION

According to a first aspect of the present invention, an imaging-setting device includes a generation unit which is configured to generate a first value of a first control parameter among a plurality of control parameters for controlling imaging; an output unit which is configured to output the first value to an imaging device; an input unit which is configured to input a second value of a second control parameter different from the first control parameter, the second value being a control parameter among the plurality of control parameters and changing in accordance with the first value set in an imaging unit of the imaging device, and first image data generated by the imaging unit when the first value is set in the imaging unit, from the imaging device; a storage unit which is configured to a third value of the first control parameter and a fourth value of the second control parameter; a calculation unit which is configured to calculate a first difference between the first value and the third value and a second difference between the second value and the fourth value; and a display unit which is configured to show first difference information indicating the first difference and second difference information indicating the second difference, and displays an image based on the first image data.

According to a second aspect of the present invention, in the imaging-setting device according to the first aspect, the input unit may input the third value, which is a value of the first control parameter set in the imaging unit before the first value is set in the imaging unit, and the fourth value, which is a value of the second control parameter set in the imaging unit before the second value is set in the imaging unit, from the imaging device. The storage unit may store the third value and the fourth value input by the input unit.

According to a third aspect of the present invention, in the imaging-setting device according to the second aspect, the input unit may further input second image data generated by the imaging unit when the third value is set in the imaging unit from the imaging device. The display unit may further display an image based on the second image data.

According to a fourth aspect of the present invention, in the imaging-setting device according to the third aspect, the input unit may input a plurality of second image data including a moving image or one item of second image data including a still image from the imaging device. The display unit may display the moving image based on the plurality of second image data or display the still image based on the one item of the second image data.

According to a fifth aspect of the present invention, in the imaging-setting device according to the first aspect, the input unit may further input a third value that is a recommended value recommended as a value of the first control parameter from the imaging device. The storage unit may store the third value input by the input unit, and the fourth value.

According to a sixth aspect of the present invention, the imaging-setting device according to the first aspect, the storage unit may store the third value and the fourth value, the fourth value being a recommended value that is recommended as a value of the second control parameter, or a set value of the second control parameter set in the imaging unit before the second value is set in the imaging unit.

According to a seventh aspect of the present invention, in the imaging-setting device according to the sixth aspect, any one mode among a plurality of modes may be set in the imaging unit, and the one mode set in the imaging unit may be capable of being switched to another mode different from the one mode among the plurality of modes. The plurality of modes may have at least one of an aperture priority mode in which the first control parameter is an aperture and the second control parameter is shutter speed, and a shutter speed priority mode in which the first control parameter is the shutter speed and the second control parameter is the aperture, and a manual mode in which the first control parameter is the aperture and the shutter speed and the second control parameter is exposure. The storage unit may store the fourth value that is the recommended value when the mode of the imaging unit is set to the manual mode.

According to an eighth aspect of the present invention, in the imaging-setting device according to the sixth aspect, the display unit may show the first difference information in a first area, shows the second difference information in a second area different from the first area, which is displayed in a first display form, when the fourth value is the recommended value, show the second difference information in the second area displayed in a second display form different from the first display form when the fourth value is the set value, and display the image.

According to a ninth aspect of the present invention, in the imaging-setting device according to the sixth aspect, the display unit may show the first difference information, shows the second difference information in a first display form when the fourth value is the recommended value, show the second difference information in a second display form different from the first display form when the fourth value is the set value, and display the image.

According to a tenth aspect of the present invention, in the imaging-setting device according to the first aspect, the storage unit may associate and store second image data generated by the imaging unit, the third value, and the fourth value, when the third value and the fourth value are set in the imaging unit.

According to an eleventh aspect of the present invention, in the imaging-setting device according to the tenth aspect, the display unit may further display an image based on the second image data.

According to a twelfth aspect of the present invention, in the imaging-setting device according to the first aspect, the input unit may input the second value and a plurality of first image data including a moving image, which is generated by the imaging unit when the first value is set in the imaging unit, from the imaging device. The display unit may show the first difference information and the second difference information, and display the moving image based on the plurality of first image data.

According to a thirteenth aspect of the present invention, in the imaging-setting device according to the first aspect, the display unit may show the first difference information in a first area, show the second difference information in a second area having a different display form from the first area, and display the image.

According to a fourteenth aspect of the present invention, in the imaging-setting device according to the thirteenth aspect, the display unit may further display the first area and the second area such that the first area is relatively more prominent than the second area.

According to a fifteenth aspect of the present invention, in the imaging-setting device according to the first aspect, the display unit may show the first difference information in a first display form, show the second difference information in a second display form different from the first display form, and display the image.

According to a sixteenth aspect of the present invention, in the imaging-setting device according to the fifteenth aspect, the display unit may further show the first difference information in the first display form and show the second difference information in the second display form so that the first difference information is relatively more prominent than the second difference information.

According to a seventeenth aspect of the present invention, in the imaging-setting device according to the first aspect, the input unit may input a second value of each of a plurality of second control parameters among the plurality of control parameters and the first image data generated by the imaging unit when the first value is set in the imaging unit from the imaging device. The storage unit may further store a fourth value of each of the plurality of second control parameters. The display unit may show the first difference information, show, second difference information of a second control parameter in which the second difference is relatively greater among the plurality of second control parameters in a first area, show second difference information of a second control parameter in which the second difference is a relatively smaller in a second area having a display form different from that of the first area, and display the image.

According to an eighteenth aspect of the present invention, in the imaging-setting device according to the seventeenth aspect, the display unit may further highlight the first area relative to the second area.

According to a nineteenth aspect of the present invention, in the imaging-setting device according to the first aspect, the input unit may input a second value of each of a plurality of second control parameters among the plurality of control parameters and the first image data generated by the imaging unit when the first value is set in the imaging unit from the imaging device. The storage unit may further store a fourth value of each of the plurality of second control parameters. The display unit may show the first difference information, show second difference information of a second control parameter in which the second difference is relatively greater among the plurality of second control parameters in a first display form, show second difference information of a second control parameter in which the second difference is a relatively smaller in a second display form different from the first display form, and display the image.

According to a twentieth aspect of the present invention, in the imaging-setting device according to the nineteenth aspect, the display unit may highlight the second difference information of the second control parameter of which the second difference is relatively greater among the plurality of second control parameters relative to the second difference information of the second control parameter of which the second difference is relatively smaller.

According to a twenty-first aspect of the present invention, in the imaging-setting device according to the first aspect, the input unit may further input a fifth value of a third control parameter different from the first control parameter among the plurality of control parameters from the imaging device. The storage unit may further store a sixth value of the third control parameter. The calculation unit may further calculate a third difference between the fifth value and the sixth value. The display unit may show only the first difference information and the second difference information among the first difference information, the second difference information, and the fifth value when the third difference is 0, and display the image.

According to a twenty-second aspect of the present invention, in the imaging-setting device according to the first aspect, the input unit may further input a fifth value of a third control parameter different from the first control parameter among the plurality of control parameters from the imaging device. The storage unit may further store a sixth value of the third control parameter. The calculation unit may further calculate a third difference between the fifth value and the sixth value. The display unit may show the fifth value when the third difference is 0.

According to a twenty-third aspect of the present invention, in the imaging-setting device according to the twenty-first aspect, any one mode among a plurality of modes may be set in the imaging unit, and the one mode set in the imaging unit may be able to be switched to a mode different from the one mode among the plurality of modes. The third control parameter may be determined to correspond to the one mode set in the imaging unit.

According to a twenty-fourth aspect of the present invention, in the imaging-setting device according to the twenty-third aspect, the plurality of modes may include at least one of an aperture priority mode in which the first control parameter is an aperture and the second control parameter is shutter speed, and a shutter speed priority mode in which the first control parameter is the shutter speed and the second control parameter is the aperture, and a manual mode in which the first control parameter is the aperture and the shutter speed and the second control parameter is exposure.

According to a twenty-fifth aspect of the present invention, in the imaging-setting device according to the twenty-second aspect, any one mode among a plurality of modes may be set in the imaging unit, and the one mode set in the imaging unit may be able to be switched to a mode different from the one mode among the plurality of modes. The third control parameter may be determined to correspond to the one mode set in the imaging unit.

According to a twenty-sixth aspect of the present invention, in the imaging-setting device according to the twenty-fifth aspect, the plurality of modes may include at least one of an aperture priority mode in which the first control parameter is an aperture and the second control parameter is shutter speed, and a shutter speed priority mode in which the first control parameter is the shutter speed and the second control parameter is the aperture, and a manual mode in which the first control parameter is the aperture and the shutter speed and the second control parameter is exposure.

According to a twenty-seventh aspect of the present invention, in the imaging-setting device according to the first aspect, any one mode among a plurality of modes may be set in the imaging unit, and the one mode set in the imaging unit may be able to be switched to a mode different from the one mode among the plurality of modes. The generation unit may generate a first value of the first control parameter that is determined to correspond to the one mode set in the imaging unit among the plurality of control parameters.

According to a twenty-eighth aspect of the present invention, in the imaging-setting device according to the twenty-fifth aspect, the plurality of modes may include at least two of a manual mode in which the first control parameter is an aperture and shutter speed and the second control parameter is exposure; an aperture priority mode in which the first control parameter is the aperture and the second control parameter is the shutter speed; a shutter speed priority mode in which the first control parameter is the shutter speed and the second control parameter is the aperture; and a program mode in which the first control parameter is the exposure and the second control parameter is the aperture and the shutter speed.

According to a twenty-ninth aspect of the present invention, in the imaging-setting device according to the first aspect, the input unit may input a second value of each of a plurality of second control parameters and the first image data from the imaging device. The storage unit may further store a fourth value of each of the plurality of second control parameters, and the display unit may show the first difference information, show only second difference information of which the second difference exceeds a predetermined amount among the plurality of second control parameters, and display the image.

According to a thirtieth aspect of the present invention, in the imaging-setting device according to the first aspect, the display unit may further fix a relative relationship between a position at which the first difference information is displayed and a position at which the second difference information is displayed.

According to a thirty-first aspect of the present invention, in the imaging-setting device according to the first aspect, the display unit further may fix a relative relationship between positions at which the first difference information and the second difference information of the plurality of control parameters are displayed among the plurality of control parameters.

According to a thirty-second aspect of the present invention, in the imaging-setting device according to the first aspect, the input unit may input a second value of each of a plurality of second control parameters and the first image data from the imaging device. The storage unit may further store a fourth value of each of the plurality of second control parameters. The display unit may fix a relative relationship between a position at which second difference information of a second control parameter of which the second difference is relatively greater among the plurality of second control parameters is displayed and a position at which second difference information of a second control parameter of which the second difference is relatively smaller among the plurality of second control parameters is displayed, and display the image.

According to a thirty-third aspect of the present invention, in the imaging-setting device according to the first aspect, the first control parameter may be a parameter regarding exposure.

According to a thirty-fourth aspect of the present invention, in the imaging-setting device according to the first aspect, the display unit may further display a numerical value indicating the first value or a numerical value indicating the second value.

According to a thirty-fifth aspect of the present invention, an imaging device includes an imaging unit that performs imaging and generates image data; a generation unit that generates a first value of a first control parameter among a plurality of control parameters for controlling imaging; a setting unit that sets, in the imaging unit, the first value and a second value of a second control parameter different from the first control parameter among the plurality of control parameters, wherein the second value changes in accordance with the first value set in the imaging unit; a storage unit that stores a third value of the first control parameter and a fourth value of the second control parameter; a calculation unit that calculates a first difference between the first value and the third value and a second difference between the second value and the fourth value; and a display unit that shows first difference information indicating the first difference and second difference information indicating the second difference, and displays an image when the first value is set in the imaging unit, the image being based on image data generated by the imaging unit when the first value is set in the imaging unit.

According to a thirty-sixth aspect of the present invention, an imaging system includes an imaging-setting device and an imaging device. The imaging-setting device may include a generation unit that generates a first value of a first control parameter among a plurality of control parameters for controlling imaging; a first output unit that outputs the first value to the imaging device; a first input unit that inputs a second value of a second control parameter different from the first control parameter among the plurality of control parameters, the second value changing in accordance with the first value set in the imaging unit of the imaging device, and image data generated by the imaging unit when the first value is set in the imaging unit from the imaging device; a storage unit that stores a third value of the first control parameter and a fourth value of the second control parameter; a calculation unit that calculates a first difference between the first value and the third value and a second difference between the second value and the fourth value; and a display unit that shows first difference information indicating the first difference and second difference information indicating the second difference, and displays an image based on the image data, and the imaging device includes the imaging unit that performs imaging to generate image data; a second input unit that inputs the first value from the imaging-setting device; a setting unit that sets the first value and the second value in the imaging unit; and a second output unit that outputs the second value and the image data to the imaging-setting device.

According to a thirty-seventh aspect of the present invention, an imaging-setting method includes a generation step in which a generation unit generates a first value of a first control parameter among a plurality of control parameters for controlling imaging; an output step in which an output unit outputs the first value to an imaging device; a first input step in which an input unit inputs a second value of a second control parameter different from the first control parameter among the plurality of control parameters from the imaging device, wherein the second value changes in accordance with the first value set in an imaging unit of the imaging device; a second input step in which the input unit inputs image data generated by the imaging unit when the first value is set in the imaging unit from the imaging device; a calculation step in which a calculation unit calculates a first difference between the first value and a third value of the first control parameter and a second difference between the second value and a fourth value of the second control parameter; a first display step in which a display unit shows first difference information indicating the first difference and second difference information indicating the second difference; and a second display step in which the display unit displays an image based on the image data.

According to a thirty-eighth aspect of the present invention, an imaging-setting method includes a generation step in which a generation unit generates a first value of a first control parameter among a plurality of control parameters for controlling imaging; a setting step in which a setting unit sets, in an imaging unit, the first value and a second value of a second control parameter different from the first control parameter among the plurality of control parameters, wherein the second value changes in accordance with the first value set in the imaging unit; a calculation step in which a calculation unit calculates a first difference between the first value and a third value of the first control parameter and a second difference between the second value and a fourth value of the second control parameter; a first display step in which a display unit shows first difference information indicating the first difference and second difference information indicating the second difference; and a second display step in which the display unit displays an image when the first value is set in the imaging unit, the image being based on image data generated by the imaging unit when the first value is set in the imaging unit.

According to a thirty-ninth aspect of the present invention, a non-transitory computer readable recording medium storing a program causes a computer to execute: a generation step of generating a first value of a first control parameter among a plurality of control parameters for controlling imaging; an output step of outputting the first value to an imaging device by an output unit; a first input step of receiving, by an input unit, a second value of a second control parameter different from the first control parameter among the plurality of control parameters from the imaging device, wherein the second value changes in accordance with the first value set in the imaging unit of the imaging device; a second input step of receiving, by the input unit, image data generated by the imaging unit when the first value is set in the imaging unit from the imaging device; a calculation step of calculating a first difference between the first value and a third value of the first control parameter and a second difference between the second value and a fourth value of the second control parameter; a first display step of showing, by a display unit, first difference information indicating the first difference and second difference information indicating the second difference; and a second display step of displaying, by the display unit, an image based on the image data.

According to a fortieth aspect of the present invention, a non-transitory computer readable recording medium storing a program causes a computer to execute a generation step of generating a first value of a first control parameter among a plurality of control parameters for controlling imaging; a setting step of setting, in an imaging unit, the first value and a second value of a second control parameter different from the first control parameter among the plurality of control parameters, wherein the second value changes in accordance with the first value set in the imaging unit; a calculation step of calculating a first difference between the first value and a third value of the first control parameter and a second difference between the second value and a fourth value of the second control parameter; a first display step of showing first difference information indicating the first difference and second difference information indicating the second difference using a display unit; and a second display step of displaying an image when the first value is set in the imaging unit, the image being based on image data generated by the imaging unit when the first value is set in the imaging unit using the display unit.

DETAILED DESCRIPTION OF THE INVENTION

Hereinafter, embodiments of the present invention will be described with reference to the accompanying drawings.

First Embodiment

Figure 1:
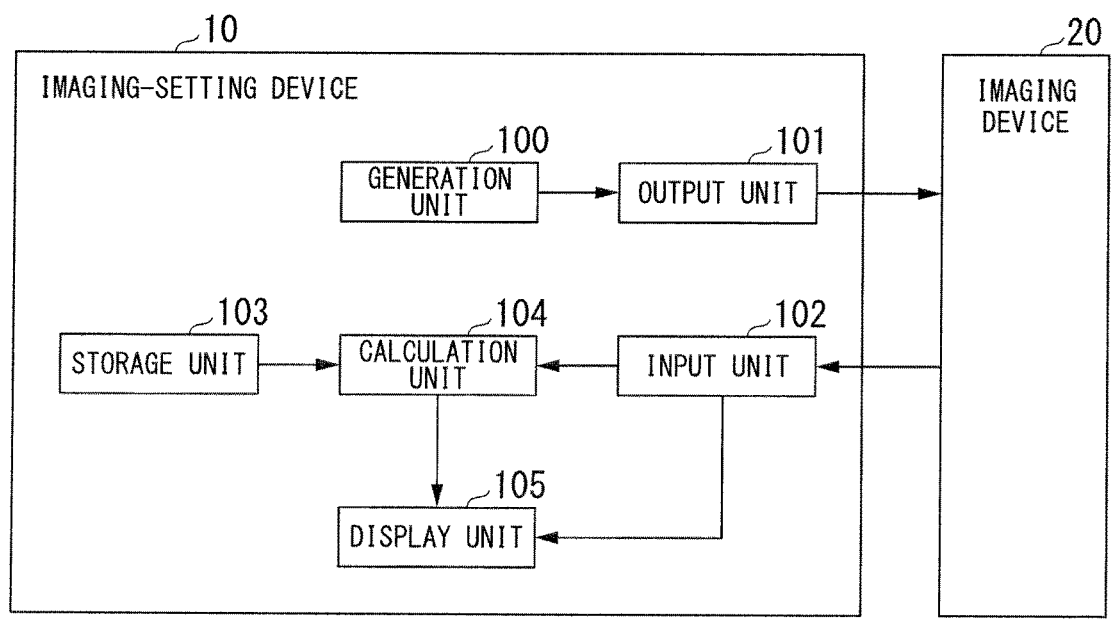
FIG. 1 is a block diagram showing a configuration of an imaging-setting device according to a first embodiment of the present invention.

First, a first embodiment of the present invention will be described. FIG. 1 shows a configuration of an imaging-setting device 10 according to this embodiment. As shown in FIG. 1, the imaging-setting device 10 includes a generation unit 100, an output unit 101, an input unit 102, a storage unit 103, a calculation unit 104, and a display unit 105.

The generation unit 100 generates a first value of a first control parameter among a plurality of control parameters for controlling imaging. The output unit 101 outputs the first value to the imaging device 20. The input unit 102 inputs a second value of a second control parameter different from the first control parameter among the plurality of control parameters and first image data generated by an imaging unit when the first value is set in the imaging unit of the imaging device 20 from the imaging device 20. The second value changes in accordance with the first value set in the imaging unit. Further, the input unit 102 inputs the first image data generated by the imaging unit when the first value is set in the imaging unit from the imaging device 20.

The storage unit 103 stores a third value of the first control parameter and a fourth value of the second control parameter. The calculation unit 104 calculates a first difference between the first value and the third value, and a second difference between the second value and the fourth value. The display unit 105 shows first difference information indicating the first difference and second difference information indicating the second difference. Further, the display unit 105 displays an image based on the first image data.

For example, functions of the generation unit 100 and the calculation unit 104 can be realized as software functions by a computer of the imaging-setting device 10 reading and executing a program including instructions for defining operations thereof. Further, this program may be provided by, for example, a "computer-readable recording medium" such as a flash memory. Further, the above-described program may be input to the imaging-setting device 10 by being transferred from a computer in which this program is stored in a storage device or the like to the imaging-setting device 10 via a transmission medium or by transfer waves in a transfer medium. Here, the "transmission medium" for transmitting the program is a medium having a function of transferring information, such as a network (a communication network) such as the Internet or a communication line such as a telephone line. Further, the above-described program may realize some of the above-described functions. Further, the above-described program may be a so-called differential file (a differential program) that can realize the above-described functions in combination with a program pre-recorded in a computer.

Figure 2:
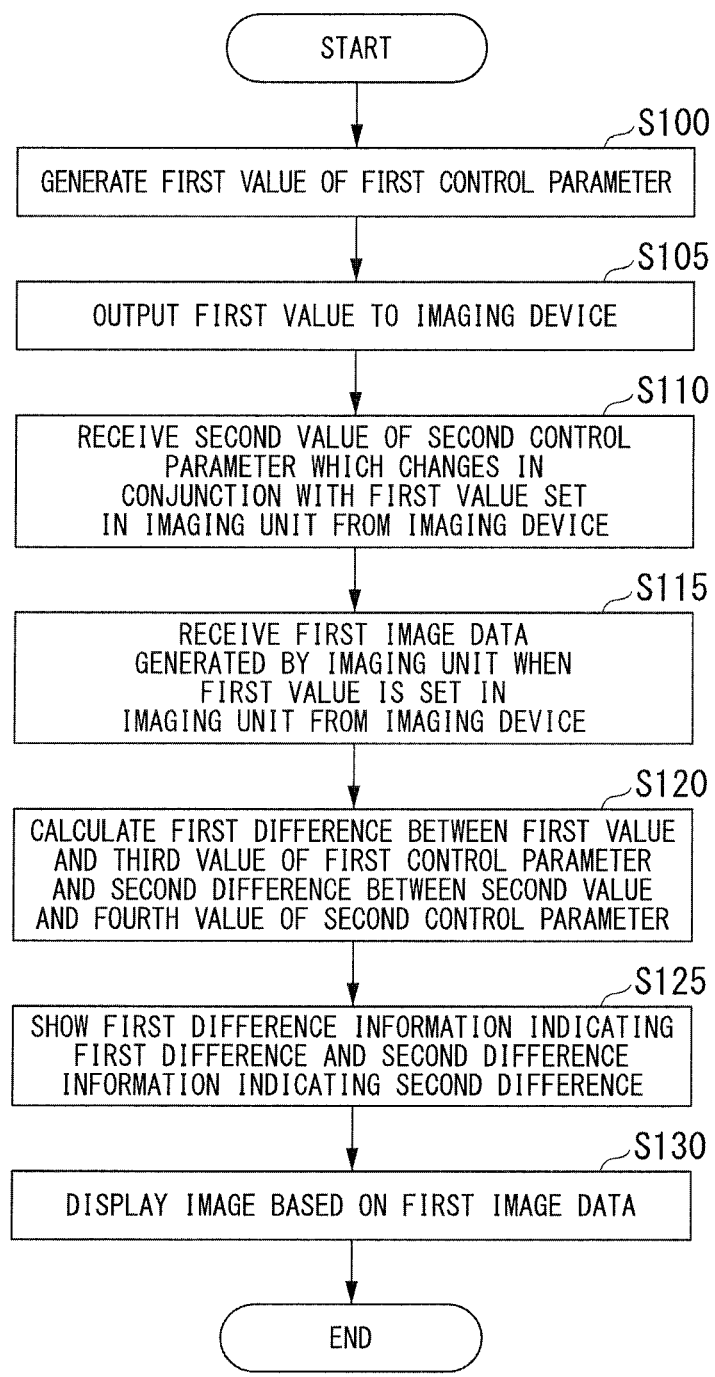
FIG. 2 is a flowchart showing a procedure of an operation of the imaging-setting device according to the first embodiment of the present invention.

Next, an operation of the imaging-setting device 10 will be described with reference to FIG. 2. FIG. 2 shows a procedure of an operation of the imaging-setting device 10 regarding a setting of control parameters.

When the operation regarding a setting of control parameters is started, the generation unit 100 generates a first value of a first control parameter among a plurality of control parameters for controlling imaging (step S100). The first control parameter is a control parameter of which a value is set by a user. For example, the first control parameter is a parameter regarding exposure. For example, in an aperture priority mode in which a value of shutter speed is set so that the exposure is appropriate in accordance with a set value of the aperture, the first control parameter is the aperture. After the first value is generated, the output unit 101 outputs the first value generated by the generation unit 100 to the imaging device 20 (step S105).

After the first value is output, the input unit 102 inputs a second value of a second control parameter different from the first control parameter among the plurality of control parameters, the second value changing in accordance with the first value set in the imaging unit, from the imaging device 20 (step S110). For example, the second control parameter is a parameter regarding exposure. For example the second control parameter is shutter speed in the aperture priority mode. After the second value is input, the input unit 102 inputs first image data generated by the imaging unit when the first value is set in the imaging unit from the imaging device 20 (step S115).

After the first image data is input, the calculation unit 104 calculates a first difference between the first value and a third value of the first control parameter, and a second difference between the second value and a fourth value of the second control parameter (step S120). For example, the third value is a value of the first control parameter set in the imaging unit before the first value is set in the imaging unit. Alternatively, the third value is a recommended value that is recommended as a value of the first control parameter. For example, the fourth value is a set value set in the imaging unit as the value of the second control parameter before the second value is set in the imaging unit. Alternatively, the fourth value is a recommended value that is recommended as the value of the second control parameter. The fourth value may be a set value set in the imaging unit as the value of the second control parameter in accordance with the third value set in the imaging unit. In step S120, the calculation unit 104 reads the third value and the fourth value from the storage unit 103. Further, in step S120, the calculation unit 104 calculates the first difference and the second difference using the third value and the fourth value read from the storage unit 103, and the first value and the second value input from the imaging device 20.

After the first difference and the second difference are calculated, the display unit 105 shows first difference information indicating the first difference and second difference information indicating the second difference (step S125). After the first difference information and the second difference information are shown, the display unit 105 displays an image based on the first image data input by the input unit 102 (step S130).

After the process of step S115 is performed, the process of step S110 may be performed. Further, after the process of step S130 is performed, the process of step S125 may be performed. Further, the process of step S130 may be performed before the process of step S120 is performed.

According to this embodiment, the imaging-setting device 10 includes the generation unit 100 that generates the first value of the first control parameter among the plurality of control parameters for controlling imaging, the output unit 101 that outputs the first value to the imaging device 20, the input unit 102 that inputs the second value of the second control parameter different from the first control parameter among the plurality of control parameters, the second value changes in accordance with the first value set in the imaging unit of the imaging device 20, and the first image data generated by the imaging unit when the first value is set in the imaging unit from the imaging device 20, the storage unit 103 that stores the third value of the first control parameter and the fourth value of the second control parameter, the calculation unit 104 that calculates the first difference between the first value and the third value and the second difference between the second value and the fourth value, and the display unit 105 that shows the first difference information indicating the first difference and the second difference information indicating the second difference, and displays the image based on the image data.

Further, according to this embodiment, an imaging-setting method includes a generation step (step S100) in which the generation unit 100 generates a first value of a first control parameter among a plurality of control parameters for controlling imaging, an output step (step S105) in which the output unit 101 outputs the first value to the imaging device 20, a first input step (step S110) in which the input unit 102 inputs a second value of a second control parameter different from the first control parameter among the plurality of control parameters, the second value changing in accordance with the first value set in the imaging unit, from the imaging device 20 of the imaging device 20, a second input step (step S115) in which the input unit 102 inputs image data generated by the imaging unit when the first value is set in the imaging unit from the imaging device 20, a calculation step (step S120) in which the calculation unit 104 calculates a first difference between the first value and a third value of the first control parameter and a second difference between the second value and a fourth value of the second control parameter, a first display step (step S125) in which the display unit 105 shows first difference information indicating the first difference and second difference information indicating the second difference, and a second display step (step S130) in which the display unit 105 displays an image based on the image data.

Further, according to this embodiment, a program causes a computer to execute a generation step (step S100) of generating a first value of a first control parameter among a plurality of control parameters for controlling imaging, an output step (step S105) of outputting the first value to the imaging device 20 by the output unit 101, a first input step (step S110) of receiving, by the input unit 102, a second value of a second control parameter different from the first control parameter among the plurality of control parameters, the second value changing in accordance with the first value set in the imaging unit, from the imaging device 20 of the imaging device 20, a second input step (step S115) of receiving, by the input unit 102, image data generated by the imaging unit when the first value is set in the imaging unit from the imaging device 20, a calculation step (step S120) of calculating a first difference between the first value and a third value of the first control parameter and the second difference between the second value and a fourth value of the second control parameter, a first display step (step S125) of showing, by the display unit 105, first difference information indicating the first difference and second difference information indicating the second difference, and a second display step (step S130) of displaying, by the display unit 105, an image based on the image data.

In this embodiment, the first difference information of the first control parameter and second difference information of the second control parameter in accordance with the first control parameter are displayed. This makes it possible to easily recognize the state of a plurality of control parameters that are in accordance with each other. A user can easily recognize control parameters that are in accordance with each other.

Next, a specific example of this embodiment will be described.

First Example

Figure 3:
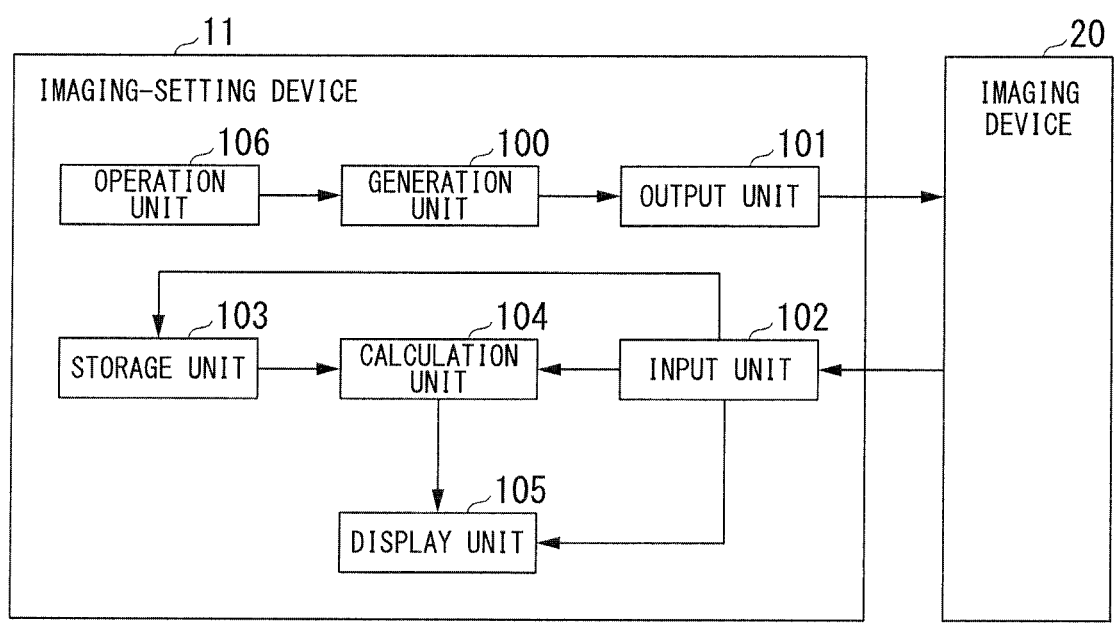
FIG. 3 is a block diagram showing a configuration of the imaging-setting device according to a first example of the first embodiment of the present invention.

FIG. 3 shows a configuration of an imaging-setting device 11 that is a specific example of the imaging-setting device 10. As shown in FIG. 3, the imaging-setting device 11 includes a generation unit 100, an output unit 101, the input unit 102, a storage unit 103, a calculation unit 104, a display unit 105, and an operation unit 106. Description of the configuration described above will be omitted.

The operation unit 106 inputs an instruction of a first value of a first control parameter among a plurality of control parameters for controlling imaging from a user.

Thus, the first value of the first control parameter is based on an instruction from the user. The operation unit 106 may be a touch panel disposed in the display unit 105. The generation unit 100 generates the first value on the basis of an instruction input by the operation unit 106.

In this example, the input unit 102 inputs a third value, which is a value of the first control parameter set in the imaging unit before the first value of the first control parameter among the plurality of control parameters for controlling the imaging is set in the imaging unit. Further, the input unit 102 inputs a fourth value, which is a value of a second control parameter set in the imaging unit before the second value is set in the imaging unit from the imaging device 20. The storage unit 103 stores the third value and the fourth value input by the input unit 102.

In this example, the input unit 102 inputs second image data generated by the imaging unit when the third value is set in the imaging unit from the imaging device 20. The display unit 105 displays an image based on the second image data.

In this example, the input unit 102 inputs a plurality of second image data including a moving image or one item of second image data including a still image from the imaging device 20. The display unit 105 displays the moving image based on the plurality of second image data. Alternatively, the display unit 105 displays the still image based on the one item of second image data.

In this example, the input unit 102 inputs the second value, and a plurality of first image data including a moving image generated by the imaging unit when the first value is set in the imaging unit from the imaging device 20. The display unit 105 shows first difference information and second difference information and displays the moving image based on the plurality of first image data.

In this example, any of a plurality of modes is set in the imaging unit. A mode to be set in the imaging unit can be switched. In this example, an aperture priority mode in which a value of the shutter speed is set so that exposure is appropriate in accordance with a set value of an aperture is set in the imaging unit. In this example, the first control parameter and the second control parameter are parameters regarding the exposure. In the aperture priority mode, the first control parameter is the aperture and the second control parameter is the shutter speed.

In this example, the first value of the first control parameter is the set value of the aperture. The second value of the second control parameter is the set value of the shutter speed. The third value of the first control parameter is a set value of the aperture set in the imaging unit before the first value is set in the imaging unit. The fourth value of the second control parameter is a set value of the shutter speed set in the imaging unit before the second value is set in the imaging unit.

Figure 4:
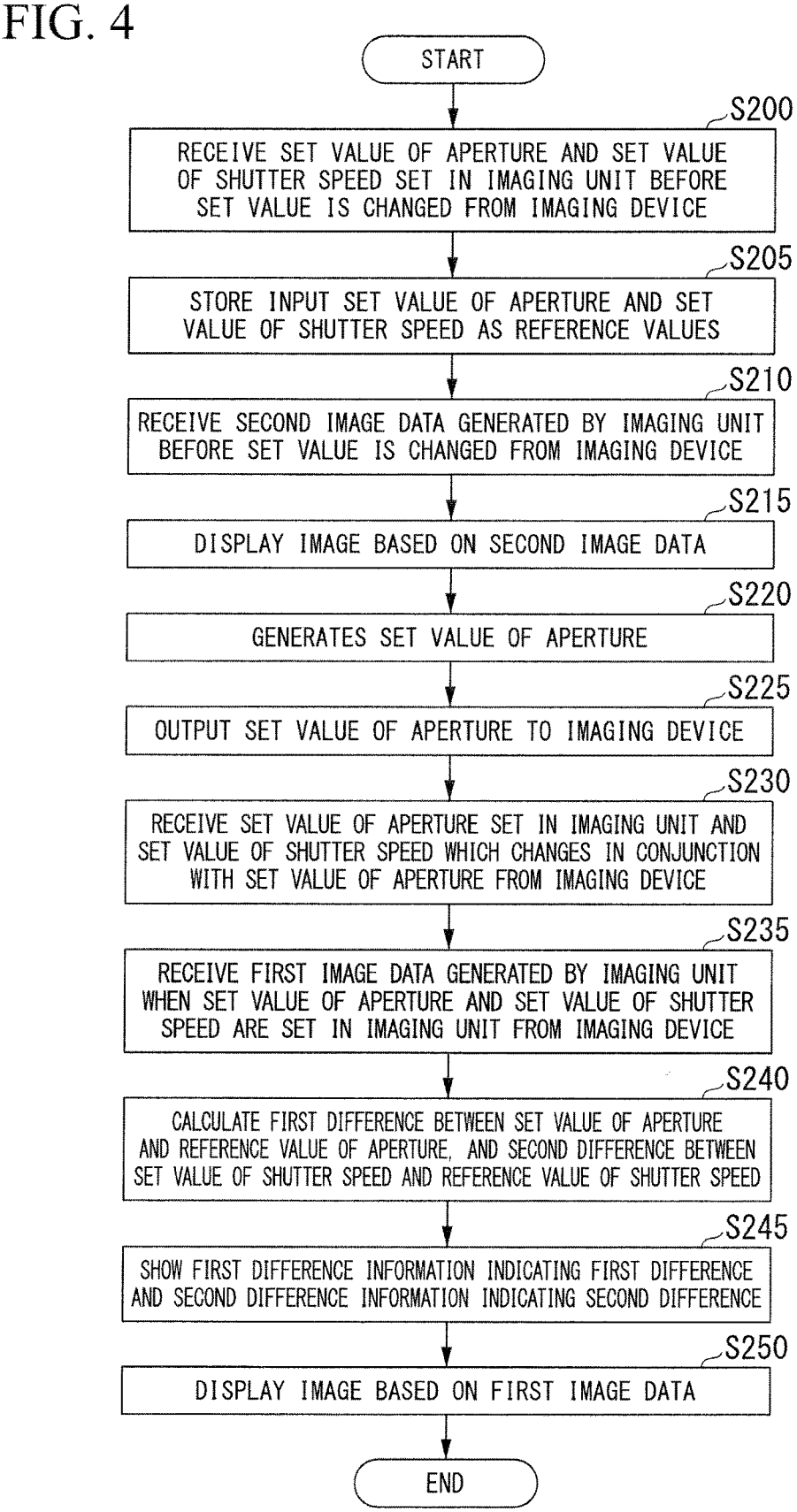
FIG. 4 is a flowchart showing a procedure of an operation of the imaging-setting device according to the first example of the first embodiment of the present invention.

Referring to FIG. 4, an operation of the imaging-setting device 11 will be described. FIG. 4 shows a procedure of an operation of the imaging-setting device 11 regarding a setting of control parameters.

When the operation regarding a setting of control parameters is started, the input unit 102 inputs the set value (the third value) of the aperture set in the imaging unit before the set value (a first value) of the aperture that is a first control parameter is set in the imaging unit. Further, the input unit 102 inputs a set value (a fourth value) of shutter speed set in the imaging unit before a set value (a second value) of the shutter speed, that is a second control parameter, is set in the imaging unit from the imaging device 20 (step S200).

After the set values are input, the storage unit 103 stores a set value (the third value) of the aperture and a set value (the fourth value) of the shutter speed input by the input unit 102 as reference values (step S205). The reference value (the third value) of the aperture and the reference value (the fourth value) of the shutter speed may be stored in association with each other.

After the reference values are stored, the input unit 102 inputs the second image data generated by the imaging unit when the reference value (the third value) of the aperture and the reference value (the fourth value) of the shutter speed are set in the imaging unit from the imaging device 20 (step S210). For example, in step S210, the input unit 102 inputs a plurality of second image data including a moving image or one item of second image data including a still image from the imaging device 20.

After the second image data is input, the display unit 105 displays an image based on the second image data input by the input unit 102 (step S215). For example, in step S215, the display unit 105 displays the moving image based on the plurality of second image data. Alternatively, in step S215, the display unit 105 displays the still image based on the one item of second image data.

After the image is displayed, the generation unit 100 generates a set value (the first value) of the aperture (step S220). Step S220 corresponds to step S100 in FIG. 2.

After the set value (the first value) of the aperture is generated, the output unit 101 outputs the set value (the first value) of the aperture generated by the generation unit 100 to the imaging device 20 (step S225). Step S225 corresponds to step S105 in FIG. 2.

After the set value (the first value) of the aperture is output, the input unit 102 inputs the set value (the first value) of the aperture set in the imaging unit and the set value (the second value) of the shutter speed changing in accordance with the set value (the first value) of the aperture from the imaging device 20 (step S230). Step S230 corresponds to step S110 in FIG. 2. Instead of the set value (the first value) of the aperture being input from the imaging device 20, the set value (the first value) of the aperture generated in step S220 may be stored in the storage unit 103. By the set value (the first value) of the aperture being input from the imaging device 20, the process is performed on the basis of the value actually set in the imaging device 20.

After the set values are input, the input unit 102 inputs the first image data generated by the imaging unit when the set value (the first value) of the aperture and the set value (the second value) of the shutter speed are set in the imaging unit from the imaging device 20 (step S235). For example, in step S235, the input unit 102 inputs a plurality of first image data including a moving image from the imaging device 20. The input unit 102 may input one item of first image data including a still image from the imaging device 20. Step S235 corresponds to step S115 in FIG. 2.

After the first image data is input, the calculation unit 104 calculates a first difference between the set value (the first value) of the aperture input from the imaging device 20 and the reference value (the third value) of the aperture stored in the storage unit 103. Further, the calculation unit 104 calculates a second difference between the set value (the second value) of the shutter speed input from the imaging device 20 and the reference value (the fourth value) of the shutter speed stored in the storage unit 103 (step S240). Step S240 corresponds to step S120 in FIG. 2.

After the first difference and the second difference are calculated, the display unit 105 shows first difference information indicating the first difference and second difference information indicating the second difference (step S245). Step S245 corresponds to step S125 in FIG. 2.

After the first difference information and the second difference information are shown, the display unit 105 displays an image based on the first image data input by the input unit 102 (step S250). For example, in step S250, the display unit 105 displays the moving image based on a plurality of first image data. The display unit 105 may display the still image based on the one item of first image data including the still image. Step S250 corresponds to step S130 in FIG. 2.

The processes of steps S220 to S250 may be repeatedly performed. That is, the set value of the aperture may be repeatedly updated, and the image may be updated accordingly.

At least one of the processes of steps S200 to S215 is arbitrary. That is, at least any one of the processes of steps S200 to S215 may not be performed.

Instead of the processes of steps S200 and S205 being performed, the user may know the set value (the third value) of the aperture and the set value (the fourth value) of the shutter speed, and input the set values to the imaging-setting device 11.

Before the process of step S200 or S205 is performed, the process of step S210 or S215 may be performed. Further, the processes of steps S210 and S215 may be performed after the process of at least one of steps S220 to S250 is performed.

After the process of step S235 is performed, the process of step S230 may be performed. Further, after the process of step S250 is performed, the process of step S245 may be performed. Further, the process of step S250 may be performed before the process of step S240 is performed.

The imaging device 20 may simultaneously output the first image data and the second image data to the imaging-setting device 11. For example, the imaging device 20 may include a first imaging unit that generates the first image data and a second imaging unit that generates the second image data. Alternatively, the imaging device 20 may alternately output the first image data and the second image data every frame.

Figure 5:
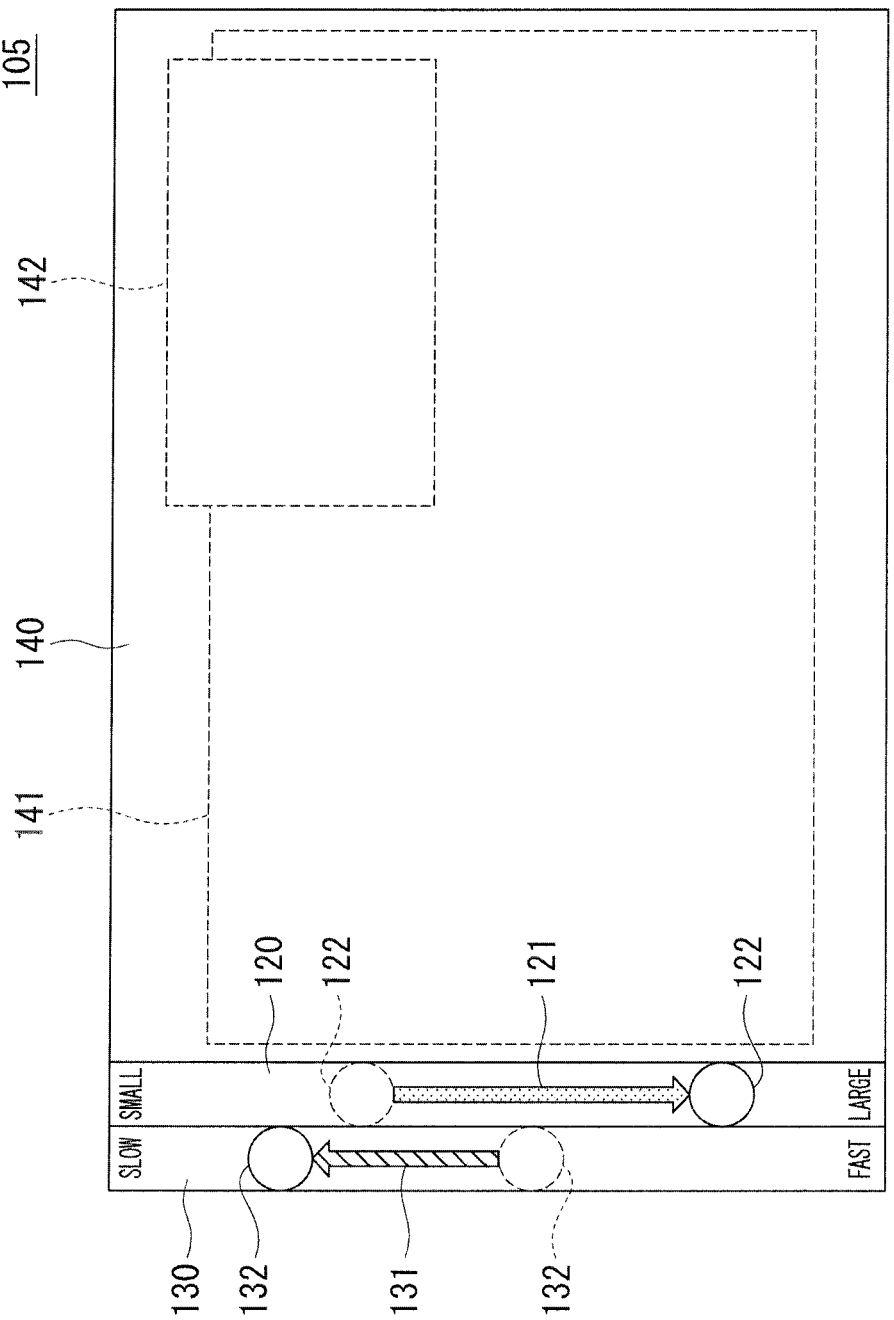
FIG. 5 is a reference diagram showing a first example of a screen of a display unit in the first example of the first embodiment of the present invention.

FIG. 5 shows a first example of a screen of the display unit 105. The display unit 105 displays an area 120, an area 130, and an image area 140. The first difference information of the first control parameter is displayed in the area 120. Specifically, first difference information of the aperture is displayed in the area 120. The second difference information of the second control parameter is displayed in the area 130. Specifically, second difference information of the shutter speed is displayed in the area 130. An image based on the image data input from the imaging device 20 is displayed in the image area 140.

Shapes of the area 120 and the area 130 are elongated rectangles in a vertical direction. The area 120 and the area 130 are disposed to the left of the image area 140. The area 120 is adjacent to the image area 140. The area 130 is adjacent to the area 120. As shown in FIG. 5, it is preferable that the area 120 and the area 130 be adjacent to each other.

The display unit 105 displays an arrow 121 that is a figure indicating the first difference information of the aperture, and a circle 122 that is a figure indicating a set value of the aperture in the area 120. That is, the display unit 105 displays the first difference information using the arrow 121. The circle 122 is displayed at a position of a head of the arrow 121.

A range of the area 120 corresponds to a range of values of the aperture that can be set in the imaging unit. In the area 120, an upper position corresponds to a set value at which exposure is greater (brighter). An upper end of the area 120 corresponds to a minimum value of the values of the aperture that can be set in the imaging unit. Further, a lower position corresponds to a set value at which the exposure is smaller (darker) in the area 120. A lower end of the area 120 corresponds to a maximum value of the values of the aperture that can be set in the imaging unit. When the exposure increases, the aperture increases, but the value of the aperture (an F value) decreases. The input unit 102 may input the maximum value and the minimum value of the values of the aperture that can be set in the imaging unit from the imaging device 20. Further, the storage unit 103 may store the maximum value and the minimum value of the values of the aperture that can be set in the imaging unit.

The position of the head of the arrow 121 corresponds to the set value (the first value) of the aperture. A position of a tail of the arrow 121 corresponds to the reference value (the third value) of the aperture. For example, before the set value (the first value) of the aperture is set in the imaging unit, the circle 122 is displayed at the position of the tail of the arrow 121, and the arrow 121 is not displayed. The circle 122 before the set value (the first value) of the aperture is set in the imaging unit is indicated by a dashed line. A length of the arrow 121 indicates a magnitude of a difference between the set value (the first value) of the aperture and the reference value (the third value) of the aperture. The display unit 105 shows the set value (the first value) of the aperture or the reference value (the third value) of the aperture using the circle 122.

The circle 122 is movable. The user moves the circle 122 by operating the operation unit 106. Accordingly, the operation unit 106 inputs an instruction for the set value (the first value) of the aperture from the user. The arrow 121 is displayed according to a movement of the circle 122. The operation unit 106 outputs information on a position of the circle 122 to the generation unit 100. The generation unit 100 generates the set value (the first value) of the aperture corresponding to the position of the circle 122. The operation unit 106 inputs only an instruction related to the movement of the circle 122 regarding the first control parameter among the first control parameter and the second control parameter. The operation unit 106 does not input an instruction related to the movement of a circle 132 regarding the second control parameter.

The display unit 105 displays an arrow 131 that is a figure indicating second difference information of the shutter speed and the circle 132 that is a figure indicating the set value of the shutter speed in the area 130. That is, the display unit 105 displays the second difference information using the arrow 131. The circle 132 is displayed at a position of a head of the arrow 131.

A range of the area 130 corresponds to a range of values of the shutter speed that can be set in the imaging unit. In the area 130, an upper position corresponds to a set value at which exposure is greater (brighter). An upper end of the area 130 corresponds to a maximum value (a value corresponding to a lowest speed) of the values of the shutter speed that can be set in the imaging unit. Further a lower position corresponds in the area 130 to a set value at which the exposure is smaller (darker). A lower end of the area 130 corresponds to a minimum value (a value corresponding to a highest speed) of the values of the shutter speed that can be set in the imaging unit. The input unit 102 may input the maximum value and the minimum value of the values of the shutter speed that can be set in the imaging unit from the imaging device 20. Further, the storage unit 103 may store the maximum value and the minimum value of the values of the shutter speed that can be set in the imaging unit.

The position of the head of the arrow 131 corresponds to the set value (the second value) of the shutter speed. A position of a tail of the arrow 131 corresponds to the reference value (the fourth value) of the shutter speed. For example, before the set value (the second value) of the shutter speed is set in the imaging unit, the circle 132 is displayed at the position of the tail of the arrow 131, and the arrow 131 is not displayed. The circle 132 before the set value (the second value) of the shutter speed is set in the imaging unit is indicated by a dashed line. A length of the arrow 131 indicates a magnitude of a difference between the set value (the second value) of the shutter speed and the reference value (the fourth value) of the shutter speed. The display unit 105 shows the set value (the second value) of the shutter speed or the reference value (the fourth value) of the shutter speed using the circle 132.

After the user moves the circle 122, the input unit 102 inputs the set value (the second value) of the shutter speed from the imaging device 20. The display unit 105 displays the circle 132 at a position corresponding to the set value (the second value) of the shutter speed in the second area 130. Thus, the circle 132 is moved. The display unit 105 displays the arrow 131.

For example, the lengths of the area 120 and the area 130 are the same. That is, the display unit 105 displays the range of the values of the aperture that can be set in the imaging unit and the range of the values of the shutter speed that can be set in the imaging unit on the same scale.

The display unit 105 may display the arrow 121 in a first display form and display the arrow 131 in a second display form different from the first display form. For example, the arrow 121 and the arrow 131 may be displayed with different colors. The arrow 121 and the arrow 131 may be displayed with different brightness. A pattern of the arrow 121 may be different from a pattern of the arrow 131. A type of figure indicating the first difference information and a type of figure indicating the second difference information may be different. This allows the user to easily identify the first control parameter and the second control parameter.

The display unit 105 displays the area 120 in the first display form and displays the area 130 in the second display form different from the first display form. That is, the display unit 105 may display the arrow 121 in the area 120 displayed in the first display form, and display the arrow 131 in the area 130 displayed in the second display form different from the first display form. For example, the area 120 and the area 130 may be displayed with different colors. The area 120 and the area 130 and may be displayed with different brightness. A pattern of the area 120 and a pattern of the area 130 may be different.

The area 120 and the area 130 may be a single area. That is, the display unit 105 may display the first difference information and the second difference information in the same area.

The user can recognize the second difference information indicated by the arrow 131 according to the first difference information indicated by the arrow 121. That is, the user can visually recognize that the value of the aperture and the value of the shutter speed are in accordance with each other. Further, the user can visually recognize an amount of change of the value of the shutter speed according to an amount of change of the value of the aperture.

Further, the user can visually recognize the value of the aperture indicated by the circle 122 and the value of the shutter speed indicated by the circle 132. For example, the user can visually recognize the set value (the second value) of the shutter speed corresponding to the set value (the first value) of the aperture.

Therefore, the user can visually recognize a relationship between a plurality of control parameters that are in accordance with each other. Further, the user can learn a method of adjusting the plurality of control parameters.

The display unit 105 displays an image 141 based on the first image data generated by the imaging unit when the set value (the first value) of the aperture and the set value (the second value) of the shutter speed are set in the imaging unit in the image area 140. Further, the display unit 105 displays an image 142 based on the second image data generated by the imaging unit when the reference value (the third value) of the aperture and the reference value (the fourth value) of the shutter speed are set in the imaging unit in the image area 140.

The image 142 overlaps the image 141. The image 141 and the image 142 may be displayed so as not to overlap each other.

The user can confirm a state of the image 141 reflecting the set value (the first value) of the aperture and the set value (the second value) of the shutter speed. That is, the user can confirm the state of the image 141 after the set values of the aperture and the shutter speed are changed. Further, the user can confirm the state of the image 142 reflecting the reference value (the third value) of the aperture and the reference value (the fourth value) of the shutter speed. That is, the user can confirm the state of the image 142 before the set values of the aperture and shutter speed are changed.

The display unit 105 may not display the image 142. The user can determine a state of the exposure by referring to the image 141 after the set values of the aperture and the shutter speed are changed.

Figure 6:
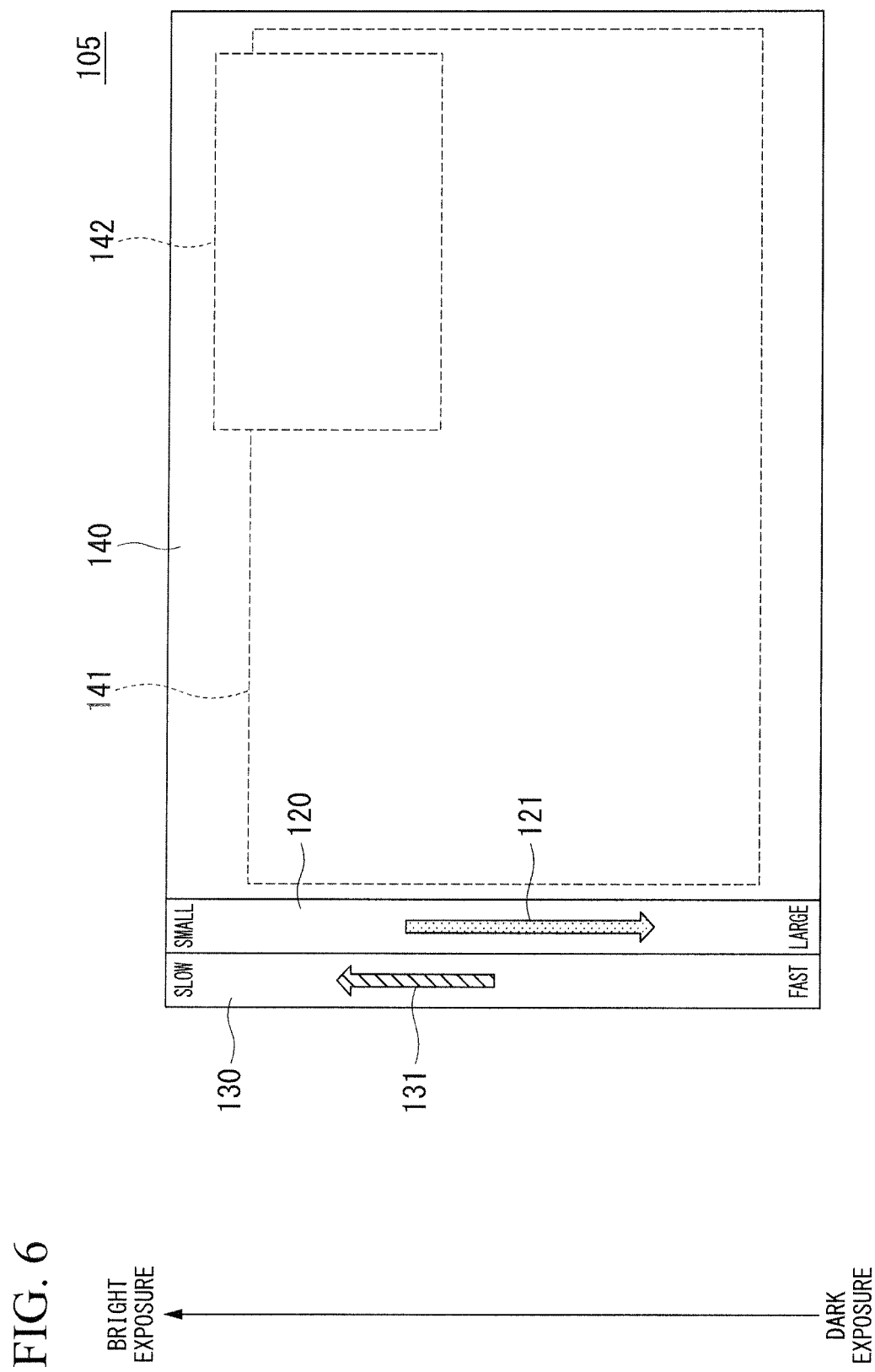
FIG. 6 is a reference diagram showing a second example of the screen of the display unit in the first example of the first embodiment of the present invention.

FIG. 6 shows a second example of the screen of the display unit 105. In FIG. 6, the circle 122 and the circle 132 are not displayed. For example, the user sets the value of the aperture by moving a position of a head of the arrow 121. Other than that, FIG. 6 is the same as FIG. 5. The user can recognize the set value (the first value) of the aperture and the reference value (the third value) of the aperture from respective positions of the head and the tail of the arrow 121. Further, the user can recognize the set value (the second value) of the shutter speed and the reference value (the fourth value) of the shutter speed from respective positions of the head and the tail of the arrow 131.

Figure 7:
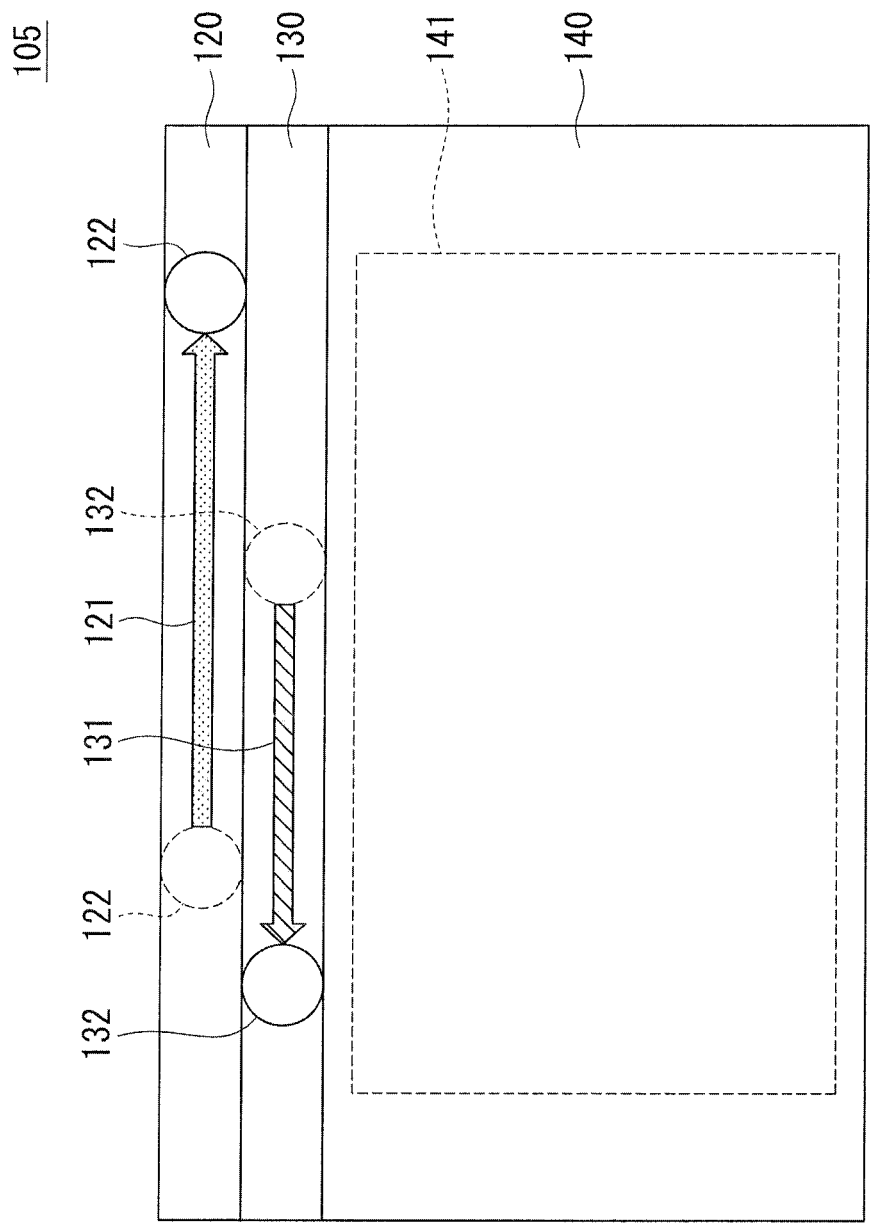
FIG. 7 is a reference diagram showing a third example of the screen of the display unit in the first example of the first embodiment of the present invention.

FIG. 7 shows a third example of the screen of the display unit 105. In FIG. 7, shapes of the area 120 and the area 130 are elongated rectangles in a lateral direction. The area 120 and the area 130 are arranged on the upper side of the image area 140.

The display unit 105 displays the image 141 based on the first image data in the image area 140. The display unit 105 may display the image 142 based on the second image data in the image area 140.

Figure 8:
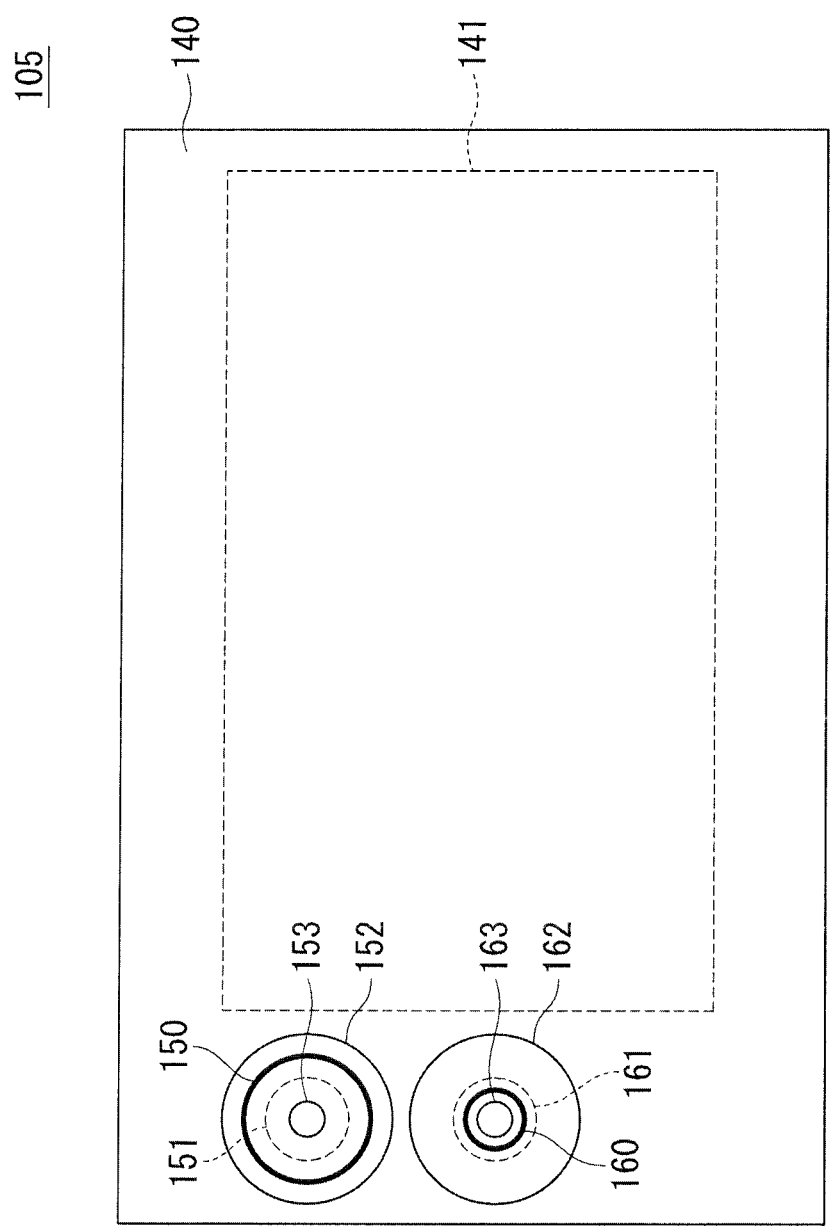
FIG. 8 is a reference diagram showing a fourth example of the screen of the display unit in the first example of the first embodiment of the present invention.

FIG. 8 shows a fourth example of the screen of the display unit 105. The display unit 105 displays the image area 140. The first difference information of the aperture, the second difference information of the shutter speed, and the image based on the image data input from the imaging device 20 are displayed in the image area 140. The image area 140 is a first area for displaying the first difference information and a second area for displaying the second difference information.

The display unit 105 displays a circle 150 indicating the set value (the first value) of the aperture, a circle 151 indicating the reference value (the third value) of the aperture, a circle 152 indicating a maximum value of values of the aperture that can be set in the imaging unit, and a circle 153 indicating a minimum value of the values of the aperture that can be set in the imaging unit. Positions of centers of the circle 150, the circle 151, the circle 152, and the circle 153 are the same.

A range from the circle 152 to the circle 153 corresponds to a range of the values of the aperture that can be set in the imaging unit. A range from the circle 150 to the circle 151 corresponds to the first difference regarding the aperture. That is, the circle 150 and the circle 151 correspond to the first difference information.

A size of the circle 150 can be changed. The user changes the size of the circle 150 by operating the operation unit 106. Accordingly, the operation unit 106 inputs an instruction for the set value (the first value) of the aperture from the user. The operation unit 106 outputs information on the position of the circle 150 to the generation unit 100. The generation unit 100 generates the set value (the first value) of the aperture corresponding to the position of the circle 150.

The display unit 105 displays a circle 160 indicating the set value (the second value) of the shutter speed, a circle 161 indicating the reference value (the fourth value) of the shutter speed, a circle 162 indicating a maximum value of values of the shutter speed that can be set in the imaging unit, and a circle 163 indicating a minimum value of the values of the shutter speed that can be set in the imaging unit. Positions of centers of the circle 160, the circle 161, the circle 162, and the circle 163 are the same.

A range from the circle 162 to the circle 163 corresponds to a range of the values of the shutter speed that can be set in the imaging unit. A range from the circle 160 to the circle 161 corresponds to the second difference regarding the shutter speed. That is, the circle 160 and the circle 161 correspond to the second difference information.

After the user has changed the size of the circle 150, the input unit 102 inputs the set value (the second value) of the shutter speed from the imaging device 20. The display unit 105 displays the circle 160 at a position corresponding to the set value (the second value) of the shutter speed.

For example, sizes of the circle 152 and the circle 162 are the same, and sizes of the circle 153 and the circle 163 are the same. That is, the display unit 105 displays the range of the values of the aperture that can be set in the imaging unit and the range of the values of the shutter speed that can be set in the imaging unit, on the same scale.

The display unit 105 may display the circle 150 and the circle 151 in the first display form and display the circle 160 and the circle 161 in the second display form different from the first display form. For example, the circle 150 and the circle 151, and the circle 160 and the circle 161 may be displayed with different colors. The circle 150 and the circle 151, and the circle 160 and the circle 161 may be displayed with different brightness. A pattern of the circle 150 and the circle 151 may be different from a pattern of the circle 160 and the circle 161.

The display unit 105 displays the image 141 based on the first image data in the image area 140. The display unit 105 may display the image 142 based on the second image data in the image area 140.

Figure 9:
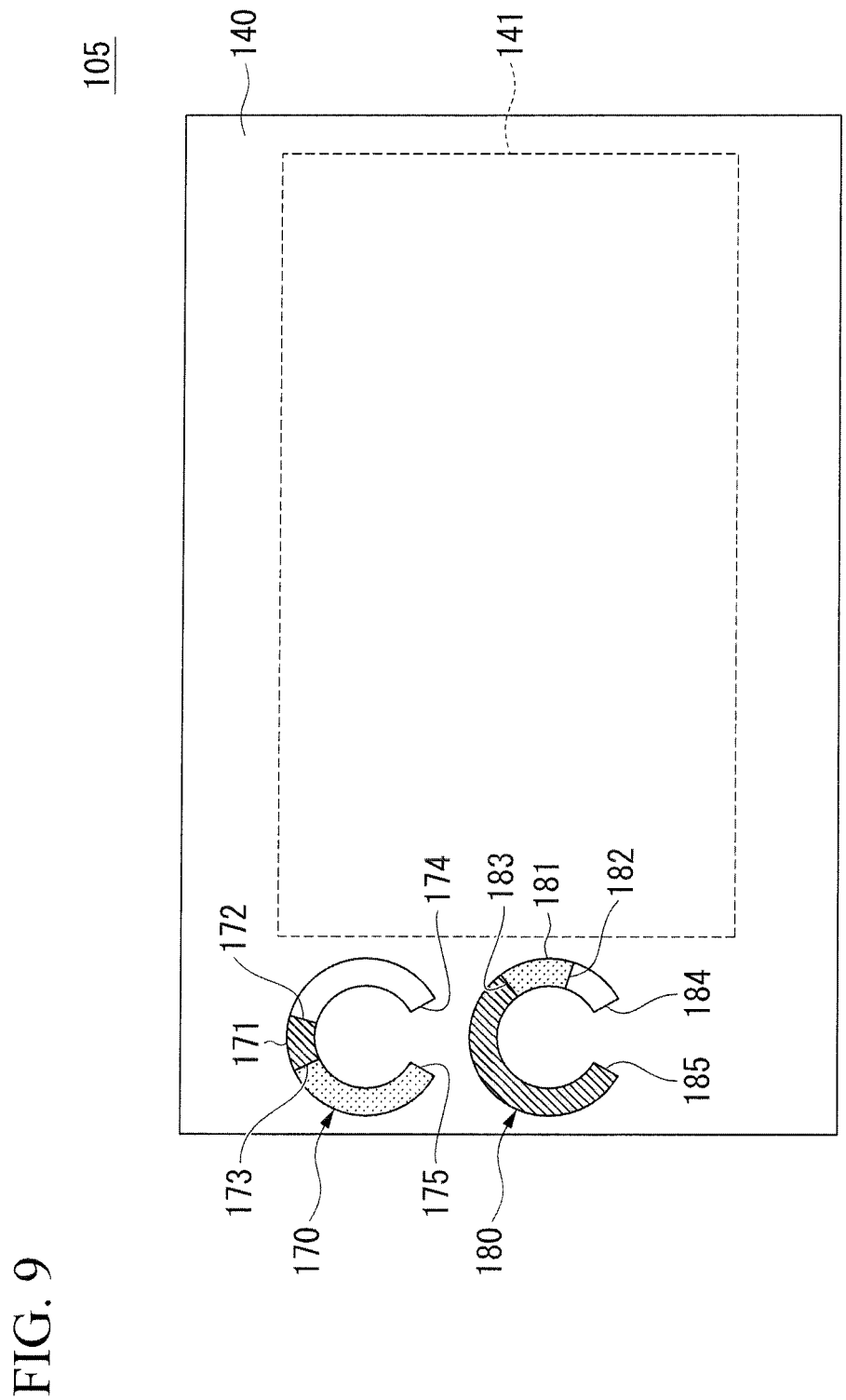
FIG. 9 is a reference diagram showing a fifth example of the screen of the display unit in the first example of the first embodiment of the present invention.

FIG. 9 shows a fifth example of the screen of the display unit 105. The display unit 105 displays the image area 140. The first difference information of the aperture, the second difference information of the shutter speed, and the image based on the image data input from the imaging device 20 are displayed in the image area 140. The image area 140 is the first area for displaying the first difference information and is the second area for displaying the second difference information.

The display unit 105 displays a FIG. 170 regarding the aperture. The FIG. 170 includes a FIG. 171 indicating the first difference information. A first end 172 of the FIG. 171 indicates the set value (the first value) of the aperture. A second end 173 of the FIG. 171 indicates the reference value (the third value) of the aperture.

The first end 174 of the FIG. 170 indicates a maximum value of values of the aperture that can be set in the imaging unit. The second end 175 of the FIG. 170 indicates a minimum value of the values of the aperture that can be set in the imaging unit.

A size of the FIG. 171 can be changed. The user changes the size of the FIG. 171 by operating the operation unit 106. By the first end 172 of the FIG. 171 being moved, the size of the FIG. 171 is changed. Accordingly, the operation unit 106 inputs an instruction for the set value (the first value) of the aperture from the user. The operation unit 106 outputs information on the position of the first end 172 of the FIG. 171 to the generation unit 100. The generation unit 100 generates the set value (the first value) of the aperture corresponding to the position of the first end 172 of the FIG. 171.

The display unit 105 displays a FIG. 180 regarding the shutter speed. The FIG. 180 includes a FIG. 181 showing the second difference information. A first end 182 of the FIG. 181 indicates the reference value (the fourth value) of the shutter speed. A second end 183 of the FIG. 181 indicates the set value (the second value) of the shutter speed.

The first end portion 184 of the FIG. 180 indicates a maximum value of values of the shutter speed that can be set in the imaging unit. The second end 185 of the FIG. 180 indicates a minimum value of the values of the shutter speed that can be set in the imaging unit.

After the user changes the size of the FIG. 171, the input unit 102 inputs the set value (the second value) of the shutter speed from the imaging device 20. The display unit 105 displays the FIG. 181 so that the position corresponding to the set value (the second value) of the shutter speed matches the position of the second end 183 of the FIG. 181.

For example, the sizes of the FIG. 170 and the FIG. 180 are the same. That is, the display unit 105 displays a range of the values of the aperture that can be set in the imaging unit and a range of the values of the shutter speed that can be set in the imaging unit on the same scale.

The display unit 105 may display the FIG. 171 in the first display form and display the FIG. 181 in the second display form different from the first display form. For example, the FIG. 171 and the FIG. 181 may be displayed with different colors. The FIG. 171 and the FIG. 181 may be displayed with different brightness. A pattern of the FIG. 171 and a pattern of the FIG. 181 may be different.

The display unit 105 displays the image 141 based on the first image data in the image area 140. The display unit 105 may display the image 142 based on the second image data in the image area 140.

A shutter speed priority mode in which the value of the aperture is set so that exposure is appropriate in accordance with the set value of the shutter speed may be set in the imaging unit. An operation of the imaging-setting device 11 when the shutter speed priority mode is set in the imaging unit is the same as the above operation. In the shutter speed priority mode, the first control parameter is the shutter speed and the second control parameter is the aperture.

Second Example

This example will be described using the imaging-setting device 11 shown in FIG. 3. In this example, the storage unit 103 stores a third value, and a fourth value that is a recommended value that is recommended as a value of a second control parameter, or a set value of the second control parameter set in an imaging unit before a second value is set in the imaging unit.

In this example, any of a plurality of modes is set in the imaging unit. A mode to be set in the imaging unit can be switched. The plurality of modes includes at least one of the aperture priority mode, the shutter speed priority mode, and a manual mode. The storage unit 103 stores the fourth value that is the recommended value when the mode of the imaging unit is the manual mode.

In the aperture priority mode, a value of shutter speed is set so that exposure is appropriate in accordance with a set value of an aperture. In the aperture priority mode, a first control parameter is the aperture and the second control parameter is the shutter speed. In the shutter speed priority mode, the value of the aperture is set so that the exposure is appropriate in accordance with the set value of the shutter speed. In the shutter speed priority mode, the first control parameter is the shutter speed and the second control parameter is the aperture. In the manual mode, the value of the aperture and the value of the shutter speed are set on the basis of an instruction from a user. In the manual mode, the first control parameter is the aperture and the shutter speed, and the second of the control parameter is the exposure.

In this example, the generation unit 100 generates the first value of the first control parameter determined to correspond to the mode set in the imaging unit among the plurality of control parameters. For example, if the aperture priority mode is set, the generation unit 100 generates a first value of the aperture. Further, when the shutter speed priority mode is set, the generation unit 100 generates a first value of the shutter speed. Further, if the manual mode is set, the generation unit 100 generates the first value of the aperture and the first value of the shutter speed. Thus, the generation unit 100 switches the value of the first control parameter to be generated according to the mode set in the imaging unit.

In this example, the display unit 105 shows first difference information in a first area and shows second difference information in a second area different from the first area displayed in a first display form when the fourth value is a recommended value. Further, the display unit 105 shows second difference information in a second area displayed in a second display form different from the first display form if the fourth value is a set value. Further, the display unit 105 displays an image based on first image data.

Alternatively, in this example, the display unit 105 shows the first difference information and shows the second difference information in the first display form when the fourth value is a recommended value. Further, the display unit 105 shows the second difference information in the second display form different from the first display form if the fourth value is a set value. Further, the display unit 105 displays the image based on the first image data.

In the aperture priority mode and the shutter speed priority mode, the imaging device 20 determines environmental light from the image data generated by the imaging unit, and determines a state of the exposure corresponding to the environmental light. Further, the imaging device 20 determines the set value of the second control parameter so that the exposure is appropriate, that is, the value of the exposure is a standard exposure value. An appropriate exposure state can be different for each photographed scene. For example, in a photographed scene of a human portrait, bright corrected exposure may be considered. In the modes, the exposure can be changed through exposure correction. In the exposure correction, the imaging device 20 inputs an instruction to change the exposure from the user. The imaging device 20 determines the value of the exposure after correction on the basis of the instruction and sets the determined value of the exposure in the imaging unit. Thus, the state of exposure is changed.

In this example, the manual mode is set in the imaging unit. In the manual mode, the value of the aperture and the value of the shutter speed can be set arbitrarily regardless of the state of the exposure. In the manual mode, the value of the exposure does not necessarily match the standard exposure value. In this example, the value of the exposure is in accordance with the set value of the aperture and the set value of the shutter speed. That is, in this example, the second control parameter is the exposure.

In the manual mode, the first value of the first control parameter is the set value of the aperture and the set value of the shutter speed. The second value of the second control parameter is the set value of the exposure. The third value of the first control parameter is the set value of the aperture and the set value of the shutter speed set in the imaging unit before the first value is set in the imaging unit. The fourth value of the second control parameter is a recommended value of the exposure or is the set value of the exposure set in the imaging unit before the second value is set in the imaging unit.

For example, the recommended value of the exposure is the standard exposure value. By the value of the aperture or the shutter speed being set so that the value of the exposure is close to the standard exposure value, the exposure is appropriate. Therefore, the standard exposure value is recommended as the set value of the exposure.

Figure 10:
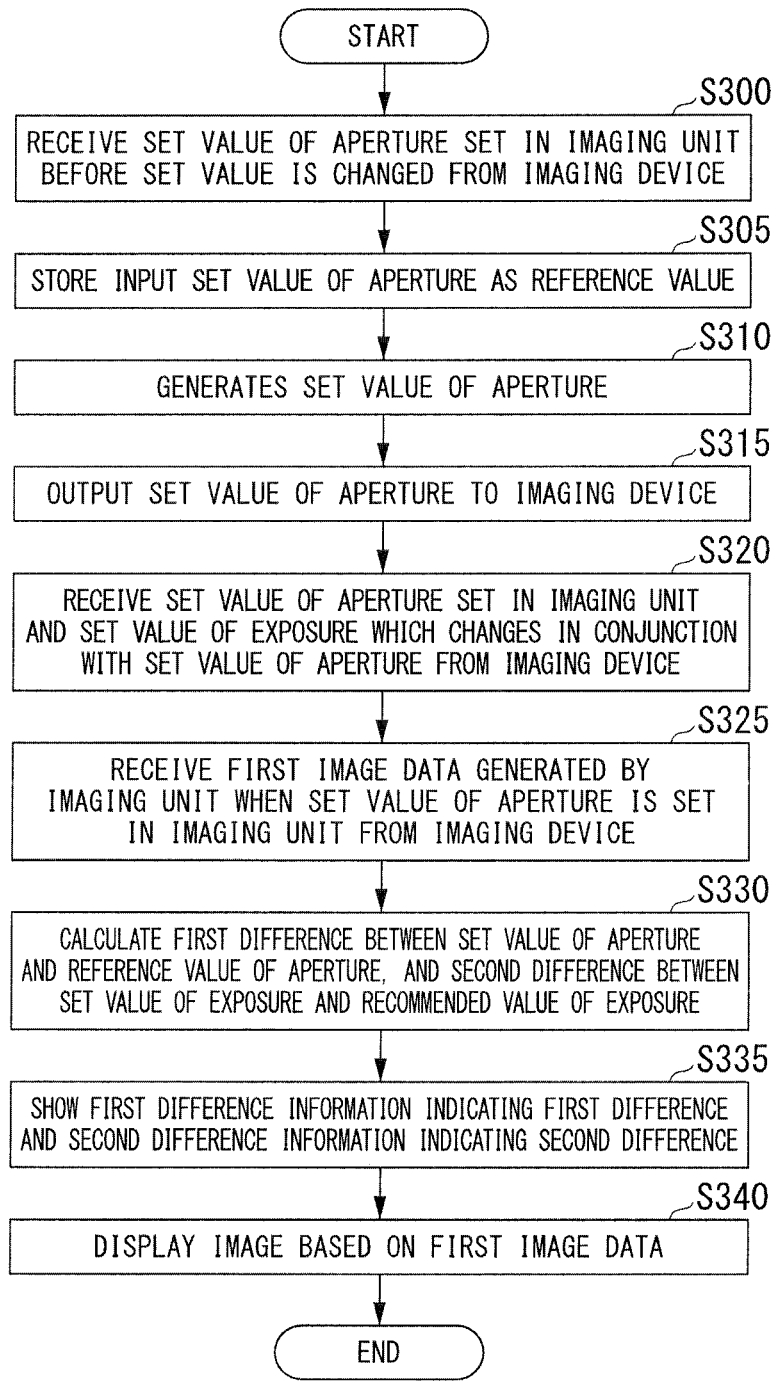
FIG. 10 is a flowchart showing a procedure of an operation of an imaging-setting device according to a second example of the first embodiment of the present invention.

Next, an operation of the imaging-setting device 11 will be described with reference to FIG. 10. FIG. 10 shows a procedure of an operation of the imaging-setting device 11 regarding a setting of the control parameters.

In the manual mode, it is possible to set the value of the aperture and the value of the shutter speed at the same time. This is the same as setting of the value of the aperture and the value of the shutter speed in a time division manner. Therefore, in this example, an operation in a case in which the value of the aperture is changed in a state in which the value of the shutter speed is fixed will be described. Further, in this example, an operation in a case in which the fourth value of the exposure is recommended will be described.

When an operation regarding a setting of control parameters is started, the input unit 102 inputs a set value (a third value) of an aperture set in an imaging unit before a set value (a first value) of the aperture that is a first control parameter is set in the imaging unit (step S300).

After a set value (the third value) of the aperture is input, the storage unit 103 stores the set value (the third value) of the aperture input by the input unit 102 as a reference value (the third value) of the aperture (step S305). Further, the storage unit 103 stores a standard exposure value as a recommended value (a fourth value) of the exposure in advance. For example, the standard exposure value is EV14. The reference value (the third value) of the aperture and the recommended value (the fourth value) of the exposure may be stored in association with each other.

After the reference value (the third value) of the aperture is stored, and the generation unit 100 generates the set value (the first value) of the aperture (step S310). Step S310 corresponds to step S100 in FIG. 2.

After the set value (the first value) of the aperture is generated, the output unit 101 outputs the set value (the first value) of the aperture generated by the generation unit 100 to the imaging device 20 (step S315). Step S315 corresponds to step S105 in FIG. 2.

After the set value (the first value) of the aperture is output, the input unit 102 inputs the set value (the first value) of the aperture set in the imaging unit, and a set value (a second value) of the exposure changing in accordance with the set value (the first value) of the aperture from the imaging device 20 (step S320). Step S320 corresponds to step S110 in FIG. 2. Instead of the set value (the first value) of the aperture being input from the imaging device 20, the set value (the first value) of the aperture generated in step S310 may be stored in the storage unit 103. By the set value (the first value) of the aperture being input from the imaging device 20, the process is performed on the basis of the value actually set in the imaging device 20.

After the set values are input, the input unit 102 inputs first image data generated by the imaging unit when the set value (the first value) of the aperture and the set value (the second value) of the exposure are set in the imaging unit from the imaging device 20 (step S325). For example, in step S325, the input unit 102 inputs the first image data including a moving image or a still image from the imaging device 20. Step S325 corresponds to step S115 in FIG. 2.

After the first image data is input, the calculation unit 104 calculates a first difference between the set value (the first value) of the aperture input from the imaging device 20 and the reference value (the third value) of the aperture stored in the storage unit 103. Further, the calculation unit 104 calculates a second difference between the set value (the second value) of exposure input from the imaging device 20 and the recommended value (the fourth value) of the exposure stored in the storage unit 103 (step S330). Step S330 corresponds to step S120 in FIG. 2.

After the first difference and the second difference are calculated, the display unit 105 shows first difference information indicating the first difference and second difference information indicating the second difference (step S335). Step S335 corresponds to step S125 in FIG. 2.

After the first difference information and the second difference information are shown, the display unit 105 displays an image based on the first image data input by the input unit 102 (step S340). For example, in step S340, the display unit 105 displays a moving image or a still image based on the first image data. Step S340 corresponds to step S130 in FIG. 2.

In step S300, the input unit 102 may input a set value (the fourth value) of the exposure set in the imaging device 20 before the set value (the first value) of the aperture is set in the imaging unit, from the imaging device 20. In step S305, the storage unit 103 may store the set value (the fourth value) of the exposure set in the imaging device 20 before the set value (the first value) of the aperture is set in the imaging unit.

The processes of steps S310 to S340 may be repeatedly performed. That is, the set value of the aperture may be repeatedly updated, and the image may be updated accordingly. Further, the processes of steps S210 and S215 in FIG. 4 may be performed at a timing such as before the process of step S310 is performed.

The processes of steps S300 and S305 are arbitrary. That is, the processes of steps S300 and S305 may not be performed. Instead of the processes of steps S300 and S305 being performed, the user may know a set value (the third value) of the aperture and input the set value (the third value) of the aperture to the imaging-setting device 11.

After the process of step S325 is performed, the process of step S320 may be performed. Further, after the process of step S340 is performed, the process of step S335 may be performed. Further, the process of step S340 may be performed before the process of step S330 is performed.

Figure 11:
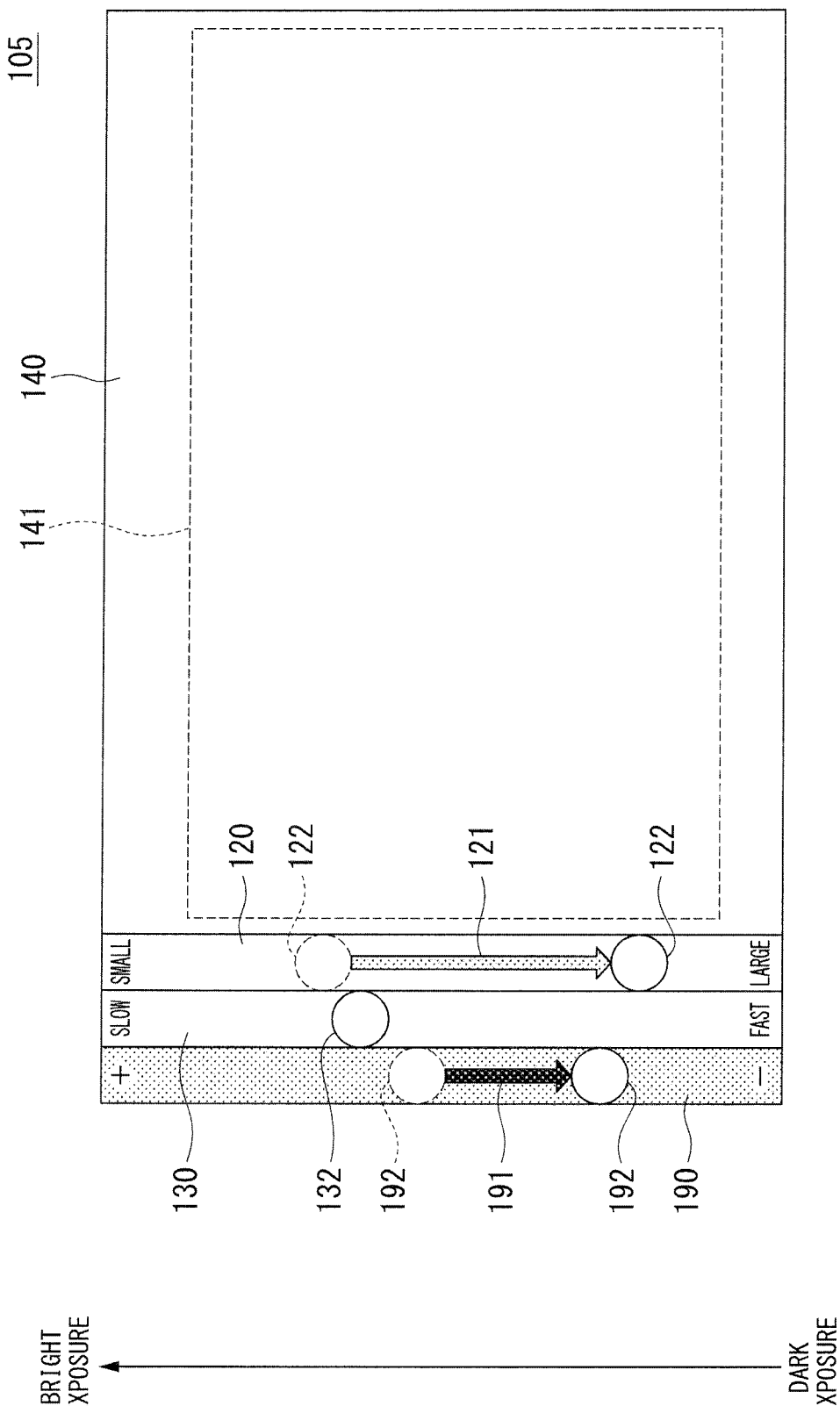
FIG. 11 is a reference diagram showing an example of a screen of a display unit in the second example of the first embodiment of the present invention.

FIG. 11 shows an example of the screen of the display unit 105. The display unit 105 displays the area 120, the area 130, an area 190, and the image area 140. The first difference information of the first control parameter is displayed in the area 120 and the area 130. Specifically, the first difference information of the aperture is displayed in the area 120. First difference information of the shutter speed is displayed in the area 130. The second difference information of the second control parameter is displayed in the area 190. Specifically, second difference information of the exposure is displayed in the area 190. An image based on the image data input from the imaging device 20 is displayed in the image area 140.

Shapes of the area 120, the area 130, and the area 190 are elongated rectangles in the vertical direction. The area 120, the area 130, and the area 190 are disposed to the left of the image area 140. The area 120 is adjacent to the image area 140. The area 130 is adjacent to the area 120. The area 190 is adjacent to the area 130. It is preferable that any one of the area 120 and the area 130 be adjacent to the area 190.

The display unit 105 displays the arrow 121 that is a figure indicating the first difference information of the aperture, and the circle 122 that is a figure indicating a set value of the aperture in the area 120. Since the area 120 has already been described, the description thereof will be omitted.

The display unit 105 displays an arrow that is a figure indicating the first difference information of the shutter speed, and the circle 132 that is a figure indicating a set value of the shutter speed in the area 130. In this example, since the value of the shutter speed is fixed, the arrow is not displayed in the area 130. Since the area 130 has already been described, the description thereof will be omitted.

The display unit 105 displays an arrow 191 that is a figure indicating the second difference information of the exposure, and a circle 192 that is a figure indicating a set value of the exposure in the area 190. That is, the display unit 105 displays the second difference information using the arrow 191. The circle 192 is displayed at a position of a head of the arrow 191.

A range of the area 190 corresponds to a range of values of the exposure that can be set in the imaging unit. In the area 190, an upper position corresponds to a value of the exposure at which the exposure increases. An upper end of the area 190 corresponds to a maximum value of the values of the exposure that can be set in the imaging unit. Further a lower position in the area 190 corresponds to a value of the exposure in which the exposure decreases. A lower end of the area 190 corresponds to a minimum value of the values of the exposure that can be set in the imaging unit. The input unit 102 may input the maximum value and the minimum value of the values of the exposure that can be set in the imaging unit from the imaging device 20. Further, the storage unit 103 may store the maximum value and the minimum value of the values of the exposure that can be set in the imaging unit.

The position of the head of the arrow 191 corresponds to a set value (a second value) of the exposure. A position of a tail of the arrow 191 corresponds to a reference value (a fourth value) of the exposure. For example, before a set value (a first value) of the aperture is set in the imaging unit, the circle 192 is displayed at the position of the tail of the arrow 191, and the arrow 191 is not displayed. The circle 192 before the set value (the first value) of the aperture is set in the imaging unit is indicated by a dashed line. A length of the arrow 191 indicates a magnitude of a difference between the set value (the second value) of the exposure and the reference value (the fourth value) of the exposure. The display unit 105 shows the set value (the second value) of the exposure or the reference value (the fourth value) of the exposure using the circle 192.

After the user moves the circle 122, the input unit 102 inputs the set value (the second value) of the exposure from the imaging device 20. The display unit 105 displays the circle 192 at a position corresponding to the set value (the second value) of the exposure in the area 190. Thus, the circle 192 is moved. Further, the display unit 105 displays the arrow 191.

For example, lengths of the area 120, the area 130, and the area 190 are the same. That is, the display unit 105 displays a range of the values of the aperture that can be set in the imaging unit, a range of values of shutter speed that can be set in the imaging unit, and a range of the values of the exposure that can be set in the imaging unit on the same scale.

The display unit 105 may display the arrow 121 in the first display form and display the arrow 191 in the second display form different from the first display form. For example, the arrow 121 and the arrow 191 may be displayed with different colors. The arrow 121 and the arrow 191 are may be displayed with different brightness. A pattern of the arrow 121 and a pattern of the arrow 191 may be different. A type of figure indicating the first difference information and a type of figure indicating the second difference information may be different. Accordingly, the user can easily identify the first control parameter and the second control parameter.

The display unit 105 may display the area 120 in the first display form and display the area 190 in the second display form different from the first display form. That is, the display unit 105 may display the arrow 121 in the area 120 displayed in the first display form, and display the arrow 191 in the area 190 displayed in the second display form different from the first display form. For example, the area 120 and the area 190 may be displayed with different colors. The area 120 and the area 190 may be displayed with different brightness. A pattern of the area 120 and a pattern of the area 190 may be different.

At least two of the area 120, the area 130, and the area 190 may be a single area. That is, the display unit 105 may display the first difference information and the second difference information in the same area. Alternatively, the display unit 105 may display a plurality of first difference information corresponding to a plurality of first control parameters in the same area.

The user can recognize the second difference information indicated by the arrow 191 according to the first difference information indicated by the arrow 121. That is, the user can visually recognize that the value of the exposure and the value of the aperture are in accordance with each other. Further, the user can visually recognize the amount of change in the exposure value corresponding to the amount of change in the value of the aperture.

Further, the user can visually recognize the value of the aperture indicated by the circle 122 and the value of the exposure indicated by the circle 192. For example, the user can visually recognize the value (the second value) of the exposure corresponding to the set value (the first value) of the aperture.

Therefore, the user can visually recognize a relationship between a plurality of control parameters that are in accordance with each other. Further, the user can learn a method of adjusting the plurality of control parameters.

In this example, the user can make the exposure more appropriate by setting the set value (the first value) of the aperture so that the arrow 191 is shorter, that is, the value of the exposure is closer to the recommended value of the exposure.

There exists a case in which the reference value (the fourth value) of the exposure is the recommended value of the exposure and a case in which the reference value (the fourth value) of the exposure is a previously set value of the exposure. The display unit 105 shows the first difference information in the area 120 (a first area). When the reference value (the fourth value) of the exposure is the recommended value of the exposure, the display unit 105 may show the second difference information in the area 190 (a second area) different from the area 120, which is displayed in the first display form. Further, when the reference value (the fourth value) of the exposure is the set value of the exposure, the display unit 105 may show the second difference information in the area 190 displayed in the second display form different from the first display form. For example the color of the area 190 is different in the two cases. In the two cases, the brightness of the area 190 may be different. In the two cases, the pattern of the area 190 may be different. Thus, the user can easily identify the recommended value of the exposure or the previously set value of the exposure. A message indicating whether the reference value (the fourth value) of the exposure is the recommended value of the exposure or the previously set value of the exposure may be displayed.

In the aperture priority mode or the shutter speed priority mode, the exposure is always a standard exposure. Accordingly, in the aperture priority mode or the shutter speed priority mode, the value of the exposure matches a standard exposure value which is the recommended value. In this case, a difference between the set value of the exposure and the recommended value of the exposure is 0, and the difference is constant.

The display unit 105 may show the second difference information in the first display form when the reference value (the fourth value) of the exposure is the recommended value of the exposure. Further, the display unit 105 may show the second difference information in the second display form different from the first display form when the reference value (the fourth value) of the exposure is the set value of the exposure. For example the arrows 191 may be displayed with different colors in the two cases. In the two cases, the arrow 191 may be displayed with different brightness. In the two cases, the pattern of the arrow 191 may be different.

The display unit 105 displays the image 141 based on the first image data generated by the imaging unit when the set value (the first value) of the aperture is set in the imaging unit in the image area 140. The display unit 105 may display the image 141 based on the second image data generated by the imaging unit when the reference value (the third value) of the aperture is set in the imaging unit in the image area 140.

The user can confirm the state of the image 141 which reflects the set value (the first value) of the aperture. That is, the user can confirm the state of the image 141 after the set value of the aperture is changed.

Third Example

This example will be described using the imaging-setting device 11 shown in FIG. 3. In this example, the input unit 102 inputs a third value that is a recommended value that is recommended as a value of a first control parameter from the imaging device 20. The storage unit 103 stores the third value input by the input unit 102, and a fourth value.

In this example, any of a plurality of modes is set in the imaging unit. A mode to be set in the imaging unit can be switched. In this example, an aperture priority mode in which a value of shutter speed is set so that exposure is appropriate in accordance with a set value of an aperture is set in the imaging unit. In this example, the first control parameter and a second control parameter are parameters regarding the exposure. In the aperture priority mode, the first control parameter is the aperture and the second control parameter is the shutter speed.

In this example, a first value of the first control parameter is the set value of the aperture. A second value of the second control parameter is the set value of the shutter speed. The third value of the first control parameter is a value of the aperture determined by the imaging device 20 before the first value is set in the imaging unit. The imaging device 20 determines environmental light from image data generated by the imaging unit, and determines a state of the exposure corresponding to the environmental light. Further, the imaging device 20 determines the value of the aperture so that the exposure is appropriate. By setting the set value of the aperture to the determined value of the aperture, the exposure is appropriate. Therefore, the determined value of the aperture is recommended as the set value of the aperture. An appropriate exposure state may be different for each photographed scene. The fourth value of the second control parameter is the set value of the shutter speed set in the imaging unit before the second value is set in the imaging unit.

Figure 12:
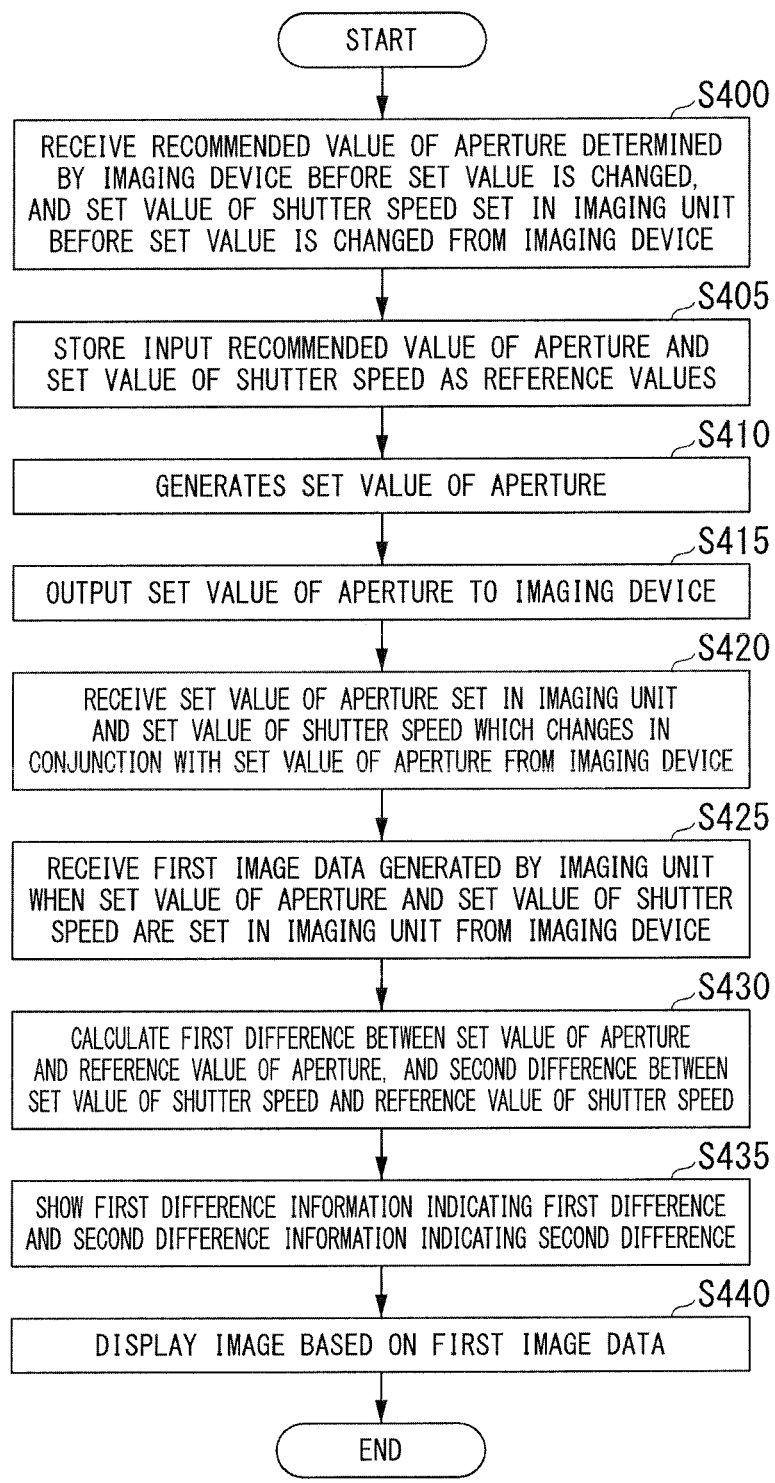
FIG. 12 is a flowchart showing a procedure of an operation of an imaging-setting device according to a third example of the first embodiment of the present invention.

An operation of the imaging-setting device 11 will be described with reference to FIG. 12. FIG. 12 shows a procedure of the operation of the imaging-setting device 11 regarding a setting of control parameters.

When the operation regarding a setting of control parameters is started, the input unit 102 inputs the recommended value (the third value) of the aperture determined by the imaging device 20 before the set value (the first value) of the aperture that is the first control parameter is set in the imaging unit. The input unit 102 inputs a set value (the fourth value) of the shutter speed set in the imaging unit before the set value (the second value) of the shutter speed that is the second control parameter is set in the imaging unit from the imaging device 20 (step S400).

After the recommended value (the third value) of the aperture and the set value (the fourth value) of the shutter speed are input, the storage unit 103 stores the recommended value (the third value) of the aperture input by the input unit 102 and the set value (the fourth value) of the shutter speed as reference values (step S405). The recommended value (the third value) of the aperture and the reference value (the fourth value) of the shutter speed may be stored in association with each other.

After the reference value is stored, the processes of steps S410 to S440 are performed. The processes of steps S410 to S440 are the same as the processes of steps S220 to S250 in FIG. 4.

The processes from step S410 to step S440 may be repeatedly performed. That is, the set value of the aperture may be repeatedly updated and the image may be updated accordingly. Further, the processes of steps S210 and S215 in FIG. 4 may be performed at a timing such as before the process of step S410 is performed.

The processes of steps S400 and S405 are arbitrary. That is, the processes of the steps S400 and S405 may not be performed. Instead of the processes of steps S400 and S405 being performed, the user may know the recommended value (the third value) of the aperture and the set value (the fourth value) of the shutter speed and input the values to the imaging-setting device 11.

After the process of step S425 is performed, the process of step S420 may be performed. Further, after the process of step S440 is performed, the process of step S435 may be performed. Further, the process of step S440 may be performed before the process of step S430 is performed.

Figure 13:
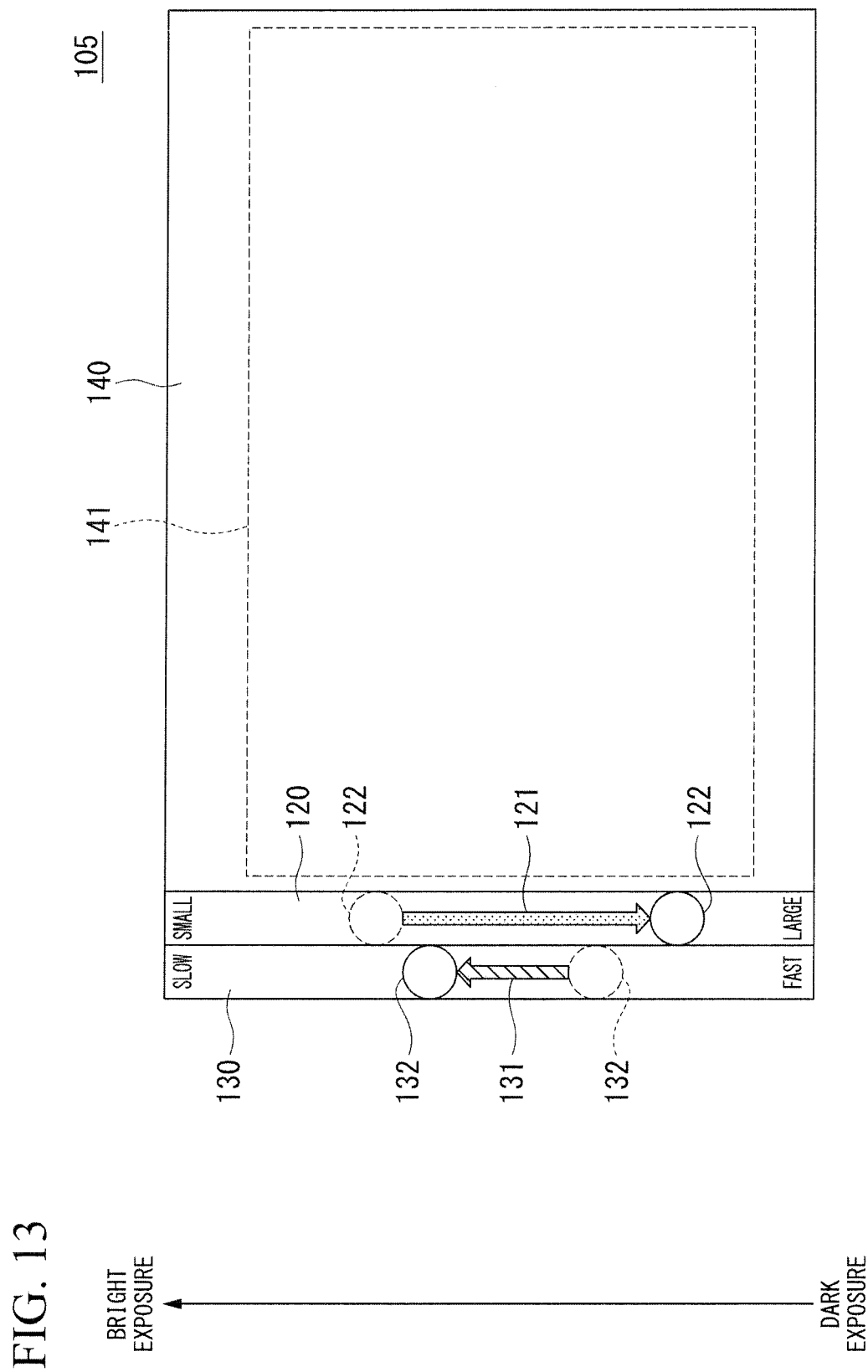
FIG. 13 is a reference diagram showing an example of a screen of a display unit in the third example of the first embodiment of the present invention.

FIG. 13 shows an example of a screen of the display unit 105. The display unit 105 displays the area 120, the area 130, and the image area 140. The first difference information of the first control parameter is displayed in the area 120. Specifically, the first difference information of the aperture is displayed in the area 120. The second difference information of the second control parameter is displayed in the area 130. Specifically, the second difference information of the shutter speed is displayed in the area 130. An image based on the image data input from the imaging device 20 is displayed in the image area 140.

The display unit 105 displays the arrow 121 that is a figure indicating the first difference information of the aperture and the circle 122 that is a figure indicating the set value of the aperture in the area 120. Since the area 120 has already been described, the description thereof will be omitted.

The display unit 105 displays the arrow 131 that is a figure indicating the second difference information of the shutter speed and the circle 132 that is a figure indicating the set value of the shutter speed in the area 130. Since the area 130 has already been described, the description thereof will be omitted.

The display unit 105 displays the image 141 based on first image data generated by the imaging unit when the set value (the first value) of the aperture and the set value (the second value) of the shutter speed are set in the imaging unit in the image area 140. The display unit 105 may also display the image 141 based on the second image data generated by the imaging unit when the reference value (the fourth value) of the shutter speed is set in the imaging unit in the image area 140.

The user can visually recognize a relationship between a plurality of control parameters that are in accordance with each other. Further, the user can learn a method of adjusting the plurality of control parameters. Further, the user can confirm the state of the image 141 which reflects the set value (the first value) of the aperture and the set value (the second value) of the shutter speed.

In this example, the user can make the exposure more appropriate by setting the set value (the first value) of the aperture so that the arrow 121 is shorter, that is, the set value of the exposure is closer to the recommended value of the exposure.

In the second example described above, the recommended value of the second control parameter in accordance with the first control parameter is displayed. Conversely, in this example, the recommended value of the first control parameter to be directly changed by the user is displayed. The operation is more easily understood in a case in which the value of the first control parameter is set so that the value of the first control parameter is close to the recommended value in comparison to a case in which the value of the first control parameter is set so that the value of the second control parameter is close to the recommended value.

Fourth Example

This example will be described using the imaging-setting device 11 shown in FIG. 3. In this example, the display unit 105 fixes a relative relationship between a position at which first difference information is displayed and a position at which second difference information is displayed.

In this example, any of a plurality of modes is set in the imaging unit. A mode to be set in the imaging unit can be switched. The display unit 105 fixes a relative relationship between the position at which the first difference information is displayed and the position at which the second difference information is displayed among the plurality of modes.

In this example, the display unit 105 fixes a relative relationship between the position at which the first difference information or the second difference information is displayed and a position at which an image based on first image data is displayed. The display unit 105 fixes a relative relationship between the position at which the first difference information or the second difference information is displayed and the position at which the image based on the first image data is displayed among the plurality of modes.

In this example, the display unit 105 shows the first difference information in a first area and shows the second difference information in a second area having a different display form from that of the first area. Further, the display unit 105 displays the image based on the first image data. Further, the display unit 105 displays the first area and the second area so that the first area is relatively more prominent than the second area.

Alternatively, in this example, the display unit 105 shows the first difference information in a first display form and shows the second difference information in a second display form different from the first display form. Further, the display unit 105 displays the image based on the first image data. Further, the display unit 105 shows the first difference information in the first display form and shows the second difference information in the second display form so that the first difference information is relatively more prominent than the second difference information.

In this example, the input unit 102 inputs a fifth value of a third control parameter different from the first control parameter among the plurality of control parameters from the imaging device 20. The storage unit 103 stores a sixth value of the third control parameter. The calculation unit 104 calculates a third difference between the fifth value and the sixth value. When the third difference is 0, the display unit 105 shows only the first difference information and the second difference information among the first difference information, the second difference information, and the fifth value. Further, the display unit 105 displays the image based on the first image data. That is, the display unit 105 hides third difference information based on the third difference, and the fifth value. In other words, the display unit 105 hides information on the third difference. The third control parameter is determined according to the mode set in the imaging unit.

In this example, the shutter speed priority mode in which the value of the aperture is set so that exposure is appropriate in accordance with the set value of the shutter speed is set in the imaging unit. In this example, the first control parameter, the second control parameter, and the third control parameter are parameters regarding the exposure. In the shutter speed priority mode, the first control parameter is the shutter speed, the second control parameter is the aperture, and the third control parameter is the exposure.

In this example, the first value of the first control parameter is the set value of the shutter speed. The second value of the second control parameter is the set value of the aperture. The third value of the first control parameter is the set value of the shutter speed set in the imaging unit before the first value is set in the imaging unit. The fourth value of the second control parameter is the set value of the aperture set in the imaging unit before the second value is set in the imaging unit. The fifth value of the third control parameter is the set value of the exposure corresponding to the first value.

In the shutter speed priority mode, the set value of the aperture is determined so that the exposure is appropriate, that is, so that the value of the exposure is a standard exposure value. Therefore, the fifth value is the standard exposure value, and the fifth value is constant when environmental light is constant. Further, in this example, the sixth value is the standard exposure value. In this case, the third difference is 0 and the third difference is constant. That is, the third control parameter is different from the first control parameter and the second control parameter, and the third difference is a constant control parameter.

Figure 14:
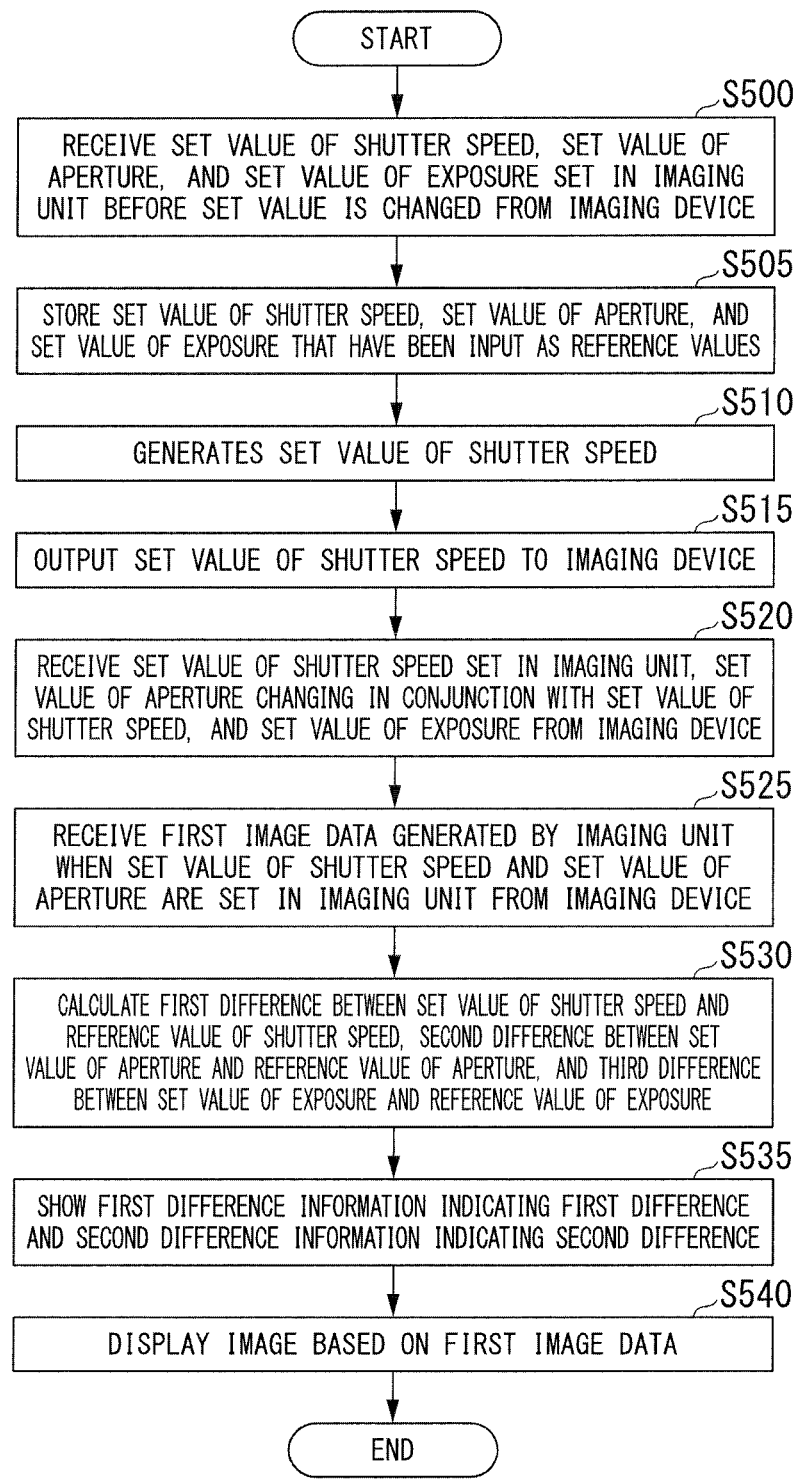
FIG. 14 is a flowchart showing a procedure of an operation of an imaging-setting device according to a fourth example of the first embodiment of the present invention.

An operation of the imaging-setting device 11 will be described with reference to FIG. 14. FIG. 14 shows a procedure of the operation of the imaging-setting device 11 regarding a setting of control parameters.

When the operation regarding a setting of control parameters is started, the input unit 102 inputs a set value (a third value) of shutter speed set in an imaging unit before a set value (a first value) of the shutter speed, that is, a first control parameter, is set in the imaging unit. Further, the input unit 102 inputs a set value (a fourth value) of an aperture set in the imaging unit before a set value (a second value) of the aperture, that is the second control parameter, is set in the imaging unit from the imaging device 20. The input unit inputs a set value (a sixth value) of exposure corresponding to the set value (the first value) of the shutter speed and the set value (the second value) of the aperture from the imaging device 20 (step S500). In the shutter speed priority mode, the set value (the sixth value) of the exposure is a standard exposure value.

After the set values are input, the storage unit 103 stores the set value (the third value) of the shutter speed, the set value (the fourth value) of the aperture, and the set value (the sixth value) of the exposure input by the input unit 102 as reference values (step S505). The reference value (the third value) of the shutter speed, the reference value (the fourth value) of the aperture, and the set value (the sixth value) of the exposure may be stored in association with each other.

After the reference values are stored, the processes of steps S510 and S515 are performed. The processes of steps S510 and S515 are the same as the processes of steps S220 and S225 in FIG. 4 except that the set value of the aperture is changed to the set value of the shutter speed.

After the set value (the first value) of the shutter speed is output, the input unit 102 inputs the set value (the first value) of the shutter speed set in the imaging unit, the set value (the second value) of the aperture that is changing in accordance with the set value (the first value) of the shutter speed, and the set value (the fifth value) of the exposure corresponding to such set values from the imaging device 20 (step S520). In the shutter speed priority mode, the set value (fifth value) of the exposure is a standard exposure value. Step S520 corresponds to step S110 in FIG. 2. Instead of the set value (the first value) of the shutter speed being input from the imaging device 20, the set value (the first value) of the shutter speed generated in step S510 may be stored in the storage unit 103. By the set value (the first value) of the shutter speed being input from the imaging device 20, the process is performed on the basis of the value actually set in the imaging device 20.

After the set values are input, the input unit 102 inputs the first image data generated by the imaging unit when the set value (the first value) of the shutter speed and the set value (the second value) of the aperture are set in the imaging unit from the imaging device 20 (step S525). For example, in step S525, the input unit 102 inputs the first image data including a moving image or a still image from the imaging device 20. Step S525 corresponds to step S115 in FIG. 2

After the first image data is input, the calculation unit 104 calculates a first difference between the set value (the first value) of the shutter speed input from the imaging device 20 and the reference value (the third value) of the shutter speed stored in the storage unit 103. Further, the calculation unit 104 calculates a second difference of the set value (the second value) of the aperture input from the imaging device 20 and the reference value (the fourth value) of the aperture stored in the storage unit 103. Further, the calculation unit 104 calculates a third difference between the set value (the fifth value) of the exposure input from the imaging device 20 and a reference value (a sixth value) of the exposure stored in the storage unit 103 (step S530). Step S530 corresponds to step S120 in FIG. 2.

After the first difference, the second difference, and the third difference are calculated, the processes of steps S535 and S540 are performed. The processes of steps S535 and S540 are the same as the processes of steps S245 and S250 in FIG. 4. As described above, since the third difference is 0, the display unit 105 hides the set value (the fifth value) of the exposure in step S535. The fifth value and the sixth value may be a difference from the standard exposure value rather than an absolute value of the exposure.

The processes of steps S510 to S540 may be repeatedly performed. That is, the set value of the shutter speed may be repeatedly updated and the image may be updated accordingly. Further, the processes of steps S210 and S215 in FIG. 4 may be performed at a timing such as before the process of step S510 is performed.

The processes of steps S500 and S505 are arbitrary. That is, the processes of steps S500 and S505 may not be performed. Instead of the processes of steps S500 and S505 being performed, the user may know the set value (the third value) of the shutter speed, the set value (the fourth value) of the aperture, and the set value (the sixth value) of the exposure and input the set values to the imaging-setting device 11.

After the process of step S525 is performed, the process of step S520 may be performed. Further, after the process of step S540 is performed, the process of step S535 may be performed. Further, the process of step S540 may be performed before the process of step S530 is performed.

Figure 15:
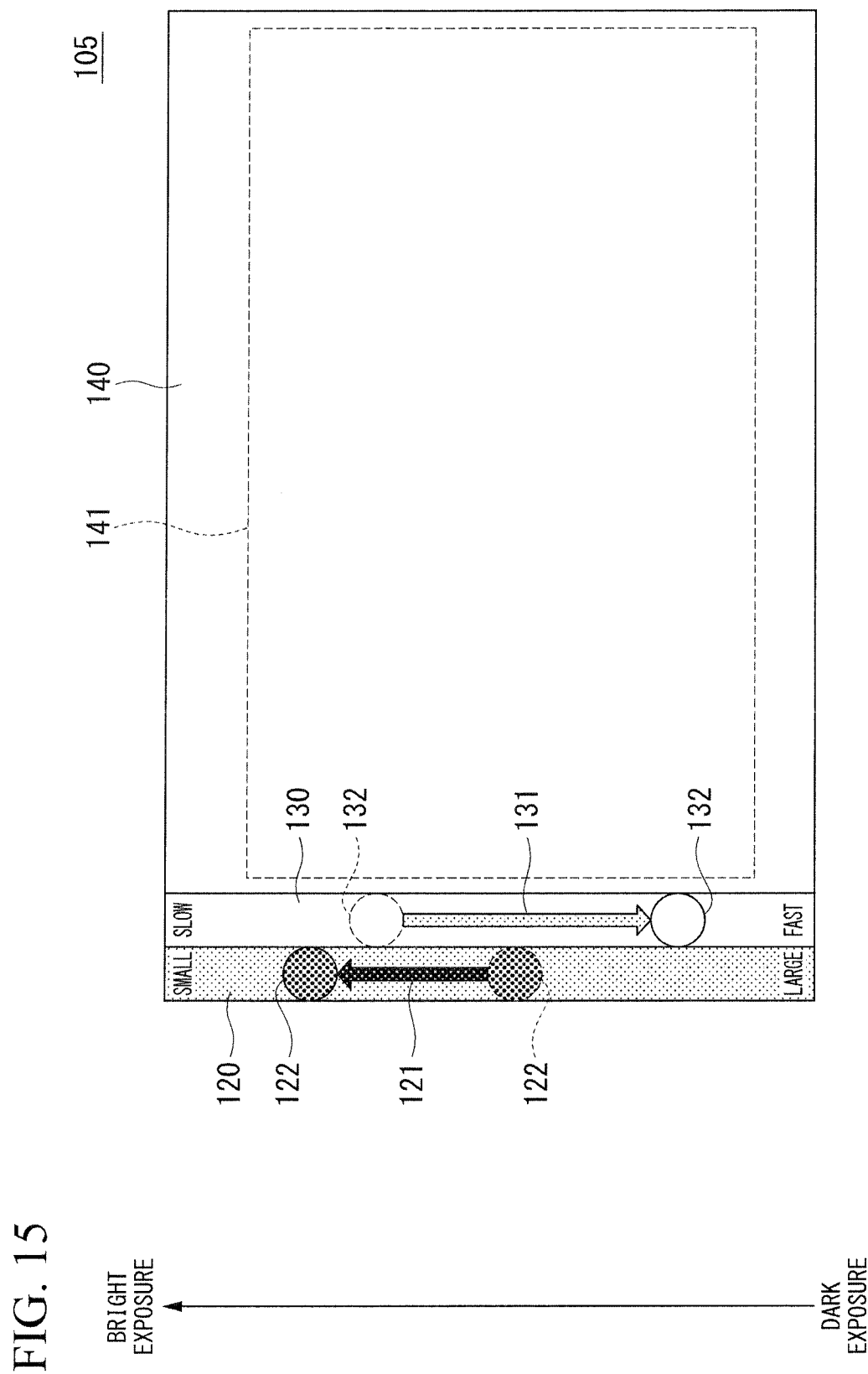
FIG. 15 is a reference diagram showing an example of a screen of a display unit in the fourth example of the first embodiment of the present invention.

FIG. 15 shows an example of a screen of the display unit 105. The display unit 105 displays the area 120, the area 130, and the image area 140. The first difference information of the first control parameter is displayed in the area 130. Specifically, the first difference information of the shutter speed is displayed in the area 130. The second difference information of the second control parameter is displayed in the area 120. Specifically, the second difference information of the aperture is displayed in the area 120. An image based on the image data input from the imaging device 20 is displayed in the image area 140.

The display unit 105 displays the arrow 131 that is a figure indicating the first difference information of the shutter speed and the circle 132 that is a figure indicating the set value of the shutter speed in the area 130. Since the area 130 has already been described, the description thereof will be omitted.

The display unit 105 displays the arrow 121 that is a figure indicating the second difference information of the aperture and the circle 122 that is a figure indicating the set value of the aperture in the area 120. Since the area 120 has already been described, the description thereof will be omitted.

The circle 132 is movable. The user moves the circle 132 by operating the operation unit 106. Accordingly, the operation unit 106 inputs an instruction for the set value (the first value) of the shutter speed from the user. The arrow 131 is displayed according to the movement of the circle 132. The operation unit 106 outputs information on a position of the circle 132 to the generation unit 100. The generation unit 100 generates the set value (the first value) of the shutter speed corresponding to the position of the circle 132. The operation unit 106 inputs only an instruction related to the movement of the circle 132 regarding the first control parameter among the first control parameter and the second control parameter. The operation unit 106 does not input an instruction related to the movement of the circle 122 regarding the second control parameter.

After the user moves the circle 132, the input unit 102 inputs the set value (the second value) of the aperture from the imaging device 20. The display unit 105 displays the circle 122 at a position corresponding to the set value (the second value) of the aperture in the area 120. Thus, the circle 122 is moved. Further, the display unit 105 displays the arrow 121.

The display unit 105 displays the image 141 based on the first image data generated by the imaging unit when the set value (the first value) of the shutter speed and the set value (the second value) of the aperture are set in the imaging unit in the image area 140. The display unit 105 may display the image 142 based on the second image data generated by the imaging unit when the reference value (the third value) of the shutter speed and the reference value (the fourth value) of the aperture are set in the imaging unit in the image area 140.

The user can visually recognize a relationship between a plurality of control parameters that are in accordance with each other. Further, the user can learn a method of adjusting the plurality of control parameters. Further, the user can confirm a state of the image 141 which reflects the set value (the first value) of the shutter speed and the set value (the second value) of the aperture.

In this example, the display unit 105 fixes a relative relationship between a position at which the first difference information of the first control parameter is displayed and a position at which the second difference information of the second control parameter is displayed. For example, the display unit 105 always displays an area in which the first difference information is displayed to the right relative to an area in which the second difference information is displayed. The display unit 105 fixes the relative relationship regardless of the mode. The relative relationship between the position at which the first difference information is displayed and the position at which the second difference information is displayed is constant among the plurality of modes.

Specifically, in the shutter speed priority mode, the display unit 105 displays the area 130 and shows the first difference information in the area 130. Further, the display unit 105 displays the area 120 so that the area 120 is adjacent to the area 130 and shows the second difference information in the area 120. In FIG. 15, the display unit 105 displays the area 120 to the left of the area 130 so that the area 120 is adjacent to the area 130 and shows the second difference information in the area 120.

Further, in the aperture priority mode, the display unit 105 displays the area 120 at a position of the area 130 in FIG. 15 and shows the first difference information in the area 120. Further, the display unit 105 displays the area 130 so that the area 130 is adjacent to the area 120 and shows the second difference information in the area 130. That is, the display unit 105 displays the area 130 to the left of the area 120 so that the area 130 is adjacent to the area 120 and shows the second difference information in the area 130.

In this example, the display unit 105 fixes a relative relationship between the position at which the first difference information of the first control parameter is displayed and a position at which the image is displayed. For example, the display unit 105 always displays the area in which the first difference information is displayed on the left relative to an area in which the image is displayed. The display unit 105 fixes the relative relationship regardless of the mode. The relative relationship between the position at which the first difference information is displayed and the position at which the image is displayed is constant among the plurality of modes.

Specifically, in the shutter speed priority mode, the display unit 105 displays the area 130 and shows the first difference information in the area 130. Further, the display unit 105 displays the image area 140 so that the image area 140 is adjacent to the area 130 and displays the image 141 in the image area 140. In FIG. 15, the display unit 105 displays the image area 140 to the right of the area 130 so that the image area 140 is adjacent to the area 130 and displays the image 141 in the image area 140.

Further, in the aperture priority mode, the display unit 105 displays the area 120 at the position of the area 130 in FIG. 15 and shows the first difference information in the area 120. Further, the display unit 105 displays the image area 140 so that the image area 140 is adjacent to the area 120 and displays the image 141 in the image area 140. That is, the display unit 105 displays the image area 140 to the right of the area 120 so that the image area 140 is adjacent to the area 120 and displays the image 141 in the image area 140.

The first difference information of the first control parameter is always displayed to the right of the second difference information of the second control parameter. Since a positional relationship is fixed regardless of the mode, the user can easily identify the first difference information and the second difference information. Further, the first difference information is always displayed to the left of the image 141. Since the positional relationship is fixed regardless of the mode, the user can easily identify the first difference information.

In this example, the display unit 105 displays the area 120 and the area 130 so that the area 130 in which the first difference information is displayed is relatively more prominent than the area 120 in which the second difference information is displayed. For example, the display unit 105 displays the area 120 in a color that is less prominent than that of the area 130.

The display unit 105 may show the first difference information in the first display form and show the second difference information in the second display form different from the first display form so that the first difference information is relatively more prominent than the second difference information. For example, the display unit 105 may display the circle 122 indicating the second difference information in a color that is less prominent than that of the circle 132 indicating the first difference information.

By the area 130 in which the first difference information is displayed or the circle 132 indicating the first difference information being more prominent, the user can easily identify the first control parameter of a target of set value designation.

In this example, the display unit 105 hides the fifth value of the exposure since the third difference between the fifth value of the exposure and the sixth value of the exposure is 0. That is, the display unit 105 shows only the first value and the third value of the first control parameter and the second value and the fourth value of the second control parameter among the first value and the third value of the first control parameter, the second value and the fourth value of the second control parameter, and the fifth value of the third control parameter.

For example, if the manual mode is set, the area 190 regarding the exposure is displayed, and the second difference information is displayed in the area 190 as shown in FIG. 11. If the mode is changed from the manual mode to the shutter speed priority mode, the third difference regarding the exposure is zero. Therefore, the area 190 is not displayed as shown in FIG. 15.

As described above, only the information on the first control parameter that is important to determine the exposure among the plurality of control parameters and the information regarding the second control parameter in accordance with the first control parameter are displayed. Therefore, the user easily focuses on the information on the first control parameter and the information on the second control parameter. Further, since the information on the third control parameter is not displayed, it is possible to display the image 141 in a wider area. Therefore, visibility of the image 141 is improved.

Fifth Example

This example will be described using the imaging-setting device 11 shown in FIG. 3. In this example, the input unit 102 inputs a fifth value of a third control parameter different from a first control parameter among a plurality of control parameters from the imaging device 20. The storage unit 103 stores a sixth value of the third control parameter. The calculation unit 104 calculates a third difference between the fifth value and the sixth value. If the third difference between the fifth value and the sixth value is 0, the display unit 105 shows the fifth value. That is, the display unit 105 hides the third difference information based on the third difference and shows the fifth value. In other words, the display unit 105 shows only the fifth value of information related to the third difference.

In this example, any of a plurality of modes is set in the imaging unit. A mode to be set in the imaging unit can be switched. The third control parameter is determined according to the mode set in the imaging unit.

The plurality of modes include the manual mode and at least one of the aperture priority mode and the shutter speed priority mode.

In the aperture priority mode, the value of shutter speed is set so that exposure is appropriate in accordance with a set value of an aperture. In the aperture priority mode, the first control parameter is the aperture and the second control parameter is the shutter speed. In the shutter speed priority mode, a value of the aperture is set so that the exposure is appropriate in accordance with the set value of the shutter speed. In the shutter speed priority mode, the first control parameter is the shutter speed and the second control parameter is the aperture. In the manual mode, the value of the aperture and the value of the shutter speed are set on the basis of an instruction from a user. In the manual mode, the first control parameter is the aperture and the shutter speed and the second of the control parameter is exposure.

In this example, the display unit 105 fixes a relative relationship between positions at which first difference information or second difference information of a plurality of control parameters is displayed among the plurality of control parameters.

In this example, the display unit 105 shows the first difference information in a first area and shows the second difference information in a second area having a different display form from that of the first area. Further, the display unit 105 displays an image based on first image data. Further, the display unit 105 displays the first area and the second area so that the first area is relatively more prominent than the second area.

Alternatively, in this example, the display unit 105 shows the first difference information in a first display form and shows the second difference information in a second display form different from the first display form. Further, the display unit 105 displays the image based on the first image data. Further, the display unit 105 shows the first difference information in the first display form and shows the second difference information in the second display form so that the first difference information is relatively more prominent than the second difference information.

In this example, the display unit 105 displays information for identifying the first difference information and the second difference information.

In this example, the shutter speed priority mode in which the value of the aperture is set so that exposure is appropriate in accordance with the set value of the shutter speed is set in the imaging unit. In this example, the first control parameter, the second control parameter, and the third control parameter are parameters regarding the exposure. In the shutter speed priority mode, the first control parameter is the shutter speed, the second control parameter is the aperture, and the third control parameter is the exposure.

In this example, the first value of the first control parameter is the set value of the shutter speed. The second value of the second control parameter is the set value of the aperture. The third value of the first control parameter is the set value of the shutter speed set in the imaging unit before the first value is set in the imaging unit. The fourth value of the second control parameter is the set value of the aperture set in the imaging unit before the second value is set in the imaging unit. The fifth value of the third control parameter is the set value of the exposure corresponding to the first value.

In the shutter speed priority mode, the set value of the aperture is determined so that the exposure is appropriate, that is, so that the value of the exposure is a standard exposure value. Therefore, the fifth value is the standard exposure value. If environmental light is constant, the fifth value is constant. Further, in this example, the sixth value is the standard exposure value. In this case, the third difference is 0 and the third difference is constant. That is, the third control parameter is different from the first control parameter and the second control parameter, and the third difference is a constant control parameter.

Figure 16:
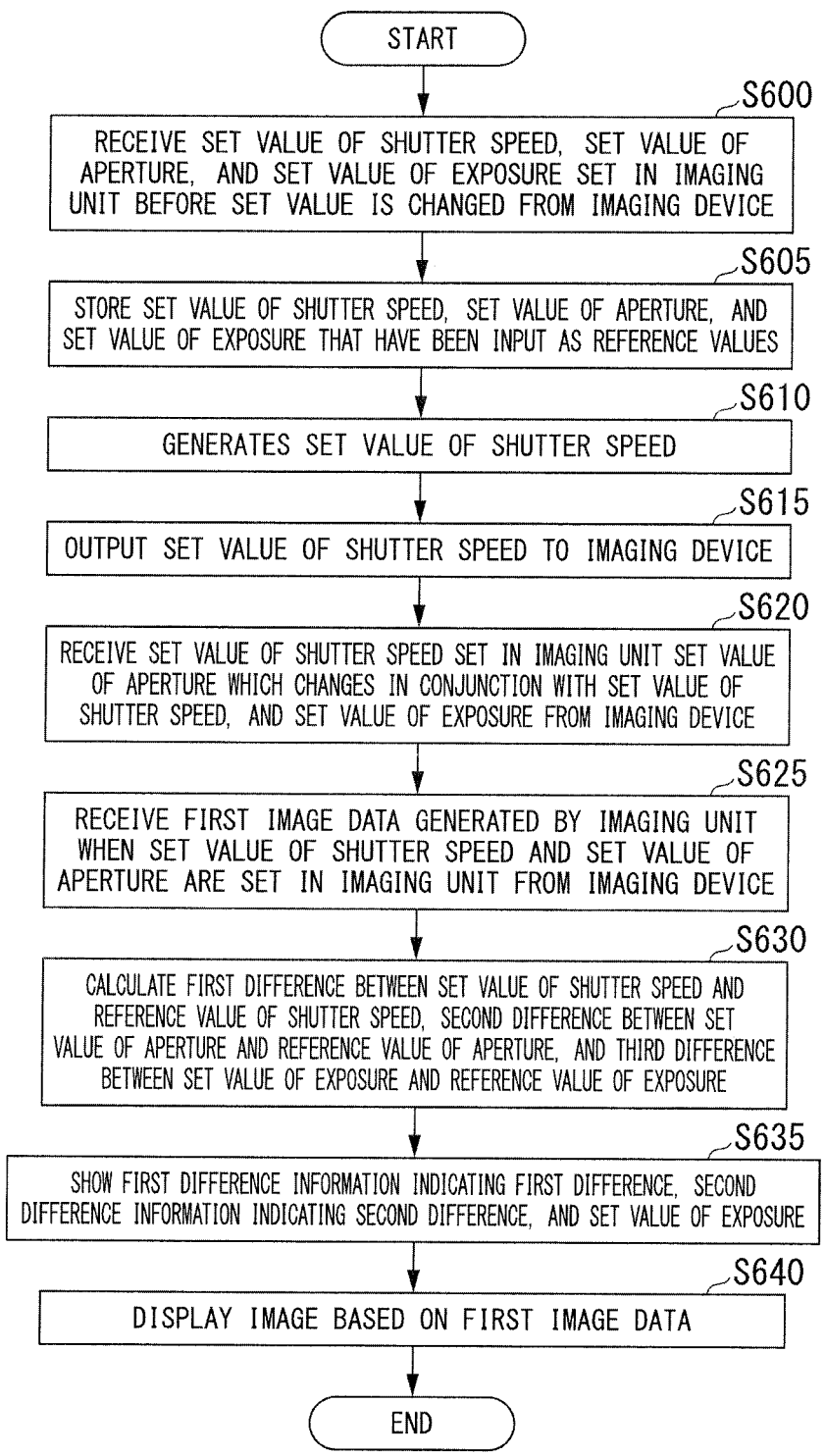
FIG. 16 is a flowchart showing a procedure of an operation of an imaging-setting device according to a fifth example of the first embodiment of the present invention.

Referring to FIG. 16, an operation of the imaging-setting device 11 will be described. FIG. 16 shows a procedure of an operation of the imaging-setting device 11 regarding a setting of control parameters.

When the operation regarding a setting of control parameters is started, processes of steps S600 to S630 are performed. The processes of steps S600 to S630 are the same as the processes of steps S500 to S530 in FIG. 14.

After the first difference, the second difference, and the third difference are calculated in step S630, the display unit 105 shows first difference information indicating the first difference, second difference indicating the second difference information, and the set value (the fifth value) of the exposure (step S635). Step S635 corresponds to step S125 in FIG. 2. As described above, since the third difference is 0, the display unit 105 does not show the third difference and shows the set value (the fifth value) of the exposure in step S635. The fifth value and the sixth value may be a difference from the standard exposure value rather than an absolute value of the exposure.

After the first difference information, the second difference information, and the set value (the fifth value) of the exposure are shown, the display unit 105 displays the image based on the first image data input by the input unit 102 (step S640). For example, in step S640, the display unit 105 displays a moving image or a still image based on the first image data. Step S640 corresponds to step S130 in FIG. 2.

The processes of steps S610 to S640 may be repeatedly performed. That is, the set value of the shutter speed may be repeatedly updated and the image may be updated accordingly. Further, the processes of steps S210 and S215 in FIG. 4 may be performed at a timing such as before the process of step S610 is performed.

The processes of steps S600 and S605 are arbitrary. That is, the processes of steps S600 and S605 may not be performed. Instead of the processes of steps S600 and S605 being performed, the user may know the set value (the third value) of the shutter speed, the set value (the fourth value) of the aperture, and the set value (the sixth value) of the exposure and input the set values to the imaging-setting device 11.

After the process of step S625 is performed, the process of step S620 may be performed. Further, after the process of step S640 is performed, the process of step S635 may be performed. Further, the process of step S640 may be performed before the process of step S630 is performed.

Figure 17:
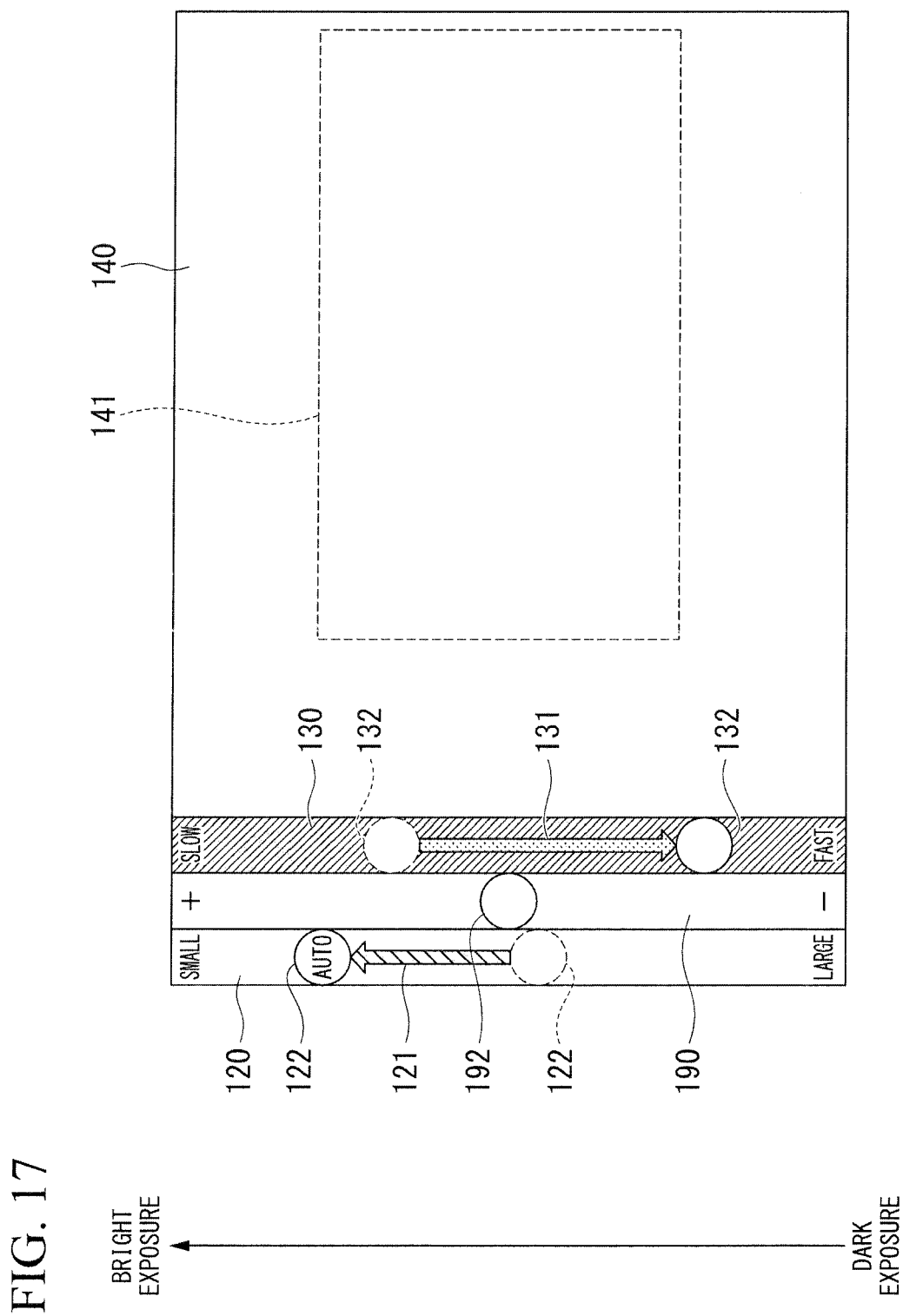
FIG. 17 is a reference diagram showing an example of a screen of a display unit in the fifth example of the first embodiment of the present invention.

FIG. 17 shows an example of a screen of the display unit 105. The display unit 105 displays the area 120, the area 130, the area 190, and the image area 140. The first difference information of the first control parameter is displayed in the area 130. Specifically, the first difference information of the shutter speed is displayed in the area 130. The second difference information of the second control parameter is displayed in the area 120. Specifically, the second difference information of the aperture is displayed in the area 120. A figure indicating the fifth value of the third control parameter is displayed in the area 190. Specifically, the figure indicating the fifth value of the exposure is displayed in the area 190. An image based on the image data input from the imaging device 20 is displayed in the image area 140.

The display unit 105 displays the arrow 131 that is a figure indicating the first difference information of the shutter speed and the circle 132 that is a figure indicating the set value of the shutter speed in the area 130. Since the area 130 has already been described, the description thereof will be omitted.

The display unit 105 displays the arrow 121 that is a figure indicating the second difference information of the aperture and the circle 122 that is a figure indicating the set value of the aperture in the area 120. Since the area 120 has already been described, the description thereof will be omitted.

The display unit 105 displays the circle 192 that is a figure indicating the set value (the fifth value) of the exposure in the area 190. As described above, the range of the area 190 corresponds to a range of values of the exposure that can be set in the imaging unit. The circle 192 is displayed at a position corresponding to the set value (the fifth value) of the exposure input from the imaging device 20 in the area 190.

The display unit 105 displays the image 141 based on the first image data generated by the imaging unit when the set value (the first value) of the shutter speed and the set value (the second value) of the aperture are set in the imaging unit in the image area 140. The display unit 105 may display the image 142 based on the second image data generated by the imaging unit when the reference value (the third value) of the shutter speed and the reference value (the fourth value) of the aperture are set in the imaging unit in the image area 140.

The user can visually recognize a relationship between a plurality of control parameters that are in accordance with each other. Further, the user can learn a method of adjusting the plurality of control parameters. Further, the user can confirm the state of the image 141 which reflects the set value (the first value) of the shutter speed and the set value (the second value) of the aperture.

Since the value of the exposure that is the third control parameter in which the third difference is 0 is shown, the user may identify the third control parameter in which the third difference is 0.

In this example, the display unit 105 fixes a relative relationship between positions at which the first difference information or the second difference information of the plurality of control parameters is displayed among the plurality of control parameters regardless of the modes. The relative relationship between the positions at which the first difference information or the second difference information of the plurality of control parameters is displayed is constant among the plurality of modes or among the plurality of control parameters. In this example, the plurality of control parameters are shutter speed, aperture, and exposure. A relative relationship between positions at which the first difference information or the second difference information of the shutter speed, and the first difference information or the second difference information of the aperture is constant among the plurality modes or the plurality of control parameters.

When the mode set in the imaging unit is changed from the shutter speed priority mode to the priority mode aperture, the relative relationship between the positions at which information on the plurality of control parameters is displayed is fixed. In the shutter speed priority mode, the area 190 is displayed adjacent to the area 130, and the area 120 is displayed adjacent to the area 190 as shown in FIG. 17. A relative relationship between positions of the area 130 regarding the shutter speed, the area 190 regarding the exposure, and the area 120 regarding the aperture is unchanged after the mode is changed to the aperture priority mode. That is, after the mode is changed to the aperture priority mode, an order in which respective areas are arranged is the same as the order when the mode is the shutter speed priority mode.

Since the relative relationship between the positions at which information on the plurality of control parameters is displayed is fixed, the user easily recognizes the plurality of control parameters even when the mode is changed.

In this example, the display unit 105 displays the area 120 and the area 130 so that the area 130 in which the first difference information is displayed is relatively more prominent than the area 120 in which the second difference information is displayed. For example, the display unit 105 displays the area 130 in a color more prominent than that of the area 120.

The display unit 105 may show the first difference information in the first display form and show the second difference information in the second display form different from the first display form so that the first difference information is relatively more prominent than the second difference information. For example, the display unit 105 may display the circle 122 indicating the second difference information in a color that is less prominent than that of the circle 132 indicating the first difference information.

In this example, the display unit 105 displays information for identifying the first difference information and the second difference information in the area 130 in which the first difference information is displayed or the area 120 in which the second difference information is displayed. In FIG. 17, the word "AUTO" is displayed in the circle 122 in the area 120. This allows the user to know that the value of the aperture is set automatically, that is, that the value of the aperture is in accordance with the value of the shutter speed. That is, the user can easily identify the first control parameter and the second control parameter. A word indicating that the user is able to directly set the value may be displayed in the area 130.

The display unit 105 may display the area 130, the area 120, and the area 190 so that the area 130 in which the first difference information is displayed and the area 120 in which the second difference information is displayed are more prominent than the area 190 in which the value of the exposure is displayed. Alternatively, the display unit 105 may display the first difference information and the second difference information so that the first difference information and the second difference information are more prominent than the value of the exposure. Thus, the user can easily identify the control parameter of which the value changes and the control parameter of which the value does not change.

Sixth Example

This example will be described using the imaging-setting device 11 shown in FIG. 3. In this example, the storage unit 103 stores second image data generated by an imaging unit when a third value of a first control parameter and the fourth value of a second control parameter are set in the imaging unit, the third value, and the fourth value in association with one another. The display unit 105 displays an image based on the second image data.

In this example, the input unit 102 inputs the second image data generated by the imaging unit when the third value of the first control parameter and the fourth value of the second control parameter are set in the imaging unit, which is the second image data to which the third value and the fourth value are added, from the imaging device 20. The storage unit 103 stores the second image data input by the input unit 102.

In this example, the display unit 105 displays a numerical value indicating a first value of the first control parameter or a numerical value indicating the second value of the second control parameter.

In this example, an aperture priority mode in which a value of shutter speed is set so that exposure is appropriate in accordance with a set value of an aperture is set in the imaging unit. In this example, the first control parameter, the second control parameter, and a third control parameter are parameters regarding the exposure. In the aperture priority mode, the first control parameter is the aperture, the second control parameter is the shutter speed, and the third control parameter is the exposure.

In this example, the first value of the first control parameter is the set value of the aperture. The second value of the second control parameter is the set value of the shutter speed. The third value of the first control parameter is a set value of the aperture set in the imaging unit before the first value is set in the imaging unit. The fourth value of the second control parameter is a set value of the shutter speed set in the imaging unit before the second value is set in the imaging unit. A fifth value of the third control parameter is a set value of the exposure corresponding to the first value.

In the aperture priority mode, the set value of the shutter speed is determined so that the exposure is appropriate, that is, so that the value of the exposure is a standard exposure value. Therefore, the fifth value is the standard exposure value. If environmental light is constant, the fifth value is constant. Further, in this example, a sixth value is the standard exposure value. In this case, a third difference is 0, and the third difference is constant. That is, the third control parameter is different from the first control parameter and the second control parameter, and the third difference is a constant control parameter.

Figure 18:
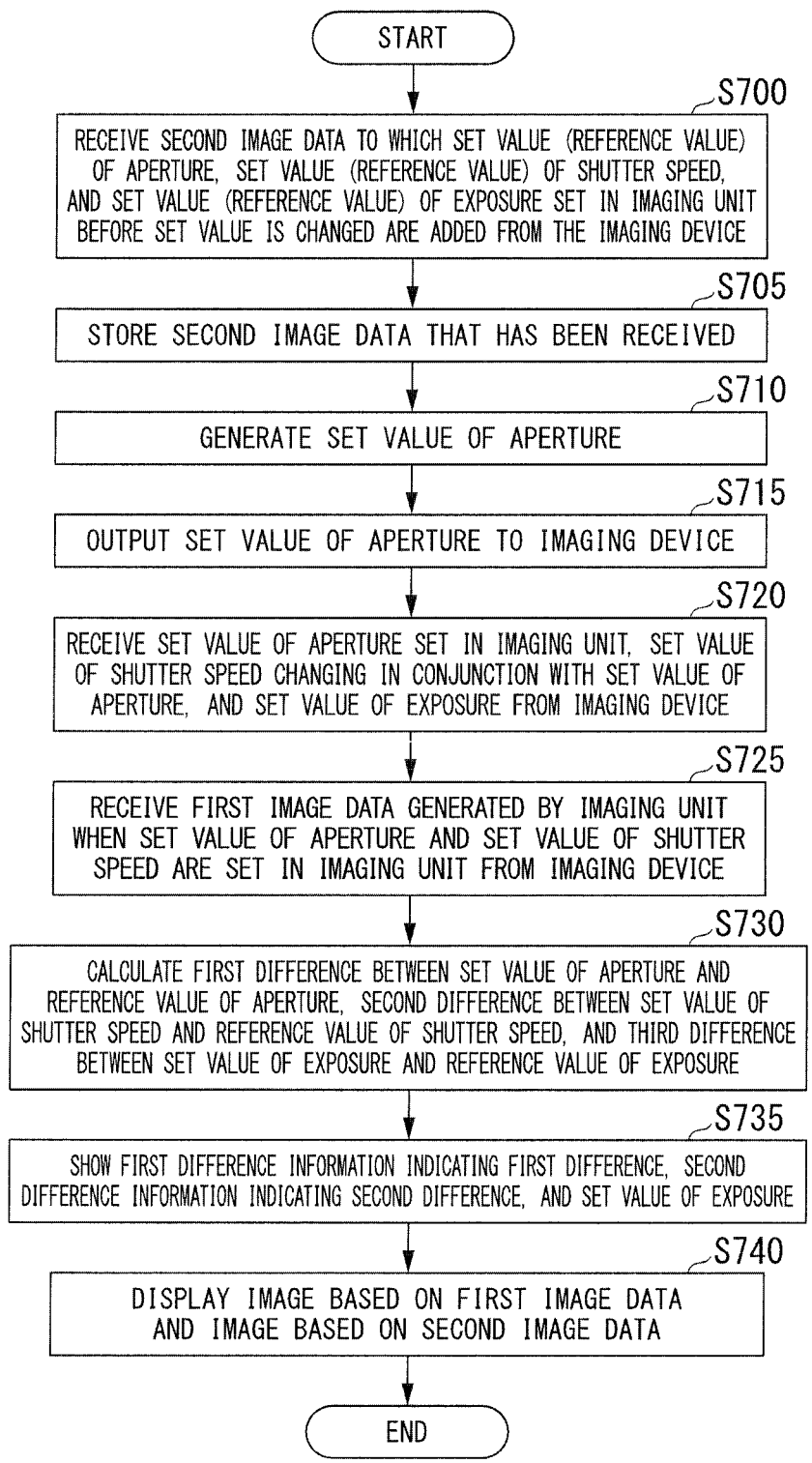
FIG. 18 is a flowchart showing a procedure of an operation of an imaging-setting device according to a sixth example of the first embodiment of the present invention.

An operation of the imaging-setting device 11 will be described with reference to FIG. 18. FIG. 18 shows a procedure of an operation of the imaging-setting device 11 regarding a setting of control parameters.

When the operation regarding a setting of control parameters is started, the input unit 102 inputs second image data to which a set value (a third value) of an aperture and a set value (a fourth value) of shutter speed set in an imaging unit before a set value (a first value) of the aperture that is a first control parameter and a set value (a second value) of the shutter speed that is a second control parameter are set in the imaging unit, and a set value (a sixth value) of exposure corresponding to the set values are added from the imaging device 20 (step S700). For example, the input unit 102 inputs one item of the second image data including a still image from the imaging device 20. For example, the set value (the third value) of the aperture, the set value (the fourth value) of the shutter speed, and the set value (the sixth value) of the exposure are included in attribute data of the second image data. The set value (the third value) of the aperture added to the second image data is a reference value of the aperture. The set value (the fourth value) of the shutter speed added to the second image data is a reference value of the shutter speed. The set value (the sixth value) of the exposure added to the second image data is a reference value of the exposure.

After the second image data is input, the storage unit 103 stores the second image data input by the input unit 102 (step S705). The set value (the third value) of the aperture, the set value (the fourth value) of the shutter speed, and the set value (the sixth value) of the exposure are added to the second image data. Therefore, in step S705, the storage unit 103 stores the second image data, the set value (the third value) of the aperture, the set value (the fourth value) of the shutter speed, and the set value (the sixth value) of the exposure in association with each other.

After the second image data is stored, the processes of steps S710 and S715 are performed. The processes of steps S710 and S715 are the same as the processes of steps S220 and S225 in FIG. 4.

After the set value (the first value) of the aperture is output in step S715, the input unit 102 inputs the set value (the first value) of the aperture set in the imaging unit, the set value (the second value) of the shutter speed changing in accordance with the set value (the first value) of the aperture, and the set value (the fifth value) of the exposure from the imaging device 20 (step S720). Step S720 corresponds to step S110 in FIG. 2. Instead of the set value (the first value) of the aperture being input from the imaging device 20, the set value (the first value) of the aperture generated in step S710 may be stored in the storage unit 103. By the set value (the first value) of the aperture being input from the imaging device 20, the process is performed on the basis of the value actually set in the imaging device 20.

After the set values are input, the processes of step S725 and step S730 are performed. Processes of step S725 and step S730 are the same as the processes of steps S625 and S630 in FIG. 16 except that the set value of the aperture and the set value of the shutter speed are replaced.

After a first difference and a second difference are calculated in step S730, the display unit 105 shows first difference information indicating the first difference, second difference information indicating the second difference, and the set value (the fifth value) of the exposure (step S735). Step S735 corresponds to step S125 in FIG. 2. In a case in which environmental light is the same when the second image data is generated and when the first image data is generated, the third difference is 0. Therefore, in step S735, the display unit 105 does not show the third difference and shows the set value (fifth value) of the exposure. The fifth value and the sixth value may be differences from the standard exposure value rather than absolute values of the exposure.

After the first difference information, the second difference information, and the set value (the fifth value) of the exposure are shown, the display unit 105 displays an image based on the first image data input by the input unit 102. Further, the display unit 105 displays the image based on the second image data stored in the storage unit 103 (step S740). For example, in step S740, the display unit 105 displays a moving image or a still image based on the first image data. In step S740, the display unit 105 displays a still image based on the second image data. Step S740 corresponds to step S130 in FIG. 2.

In step S735, the set value (the fifth value) of the exposure may not be shown. In this case, the third difference may not be calculated in step S730. Further, in step S720, the set value (the fifth value) of the exposure may not be input from the imaging device 20. Further, the set value (the sixth value) of the exposure may not be added to the second image data.

The processes of steps S710 to S740 may be repeatedly performed. That is, the set value of the aperture may be repeatedly updated, and the image may be updated accordingly.

After the process of step S725 is performed, the process of step S720 may be performed. Further, after the process of step S740 is performed, the process of step S735 may be performed. Further, the process of step S740 may be performed before the process of step S730 is performed.

Figure 19:
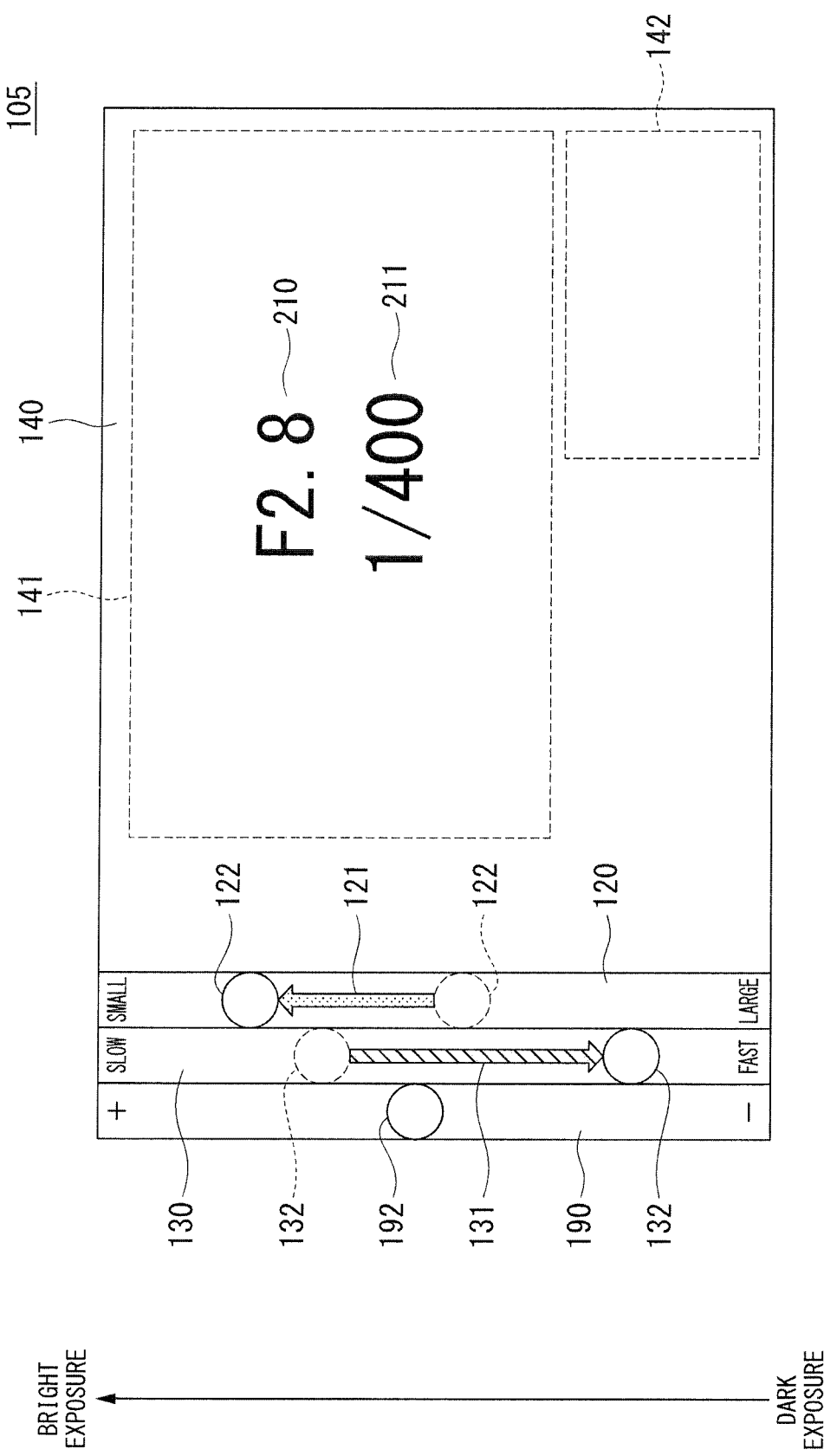
FIG. 19 is a reference diagram showing an example of a screen of a display unit in the sixth example of the first embodiment of the present invention.

FIG. 19 shows an example of a screen of the display unit 105. The display unit 105 displays the area 120, the area 130, the area 190, and the image area 140. The first difference information of the first control parameter is displayed in the area 120. Specifically, the first difference information of the aperture is displayed in the area 120. The second difference information of the second control parameter is displayed in the area 130. Specifically, the second difference information of the shutter speed is displayed in the area 130. A figure indicating the fifth value of the third control parameter is displayed in the area 190. Specifically, a figure indicating the fifth value of the exposure is displayed in the area 190. An image based on the image data input from the imaging device 20 is displayed in the image area 140.

The display unit 105 displays the arrow 121 that is a figure indicating the first difference information of the aperture and the circle 122 that is a figure indicating the set value of the aperture in the area 120. Since the area 120 has already been described, the description thereof will be omitted.

The display unit 105 displays the arrow 131 that is a figure indicating the second difference information of the shutter speed and the circle 132 that is a figure indicating the set value of the shutter speed in the area 130. Since the area 130 has already been described, the description thereof will be omitted.

The display unit 105 displays the circle 192 that is a figure indicating the set value (the fifth value) of the exposure in the area 190. As described above, a range of the area 190 corresponds to a range of values of the exposure that can be set in the imaging unit. Since the area 190 has already been described, the description thereof will be omitted.

The display unit 105 displays, in the image area 140, the image 141 based on the first image data generated by the imaging unit when the set value (the first value) of the aperture and the set value (the second value) of the shutter speed are set in the imaging unit. Further, the display unit 105 displays, in the image area 140, the image 142 based on the second image data generated by the imaging unit when the reference value (the third value) of the aperture and the reference value (the fourth value) of the shutter speed are set in the imaging unit. The display unit 105 may not display the image 142.

The display unit 105 displays a numerical value 210 indicating the set value (the first value) of the aperture and a numerical value 211 indicating the set value (the second value) of the shutter speed in the image area 140. The display unit 105 may display the numerical value 210 in the area 120 in which the first difference information of the aperture is displayed. The display unit 105 may display the numerical value 211 in the area 130 in which the second difference information of the shutter speed is displayed. Further, the display unit 105 may display only any one of the numerical value 210 and the numerical value 211. The display unit 105 may not display the numerical value 210 and the numerical value 211.

The user can visually recognize a relationship between a plurality of control parameters that are in accordance with each other. Further, the user can learn a method of adjusting the plurality of control parameters. Further, the user can confirm the state of the image 141 which reflects the set value (the first value) of the aperture and the set value (the second value) of the shutter speed. Further, the user can confirm the state of the image 142 which reflects the reference value (the third value) of the aperture and the reference value (the fourth value) of the shutter speed.

The user can determine the set value (the first value) of the aperture and the set value (the second value) of the shutter speed by referring to the reference value (the third value) of the aperture and the reference value (the fourth value) of the shutter speed added to the second image data stored in the storage unit 103. The second image data input from the imaging device 20 may be any image data stored in the imaging device 20. The user can select the second image data in order to display an image for reference such as an image close to a captured image.

The user can determine the set value (the first value) of the aperture and the set value (the second value) of the shutter speed by referring to the numerical value 210 indicating the set value (the first value) of the aperture and the numerical value 211 indicating the set value (the second value) of the shutter speed.

Seventh Example

This example will be described using the imaging-setting device 11 shown in FIG. 3. In this example, a plurality of second control parameters are in accordance with first control parameters.

In this example, any of a plurality of modes is set in an imaging unit. A mode to be set in the imaging unit can be switched. The plurality of modes include at least two of a manual mode, an aperture priority mode, a shutter speed priority mode, and a program mode.

In the manual mode, a value of an aperture and a value of shutter speed are set on the basis of an instruction from a user. In the manual mode, first control parameters are the aperture and the shutter speed and the second control parameter is exposure. In the aperture priority mode, the value of the shutter speed is set so that the exposure is appropriate in accordance with the set value of the aperture. In the aperture priority mode, the first control parameter is the aperture and the second control parameter is the shutter speed. In the shutter speed priority mode, the value of the aperture is set so that the exposure is appropriate in accordance with the set value of the shutter speed. In the shutter speed priority mode, the first control parameter is the shutter speed and the second control parameter is the aperture. In the program mode, the first control parameter is the exposure and second control parameters are the aperture, the shutter speed, and ISO sensitivity. The second control parameter may not be the ISO sensitivity.

In this example, the generation unit 100 generates a first value of the first control parameter determined to correspond to the mode set in the imaging unit among the plurality of control parameters. For example, if the aperture priority mode is set, the generation unit 100 generates a first value of the aperture. Further, when the shutter speed priority mode is set, the generation unit 100 generates a first value of the shutter speed. Further, if the manual mode is set, the generation unit 100 generates the first value of the aperture and the first value of the shutter speed. Further, if the program mode is set, the generation unit 100 generates a first value of the exposure. Thus, the generation unit 100 switches the value of the first control parameter to be generated according to the mode set in the imaging unit.

In this example, the program mode for setting the value of the aperture and the value of the shutter speed is set in the imaging unit in accordance with a set value of the exposure. In this example, the first control parameter and the plurality of second control parameters are parameters regarding the exposure. In the program mode, the first control parameter is the exposure, and the plurality of second control parameters are the aperture, the shutter speed, and the ISO sensitivity.

In this example, the first value of the first control parameter is the set value of the exposure. Second values of the plurality of second control parameters are a set value of the aperture, a set value of the shutter speed, and a set value of the ISO sensitivity. A third value of the first control parameter is a set value of the exposure set in the imaging unit before the first value is set in the imaging unit. Fourth values of the plurality of second control parameters are a set value of the aperture, a set value of the shutter speed, and a set value of the ISO sensitivity set in the imaging unit before the second values are set in the imaging unit.

Figure 20:
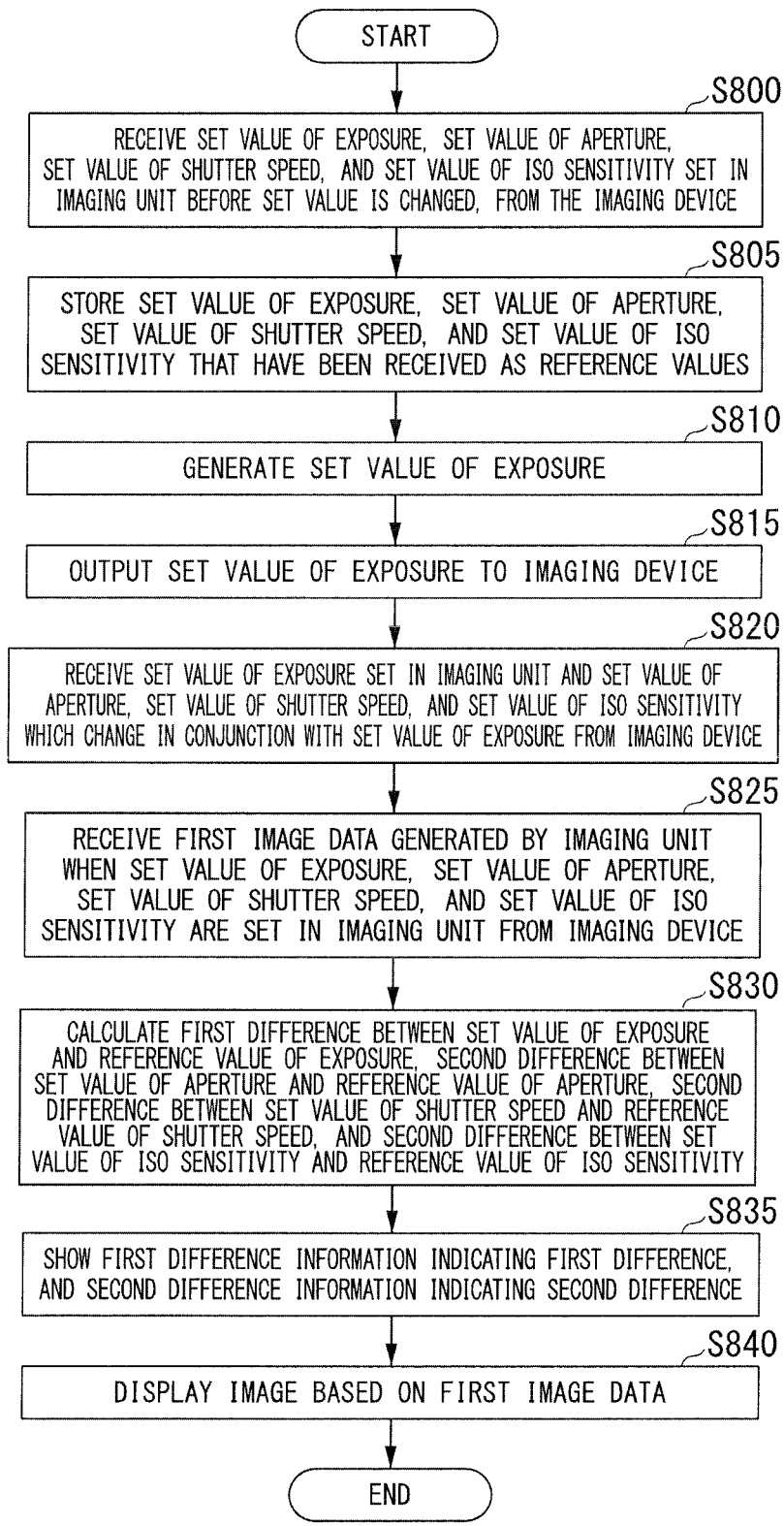
FIG. 20 is a flowchart showing a procedure of an operation of an imaging-setting device according to a seventh example of the first embodiment of the present invention.

An operation of the imaging-setting device 11 will be described with reference to FIG. 20. FIG. 20 shows a procedure of an operation of the imaging-setting device 11 regarding a setting of control parameters.

When the operation regarding a setting of control parameters is started, the input unit 102 inputs a set value (a third value) of exposure set in an imaging unit before a set value (a first value) of the exposure that is a first control parameter is set in the imaging unit. Further, the input unit 102 inputs a set value (a fourth value) of an aperture set in the imaging unit before a set value (a second value) of the aperture that is a second control parameter is set in the imaging unit from the imaging device 20. Further, the input unit 102 inputs a set value (a fourth value) of shutter speed set in the imaging unit before a set value (a second value) of the shutter speed that is a second control parameter is set in the imaging unit from the imaging device 20. Further, the input unit 102 inputs a set value (a fourth value) of an ISO sensitivity set in the imaging unit before a set value (a second value) of the ISO sensitivity that is a second control parameter is set in the imaging unit from the imaging device 20 (step S800).

After the set values are input, the storage unit 103 stores the set value (the third value) of the exposure, the set value (the fourth value) of the aperture, the set value (the fourth value) of the shutter speed, and the set value (the fourth value) of the ISO sensitivity input by the input unit 102 as reference values (step S805). The set value (the third value) of the exposure, the set value (the fourth value) of the aperture, the set value (the fourth value) of the shutter speed, and the set value (the fourth value) of the ISO sensitivity may be stored in association with each other.

After the reference values are stored, the generation unit 100 generates the set value (the first value) of the exposure (step S810). Step S810 corresponds to step S100 in FIG. 2

After the set value (the first value) of the exposure is generated, the output unit 101 outputs the set value (the first value) of the exposure generated by the generation unit 100 to the imaging device 20 (step S815). Step S815 corresponds to step S105 in FIG. 2.

After the set value (the first value) of the exposure is output, the input unit 102 inputs the set value (the first value) of the exposure set in the imaging unit, the set value (the second value) of the aperture, and the set value (the second value) of the shutter speed and the set value (the second value) of the ISO sensitivity that change in accordance with the set value (the first value) of the exposure from the imaging device 20 (step S820). Step S820 corresponds to step S110 in FIG. 2. Instead of the set value (the first value) of the exposure being input from the imaging device 20, the set value (the first value) of the exposure generated in step S810 may be stored in the storage unit 103. By the set value (the first value) of the exposure being input from the imaging device 20, the process is performed on the basis of the value actually set in the imaging device 20.

After the set values are input, the input unit 102 inputs first image data generated by the imaging unit when the set value (the first value) of the exposure, the set value (the second value) of the aperture, the set value (the second value) of the shutter speed, and the set value (the second value) of the ISO sensitivity are set in the imaging unit from the imaging device 20 (step S825). For example, in step S825, the input unit 102 inputs the first image data including a moving image or a still image from the imaging device 20. Step S825 corresponds to step S115 in FIG. 2.

After the first image data is input, the calculation unit 104 calculates a first difference between the set value (the first value) of the exposure input from the imaging device 20 and a reference value (the third value) of the exposure stored in the storage unit 103. Further, the calculation unit 104 calculates a second difference between the set value (the second value) of the aperture input from the imaging device 20 and a reference value (the fourth value) of the aperture stored in the storage unit 103. Further, the calculation unit 104 calculates a second difference between the set value (the second value) of the shutter speed input from the imaging device 20 and a reference value (the fourth value) of the shutter speed stored in the storage unit 103. Further, the calculation unit 104 calculates a second difference between the set value (the second value) of the ISO sensitivity input from the imaging device 20 and a reference value (the fourth value) of the ISO sensitivity stored in the storage unit 103 (step S830). Step S830 corresponds to step S120 in FIG. 2.

After the first difference and the second differences are calculated, the display unit 105 shows first difference information indicating the first difference and second difference information indicating the second differences (step S835). In step S835, for the second difference information, second difference information of each of the aperture, the shutter speed, and the ISO sensitivity is shown. Step S835 corresponds to step S125 in FIG. 2.

After the first difference information and the second difference information are shown, the display unit 105 displays an image based on the first image data input by the input unit 102 (step S840). For example, in step S840, the display unit 105 displays a moving image or a still image based on the first image data. Step S840 corresponds to step S130 in FIG. 2.

The processes of steps S810 to S840 may be repeatedly performed. That is, the set value of the exposure may be repeatedly updated and the image may be updated accordingly. Further, the processes of steps S210 and S215 in FIG. 4 may be performed at a timing such as before the process of step S810 is performed.

The processes of steps S800 and S805 are arbitrary. That is, the processes of steps S800 and S805 may not be performed. Instead of the processes of steps S800 and S805 being performed, the user may know the set value (the third value) of the exposure, the set value (the fourth value) of the aperture, the set value (the fourth value) of the shutter speed, and the set value (the fourth value) of the ISO sensitivity, and input the values to the imaging-setting device 11.

After the process of step S825 is performed, the process of step S820 may be performed. Further, after the process of step S840 is performed, the process of step S835 may be performed. Further, the process of step S840 may be performed before the process of step S830 is performed.

Figure 21:
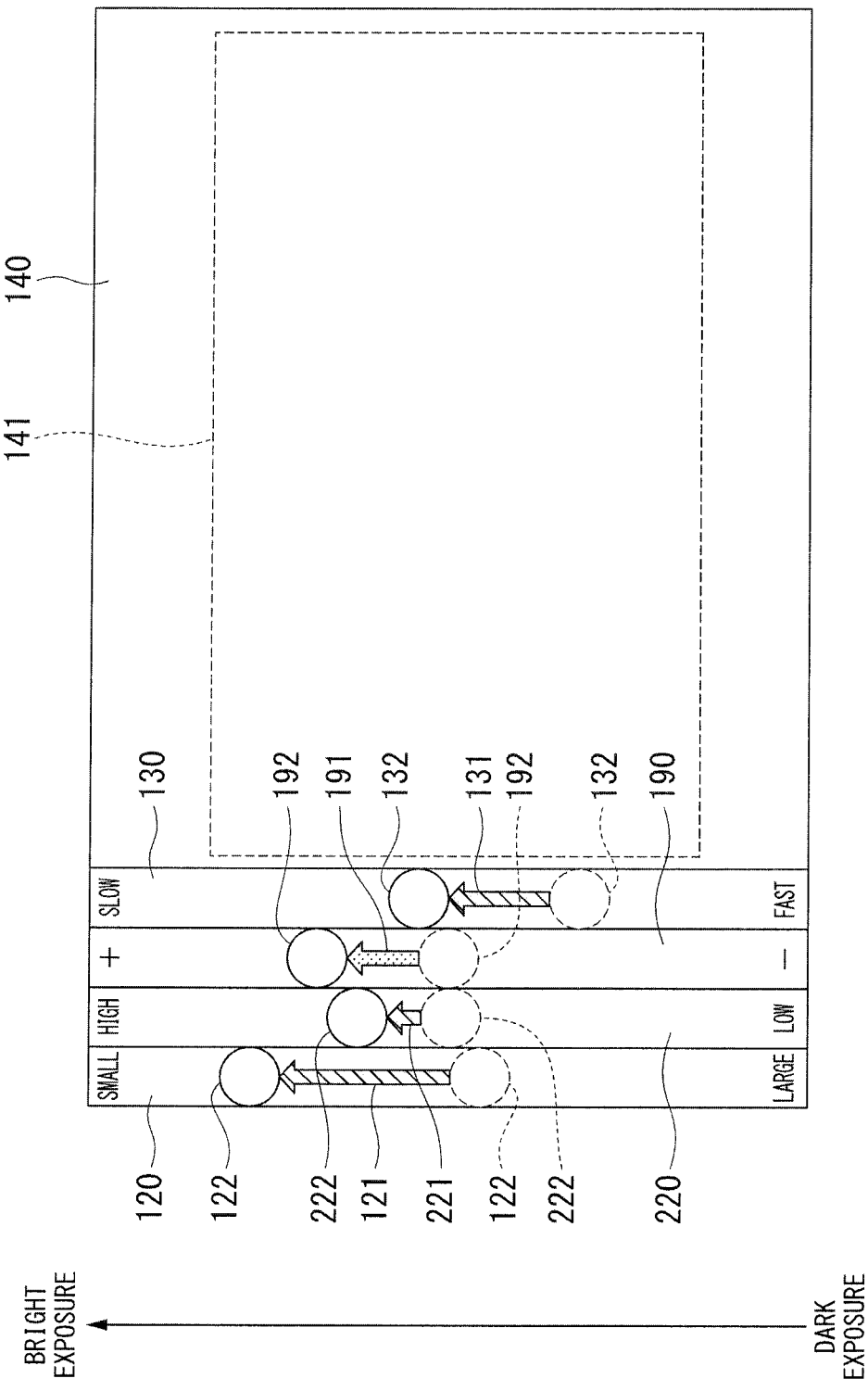
FIG. 21 is a reference diagram showing a first example of a screen of a display unit in the seventh example of the first embodiment of the present invention.

FIG. 21 shows a first example of a screen of the display unit 105. The display unit 105 displays the area 120, the area 130, the area 190, an area 220, and the image area 140. The first difference information of the first control parameter is displayed in the area 190. Specifically, the first difference information of the exposure is displayed in the area 190. The second difference information of the second control parameters is displayed in the area 120, the area 130, and the area 220. Specifically, the second difference information of the aperture is displayed in the area 120, the second difference information of the shutter speed is displayed in the area 130, and the second difference information of the ISO sensitivity is displayed in the area 220. An image based on the image data input from the imaging device 20 is displayed in the image area 140.

Shapes of the area 120, the area 130, the area 190, and the area 220 are elongated rectangles in the vertical direction. The area 120, the area 130, the area 190, and the area 220 are disposed to the left of the image area 140. The area 130 is adjacent to the image area 140. The area 190 is adjacent to the area 130. The area 220 is adjacent to the area 190. The area 120 is adjacent to the area 220. It is preferable that one of the area 120, the area 130, and the area 220 be adjacent to the area 190.

The display unit 105 displays, in the area 190, the arrow 191 that is a figure indicating the first difference information of the exposure and the circle 192 that is a figure indicating the set value of the exposure. Since the area 190 has already been described, the description thereof will be omitted.

The display unit 105 displays, in the area 120, the arrow 121 that is a figure indicating the second difference information of the aperture and the circle 122 that is a figure indicating the set value of the aperture. Since the area 120 has already been described, the description thereof will be omitted.

The display unit 105 displays, in the area 130, the arrow 131 that is a figure indicating second difference information of the shutter speed and the circle 132 that is a figure indicating the set value of the shutter speed. Since the area 130 has already been described, the description thereof will be omitted.

The display unit 105 displays, in the area 220, an arrow 221 that is a figure indicating the second difference information of the ISO sensitivity and a circle 222 that is a figure indicating the set value of the ISO sensitivity. That is, the display unit 105 displays the second difference information using the arrow 221. The circle 222 is displayed at a position of a head of the arrow 221.

A range of the area 220 corresponds to a range of values of the ISO sensitivity that can be set in the imaging unit. In the area 220, an upper position corresponds to a greater value of the ISO sensitivity (higher ISO sensitivity). An upper end of the area 220 corresponds to a maximum value of the values of the ISO sensitivity that can be set in the imaging unit. Further, in the area 220, the lower position corresponds to a smaller value of the ISO sensitivity (lower ISO sensitivity). The lower end of the area 220 corresponds to a minimum value of the values of the ISO sensitivity that can be set in the imaging unit. The input unit 102 may input the maximum value and the minimum value of the values of the ISO sensitivity that can be set in the imaging unit from the imaging device 20. Further, the storage unit 103 may store the maximum value and the minimum value of the values of the ISO sensitivity that can be set in the imaging unit.

The position of the head of the arrow 221 corresponds to the set value (the second value) of the ISO sensitivity. A position of a tail of the arrow 221 corresponds to the reference value (the fourth value) of the ISO sensitivity. For example, before the set value (the first value) of the exposure is set in the imaging unit, the circle 222 is displayed at the position of the tail of the arrow 221, and the arrow 221 is not displayed. The circle 222 before the set value (the first value) of the exposure is set in the imaging unit is indicated by a dashed line. A length of the arrow 221 indicates a magnitude of the difference between the set value (the second value) of the ISO sensitivity and the reference value (the fourth value) of the ISO sensitivity. The display unit 105 shows the set value (the second value) of the ISO sensitivity or the reference value (the fourth value) of the ISO sensitivity using the circle 222.

After the user moved the circle 192, the input unit 102 inputs the set value (the second value) of the ISO sensitivity from the imaging device 20. The display unit 105 displays the circle 222 at a position corresponding to the set value (the second value) of the ISO sensitivity in the area 220. Thus, the circle 222 is moved. The display unit 105 displays the arrow 221.

For example, lengths of the area 120, the area 130, the area 190, and the area 220 are the same. That is, the display unit 105 displays a range of values of the aperture that can be set in the imaging unit, a range of values of the shutter speed that can be set in the imaging unit, a range of values of the exposure that can be set in the imaging unit, and the range of the values of the ISO sensitivity that can be set in the imaging unit on the same scale.

The display unit 105 may display the arrow 191 in a first display form, and display the arrow 121, the arrow 131, and the arrow 221 in a second display form different from the first display form. For example, the arrow 191 and the other arrows may be displayed with different colors. The arrow 191 and the other arrows may be displayed with different brightness. A pattern of the arrow 191 and patterns of the other arrows may be different. A type of figure indicating the first difference information and a type of figure indicating the second difference information may be different. Accordingly, the user can easily identify the first control parameter and the second control parameters.

The display unit 105 may display the area 190 in the first display form, and display the area 120, the area 130, and the area 220 in the second display form different from the first display form. That is, the display unit 105 may display the arrow 121 in the area 120 displayed in the first display form, and display the other arrows in other the areas displayed in the second display form different from the first display form. For example, the area 190 and the other areas may be displayed with different color. The area 190 and the other areas may be displayed with a different brightness. A pattern of the area 190 and patterns of the other areas may be different.

At least two of the area 120, the area 130, the area 190, and the area 220 may be a single area. That is, the display unit 105 may display the first difference information and the second difference information in the same area. Alternatively, the display unit 105 may display a plurality of second differences information corresponding to the plurality of second control parameters in the same area.

The user can recognize the second difference information indicated by the arrow 121, the arrow 131, and the arrow 221 according to the first difference information indicated by the arrow 191. This is, the user can visually recognize that the value of the exposure and the values of the second control parameters are in accordance with each other. Further, the user can visually recognize the amount of change in the values of the second control parameters according to the amount of change in the value of the exposure.

Further, the user can visually recognize the value of the exposure indicated by the circle 192 and the values of the second control parameters indicated by the other circles. For example, the user can visually recognize the second values of the second control parameters corresponding to the set value (the first value) of the exposure.

Therefore, the user can visually recognize a relationship between a plurality of control parameters that are in accordance with each other. Further, the user can learn a method of adjusting the plurality of control parameters.

The display unit 105 displays, in the image area 140, the image 141 based on the first image data generated by the imaging unit when the set value (the first value) of the exposure, the set value (the second value) of the aperture, the set value (the second value) of the shutter speed, and the set value (the second value) of the ISO sensitivity are set in the imaging unit. The display unit 105 displays, in the image area 140, the image 142 based on the second image data generated by the imaging unit when the set value (the first value) of the exposure, the set value (the second value) of the aperture, the set value (the second value) of the shutter speed, and the set value (the second value) of the ISO sensitivity are set in the imaging unit.

The user can confirm the state of the image 141 which reflects the set value (the first value) of the exposure, the set value (the second value) of the aperture, the set value (the second value) of the shutter speed, and the set value (the second value) of the ISO sensitivity. That is, the user can confirm the state of the image 141 after the set values of the exposure, the aperture, the shutter speed, and the ISO sensitivity are changed.

The user may select the second difference information to be displayed among the second difference information of the plurality of second control parameters. Further, the user may select an order of arrangement of the displayed second difference information of the plurality of second control parameters.

In the aperture priority mode in which the value of the shutter speed is set so that the exposure is appropriate in accordance with the set value of the aperture, the control parameters in accordance with the set value of the aperture may change. For example, the shutter speed slows as the value of the aperture decreases. If the shutter speed is equal to or smaller than a predetermined value, influence of camera shake increases. Therefore, if the value of the aperture further decreases, the shutter speed does not change and the value of the ISO sensitivity increases.

If the shutter speed exceeds the predetermined value, the second control parameter is the shutter speed and the third control parameter of which the third difference is constant is the ISO sensitivity. Further, if the shutter speed is equal to or smaller than the predetermined value, the second control parameter is the ISO sensitivity and the third control parameter is the shutter speed. If the second difference information of the second control parameter and the fifth value of the third control parameter are shown, the user can recognize that the second control parameter in accordance with the value of the aperture is switched.

Figure 22:
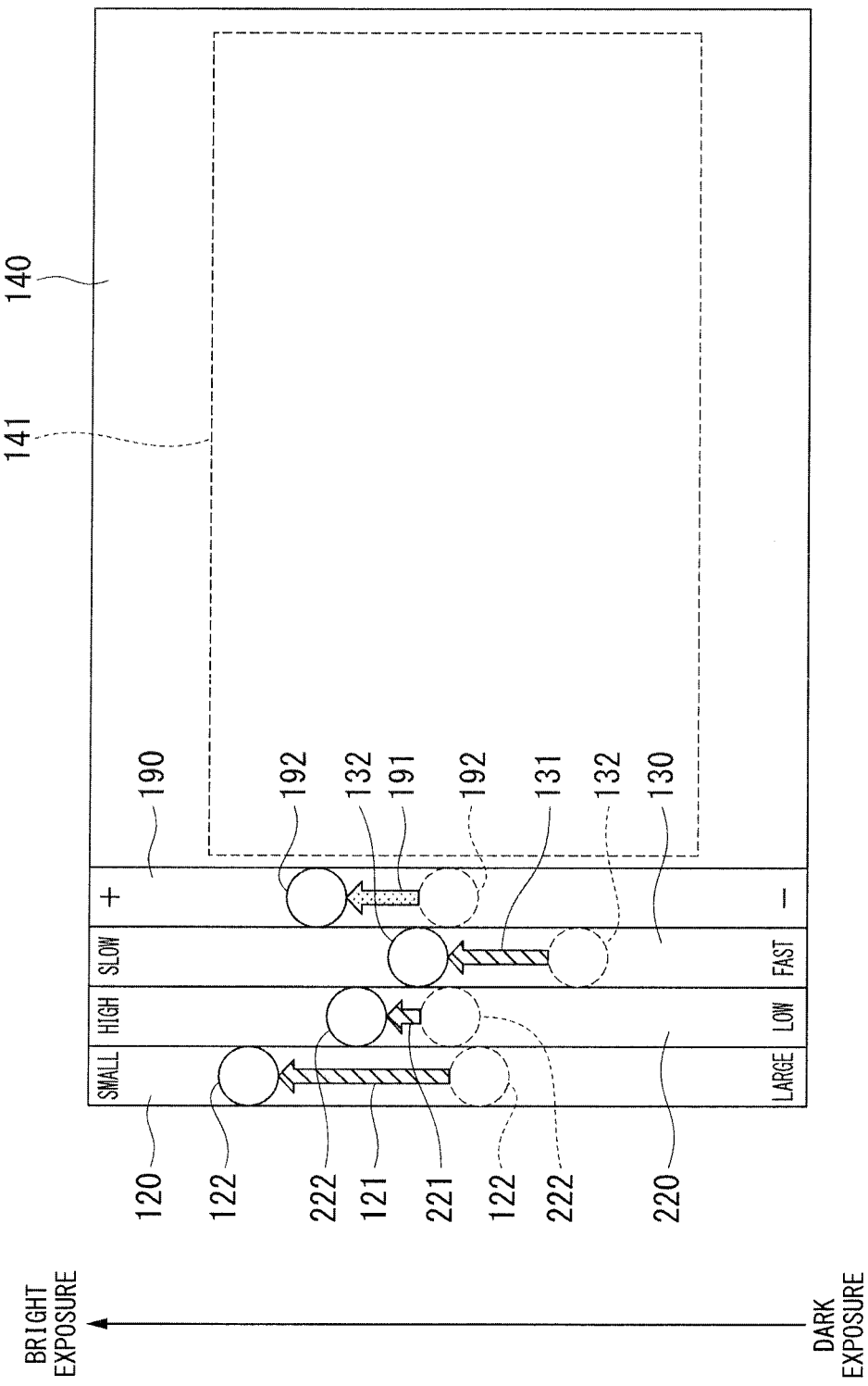
FIG. 22 is a reference diagram showing a second example of the screen of the display unit in the seventh example of the first embodiment of the present invention.

FIG. 22 shows a second example of the screen of the display unit 105. Hereinafter, a difference from FIG. 21 will be described.

In this example, the display unit 105 fixes a relative relationship between a position at which the first difference information is displayed and a position at which the second difference information is displayed. For example, the display unit 105 always displays an area in which the first difference information is displayed to the right relative to an area in which the second difference information is displayed. The display unit 105 fixes the relative relationship regardless of the mode. The relative relationship between the position at which the first difference information is displayed and the position at which the second difference information is displayed is constant among a plurality of modes.

More specifically, in the program mode, the display unit 105 displays the area 190 and shows the first difference information in the area 190. Further, the display unit 105 displays the area 130 so that the area 130 is adjacent to the area 190, and shows the second difference information in the area 130. In FIG. 22, the display unit 105 displays the area 130 to the left of the area 190 so that the area 130 is adjacent to the area 190, and shows the second difference information in the area 130. The display unit 105 may display the area 120 or the area 220 so that the area 120 or the area 220 is adjacent to the area 190.

In the aperture priority mode, the display unit 105 displays the area 120 at a position of the area 190 in FIG. 22, and shows the first difference information in the area 120. Further, the display unit 105 displays the area 130 so that the area 130 is adjacent to the area 120, and shows the second difference information in the area 130. That is, the display unit 105 displays the area 130 to the left of the area 120 so that the area 130 is adjacent to the area 120, and shows the second difference information in the area 130. The display unit 105 may display the area 190 or the area 220 so that the area 190 or the area 220 is adjacent to the area 120.

In the shutter speed priority mode, the display unit 105 displays the area 130 at the position of the area 190 in FIG. 22, and shows the first difference information in the area 130. Further, the display unit 105 displays the area 120 so that the area 120 is adjacent to the area 130, and shows second difference information in the area 120. That is, the display unit 105 displays the area 120 to the left of the area 130 so that the area 120 is adjacent to the area 130, and shows second difference information in the area 120. The display unit 105 may display the area 190 or the area 220 so that the area 190 or the area 220 is adjacent to the area 130.

In this example, the display unit 105 fixes a relative relationship between a position at which the first difference information of the first control parameter is displayed and a position at which the image is displayed. For example, the display unit 105 always displays the area in which the first difference information is displayed on the left relative to the area in which the image is displayed. The display unit 105 fixes the relative relationship regardless of the mode. The relative relationship between the position at which the first difference information is displayed and the position at which the image is displayed is constant among a plurality of modes.

More specifically, in the program mode, the display unit 105 displays the area 190 and shows the first difference information in the area 190. Further, the display unit 105 displays the image area 140 so that the image area 140 is adjacent to the area 190, and displays the image 141 in the image area 140. In FIG. 22, the display unit 105 displays the image area 140 to the right of the area 190 so that the image area 140 is adjacent to the area 190, and displays the image 141 in the image area 140.

In the aperture priority mode, the display unit 105 displays the area 120 at the position of the area 190 in FIG. 22 and shows the first difference information in the area 120. Further, the display unit 105 displays the image area 140 so that the image area 140 is adjacent to the area 120, and displays the image 141 in the image area 140. That is, the display unit 105 displays the image area 140 to the right of the area 120 so that the image area 140 is adjacent to the area 120, and displays the image 141 in the image area 140.

In the shutter speed priority mode, the display unit 105 displays the area 130 at the position of the area 190 in FIG. 22, and shows the first difference information in the area 130. Further, the display unit 105 displays the image area 140 so that the image area 140 is adjacent to the area 130, and displays the image 141 in the image area 140. That is, the display unit 105 displays the image area 140 to the right of the area 130 so that the image area 140 is adjacent to the area 130, and displays the image 141 in the image area 140.

The first difference information of the first control parameter is always displayed to the right of the second difference information of the second control parameters. Since a positional relationship is fixed regardless of the mode, the user can easily identify the first difference information and the second difference information. Further, the first difference information is always displayed to the left of the image 141. Since the positional relationship is fixed regardless of the mode, the user can easily identify the first difference information.

The display unit 105 may display each area so that the area 190 in which the first difference information is displayed is relatively more prominent than the area 130 in which the second difference information is displayed. For example, the display unit 105 may display the area 130 or the like in a color that is less prominent than that of the area 190.

The display unit 105 may show the first difference information in the first display form and show the second difference information in the second display form different from the first display form so that the first difference information is relatively more prominent than the second difference information. For example, the display unit 105 may display the circle 132 indicating the second difference information in a color that is less prominent than that of the circle 192 indicating the first difference information.

Figure 23:
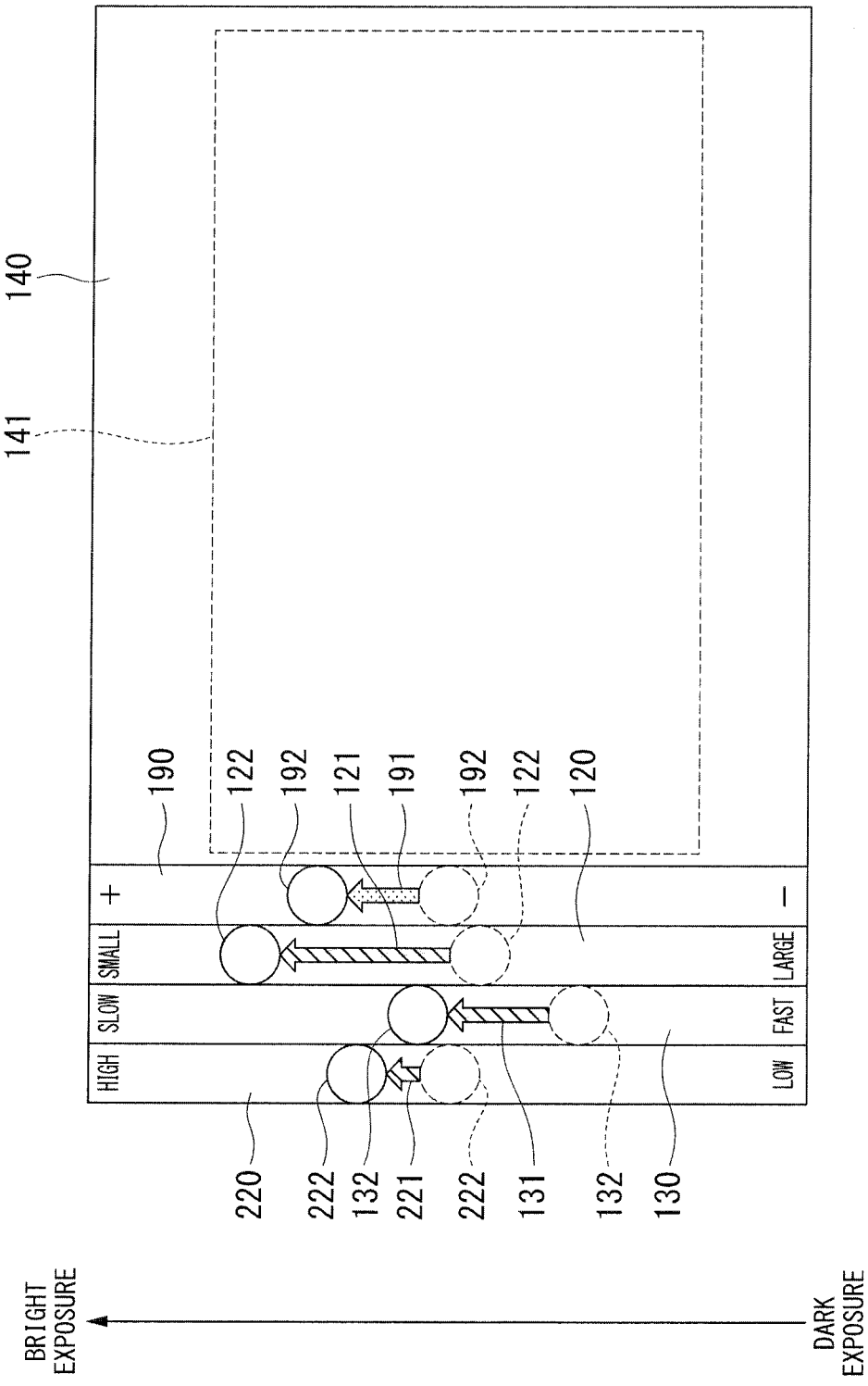
FIG. 23 is a reference diagram showing a third example of the screen of the display unit in the seventh example of the first embodiment of the present invention.

FIG. 23 shows a third example of the screen of the display unit 105. Hereinafter, a difference from FIG. 22 will be described. In this example, a second difference of the aperture among a plurality of second differences of the plurality of second control parameters is greatest. A second difference of the shutter speed is second greatest. A second difference of the ISO sensitivity is smallest.

In this example, the input unit 102 inputs the second value of each of the plurality of second control parameters, and the first image data from the imaging device 20. The storage unit 103 stores the fourth value of each of the plurality of second control parameters. The display unit 105 fixes a relative relationship between a position at which second difference information of a second control parameter of which the second difference is relatively greater among the plurality of second control parameters is displayed and a position at which second difference information of a second control parameter of which the second difference is relatively smaller among the plurality of second control parameters is displayed. Further, the display unit 105 displays an image based on the first image data.

The display unit 105 fixes the relative relationship regardless of the mode. A relative relationship between the position at which the first difference information is displayed and the position at which the second difference information is displayed is constant among the plurality of modes.

For example, the display unit 105 shows the second difference information of the second control parameter so that the second difference decreases as a distance from a position at which second difference information of a second control parameter of which the second difference is greatest is displayed increases. Alternatively, the display unit 105 shows the second difference information of the second control parameter so that the second difference increases as a distance from a position at which second difference information of a second control parameter of which the second difference is smallest is displayed increases. That is, the display unit 105 shows a plurality of second differences information of the plurality of second control parameters in ascending or descending order of magnitude of the plurality of second differences information of the plurality of second control parameters.

Specifically, the display unit 105 displays the area 190, and shows the first difference information in the area 190. Further, the display unit 105 displays the area 120 so that the area 120 is adjacent to the area 190, and shows the second difference of the aperture is greatest in the area 120. Further, the display unit 105 displays the area 130 so that the area 130 is adjacent to the area 120, and shows the second greatest second difference of the shutter speed in the second area 130. Further, the display unit 105 displays the area 220 so that the area 220 is adjacent to the area 130, and shows the smallest second difference of the ISO sensitivity in the area 220. Accordingly, the display unit 105 shows the second difference information of the second control parameter so that a second difference to be displayed decreases as a distance from the position at which the second difference information of the aperture is displayed increases.

Since the second difference information is displayed in an order of magnitude of the second difference, the user can easily recognize the control parameters having a great influence due to an adjustment of the exposure.

In FIG. 23, a relative relationship between the position at which the first difference information is displayed and the position at which the second difference information is displayed may not be fixed.

Figure 24:
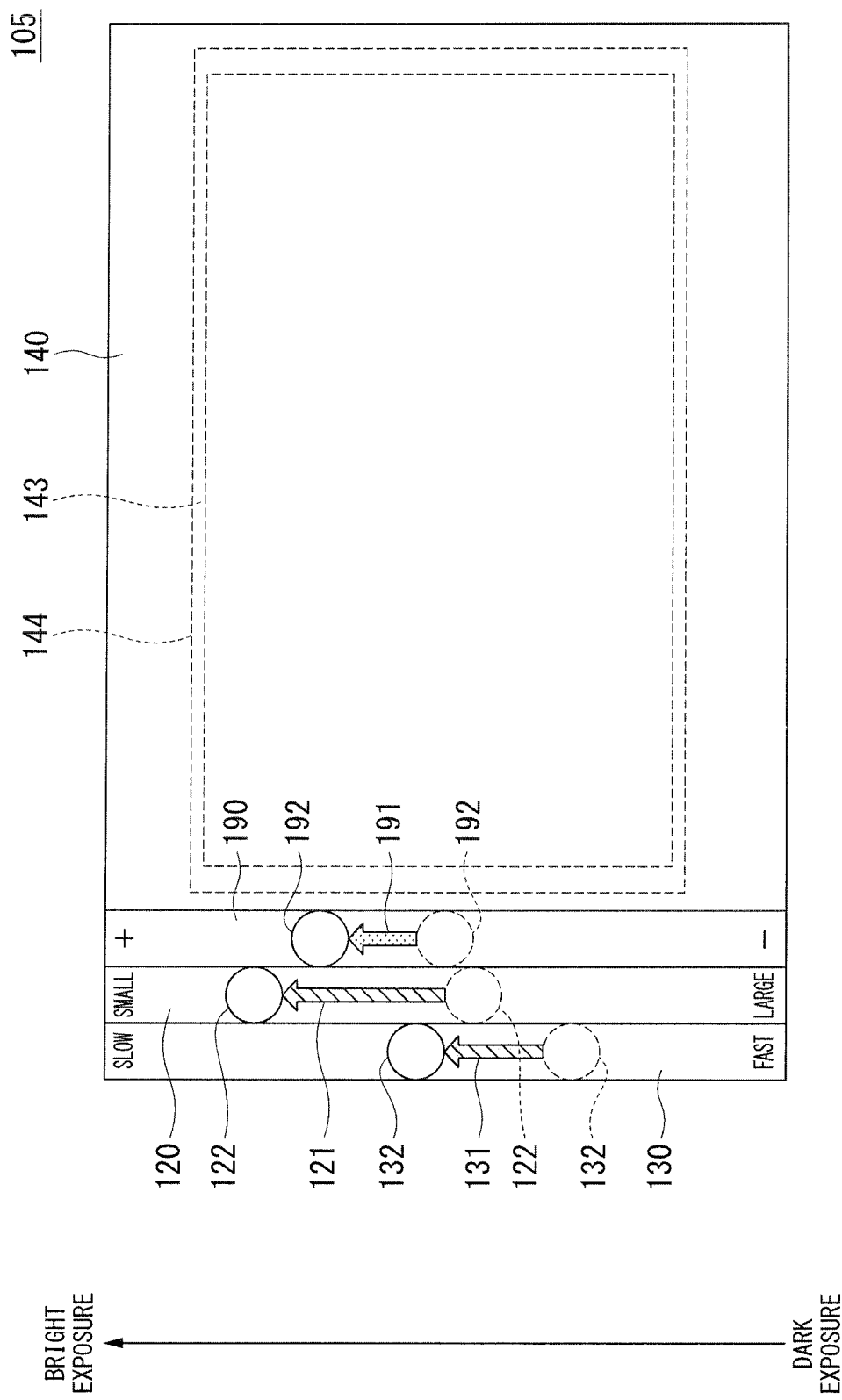
FIG. 24 is a reference diagram showing a fourth example of the screen of the display unit in the seventh example of the first embodiment of the present invention.

FIG. 24 shows a fourth example of the screen of the display unit 105. Hereinafter, a difference from FIG. 22 will be described. In this example, a second difference of the aperture and the shutter speed among the plurality of second differences of the plurality of second control parameters exceeds a predetermined amount. Further, the second difference of the ISO sensitivity is equal to or smaller than the predetermined amount.

In this example, the input unit 102 inputs the second value of each of the plurality of second control parameters and the first image data from the imaging device 20. The storage unit 103 stores the fourth value of each of the plurality of second control parameters. The display unit 105 shows the first difference information, and shows only second difference information in which the second difference exceeds the predetermined amount among the plurality of second control parameters. That is, the display unit 105 hides second difference information in which the second difference is equal to or smaller than the predetermined amount among the plurality of second control parameters. Further, the display unit 105 displays an image based on the first image data.

Specifically, the second difference of the aperture and the shutter speed exceeds the predetermined amount. Therefore, the display unit 105 displays the area 120 in which the second difference information of the aperture is displayed and displays the area 130 in which the second difference information of the shutter speed is displayed. The second difference of the ISO sensitivity is equal to or smaller than the predetermined amount. Therefore, the display unit 105 hides the area 220 in which the second difference information of the ISO sensitivity is displayed.

If the area 220 is displayed in addition to the area 120, the area 130, and the area 190, the image area 140 is smaller than it is in the state shown in FIG. 24. In this case, an image is displayed in an area 143 of the image area 140. Further, if the area 220 is hidden, an image is displayed in an area 144 wider than the area 143 in the image area 140. That is, if any of a plurality of second differences of the plurality of control parameters is equal to or smaller than the predetermined amount, the display unit 105 displays an image based on the first image data in a wider area than if all of the plurality of second differences of the plurality of control parameters exceed the predetermined amount.

Since only the second difference information on the differences exceeding the predetermined amount is displayed, the user can easily recognize the control parameters having a great influence due to an adjustment of the exposure. Further, if there is second difference information to be hidden, the user can easily confirm a change in the image from the image displayed in a wider area.

In FIG. 24, a relative relationship between the position at which the first difference information is displayed and the position at which the second difference information is displayed may not be fixed.

Figure 25:
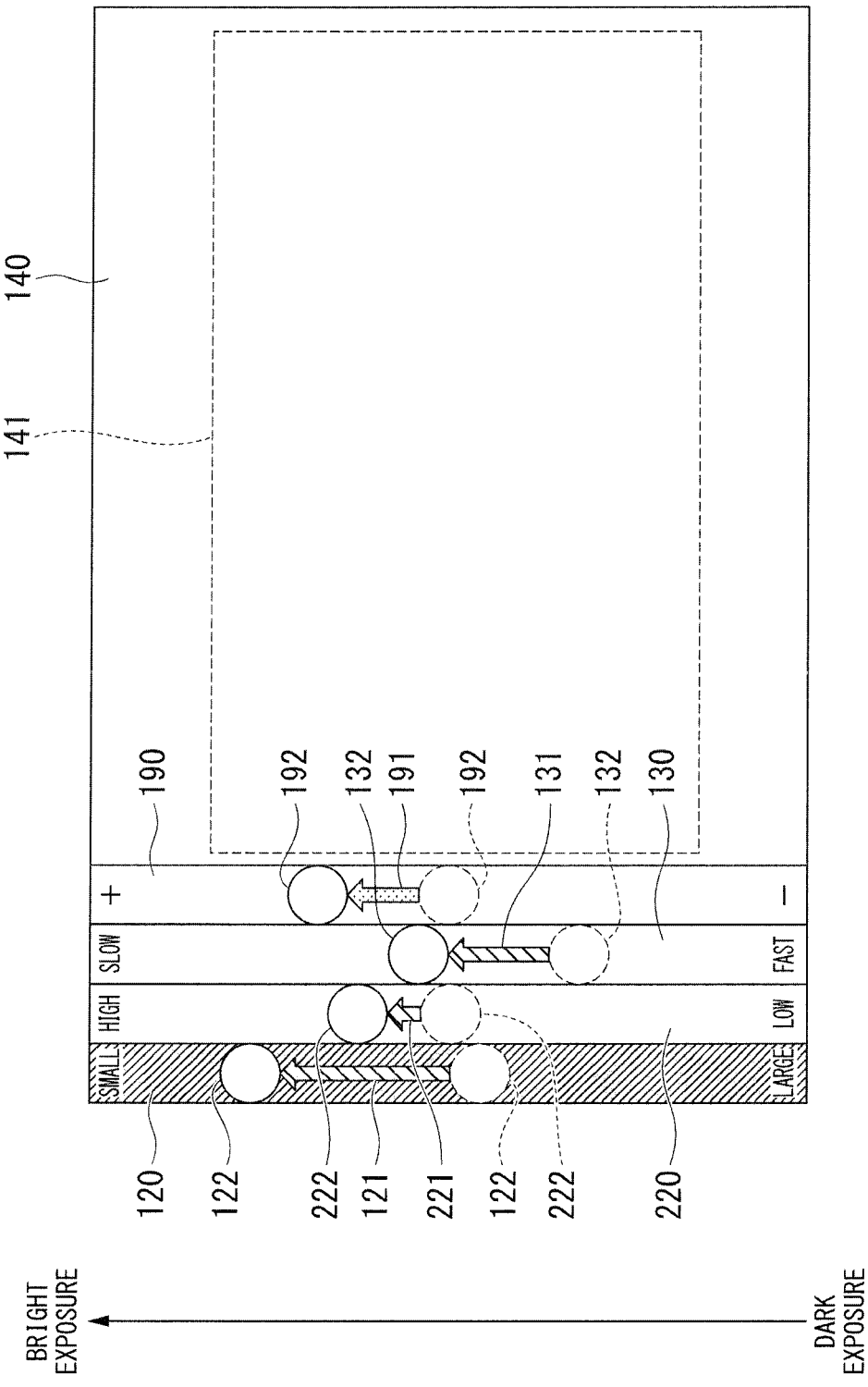
FIG. 25 is a reference diagram showing a fifth example of the screen of the display unit in the seventh example of the first embodiment of the present invention.

FIG. 25 shows a fifth example of the screen of the display unit 105. Hereinafter, a difference from FIG. 22 will be described. In this example, the second difference of the aperture among the plurality of second differences of the plurality of second control parameters is greatest.

In this example, the input unit 102 inputs the second value of each of the plurality of second control parameters among the plurality of control parameters and the first image data generated by the imaging unit when the first value of the first control parameter is set in the imaging unit from the imaging device 20. The storage unit 103 stores the fourth value of each of the plurality of second control parameters. The display unit 105 shows the first difference information and shows second difference information in which the second difference is relatively greater in a first area. Further, the display unit 105 shows second difference information in which the second difference is relatively smaller in a second area having a different display form from that of the first area. Further, the display unit 105 displays an image based on the first image data.

In this example, the display unit 105 highlights the first area relative to the second area. That is, the display unit 105 displays the first area in a first display form emphasized relative to a second display form, and displays the second area in the second display form.

For example, the display unit 105 displays the first area and the second area so that the first area is relatively more prominent than the second area. Specifically, the display unit 105 displays the area 120, the area 130, and the area 220 so that the area 120 (the first area) in which a greatest second difference of the aperture is displayed is relatively more prominent than the area 130 and the area 220 (the second area) in which the relatively smaller second differences of the shutter speed and the ISO sensitivity are displayed. For example, the display unit 105 displays the area 120 in a color more prominent than those of the area 130 and the area 220.

The second difference information in which the second difference is relatively greater and the second difference information in which the second difference is relatively smaller are displayed in different areas. Therefore, the user can easily recognize the control parameters having a great influence due to an adjustment of the exposure.

In FIG. 25, a relative relationship between a position at which the first difference information is displayed and a position at which the second difference information is displayed may not be fixed.

Figure 26:
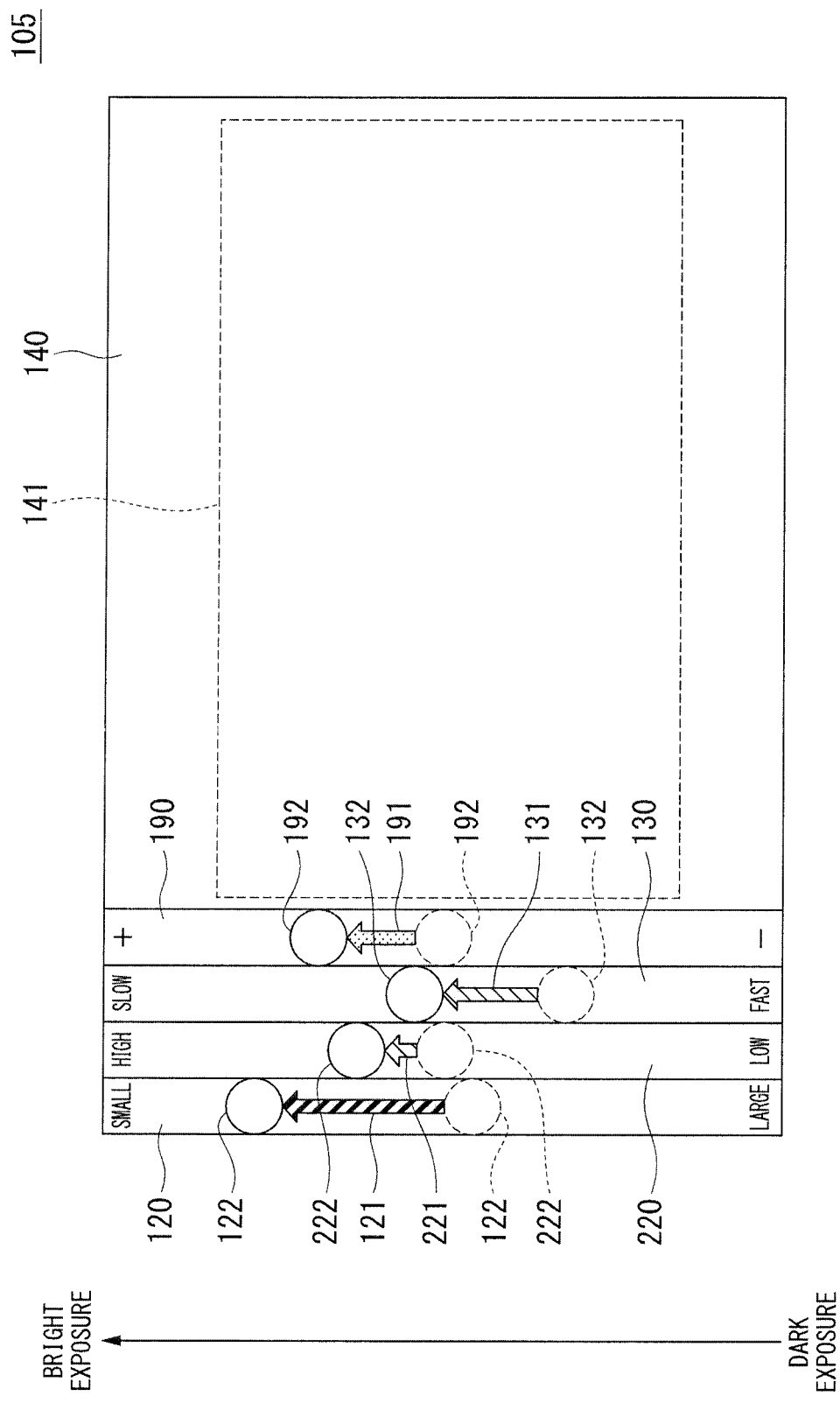
FIG. 26 is a reference diagram showing a sixth example of the screen of the display unit in the seventh example of the first embodiment of the present invention.

FIG. 26 shows a sixth example of the screen of the display unit 105. Hereinafter, a difference from FIG. 22 will be described. In this example, the second difference of the aperture among the plurality of second differences of the plurality of second control parameters is greatest.

In this example, the input unit 102 inputs the second value of each of the plurality of second control parameters among the plurality of control parameters and the first image data generated by the imaging unit when the first value of the first control parameter is set in the imaging unit from the imaging device 20. The storage unit 103 stores the fourth value of each of the plurality of second control parameters. The display unit 105 shows the first difference information and shows second difference information in which the second difference is relatively greater in the first display form. Further, the display unit 105 shows second difference information in which the second difference is a relatively smaller in the second display form different from the first display form. Further, the display unit 105 displays an image based on the first image data.

In this example, the display unit 105 highlights the second difference information in which the second difference is relatively greater relative to the second difference information in which the second difference is relatively smaller. That is, the display unit 105 shows the second difference information in which the second difference is relatively greater in the first display form emphasized relative to the second display form, and shows the second difference information in which the second difference is relatively smaller in the second display form.

For example, the display unit 105 shows the first difference information and the second difference information so that the second difference information in which the second difference is relatively greater is relatively more prominent than the second difference information in which the second difference is relatively smaller. Specifically, the display unit 105 displays the arrow 121, the arrow 131, and the arrow 221 so that the arrow 121 indicating the greatest second difference of the aperture is relatively more prominent than the arrow 131 and the arrow 221 indicating the relatively smaller second differences of the shutter speed and the ISO sensitivity. For example, the display unit 105 displays the arrow 121 in a color more prominent than those of the arrow 131 and the arrow 221.

The second difference information in which the second difference is relatively greater and the second difference information in which the second difference is relatively smaller are displayed with different display forms. Therefore, the user can easily recognize the control parameters having a great influence due to an adjustment of the exposure.

In FIG. 26, a relative relationship between the position at which the first difference information is displayed and the position at which the second difference information is displayed may not be fixed.

Second Embodiment

Figure 27:
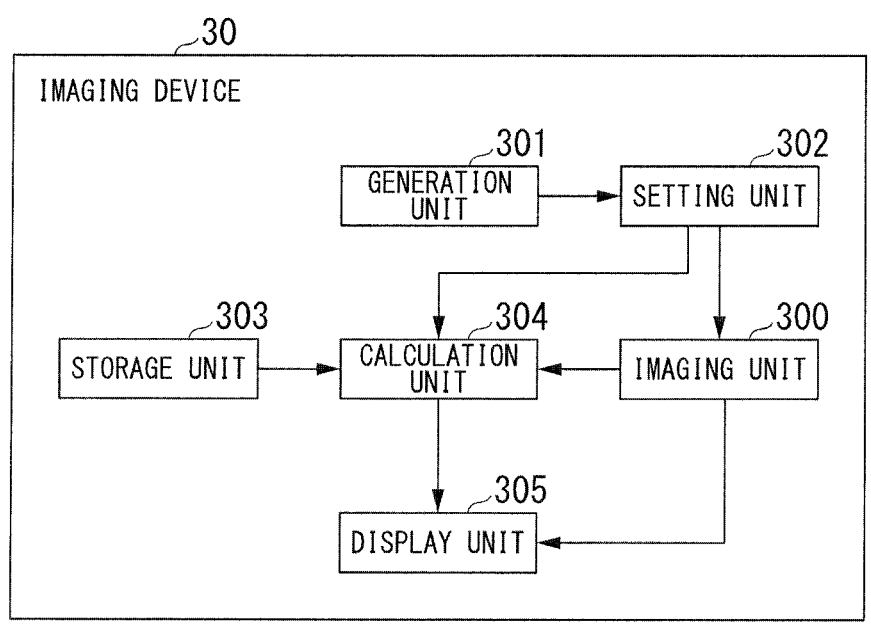
FIG. 27 is a block diagram showing a configuration of an imaging device according to a second embodiment of the present invention.

Next, a second embodiment of the present invention will be described. FIG. 27 shows a configuration of an imaging device 30 according to this embodiment. As shown in FIG. 27, the imaging device 30 includes an imaging unit 300, a generation unit 301, a setting unit 302, a storage unit 303, a calculation unit 304, and a display unit 305.

The imaging unit 300 performs imaging and generates image data. The generation unit 301 generates a first value of a first control parameter among a plurality of control parameters for controlling imaging. The setting unit 302 sets the first value in the imaging unit 300. Further, the setting unit 302 sets a second value of a second control parameter different from the first control parameter among the plurality of control parameters, the second value changing in accordance with the first value set in the imaging unit 300, in the imaging unit 300. The setting unit 302 outputs the set second value. Further, the setting unit 302 may output any of the first value, a third value of the first control parameter, and a fourth value of the second control parameter, if necessary.

The storage unit 303 stores the third value of the first control parameter and the fourth value of the second control parameter. The calculation unit 304 calculates a first difference between the first value and the third value and a second difference between the second value and the fourth value. The display unit 305 shows first difference information indicating the first difference and second difference information indicating the second difference. Further, the display unit 305 displays an image based on the image data generated by the imaging unit 300 when the first value is set in the imaging unit 300.

For example, the functions of the generation unit 301, the setting unit 302, and the calculation unit 304 can be realized as functions of software by, for example, a computer of the imaging device 30 reading and executing a program including instructions defining such operations. A method of implementing this program may be the same as a method of implementing a program for controlling the operation of the imaging-setting device 10.

Figure 28:
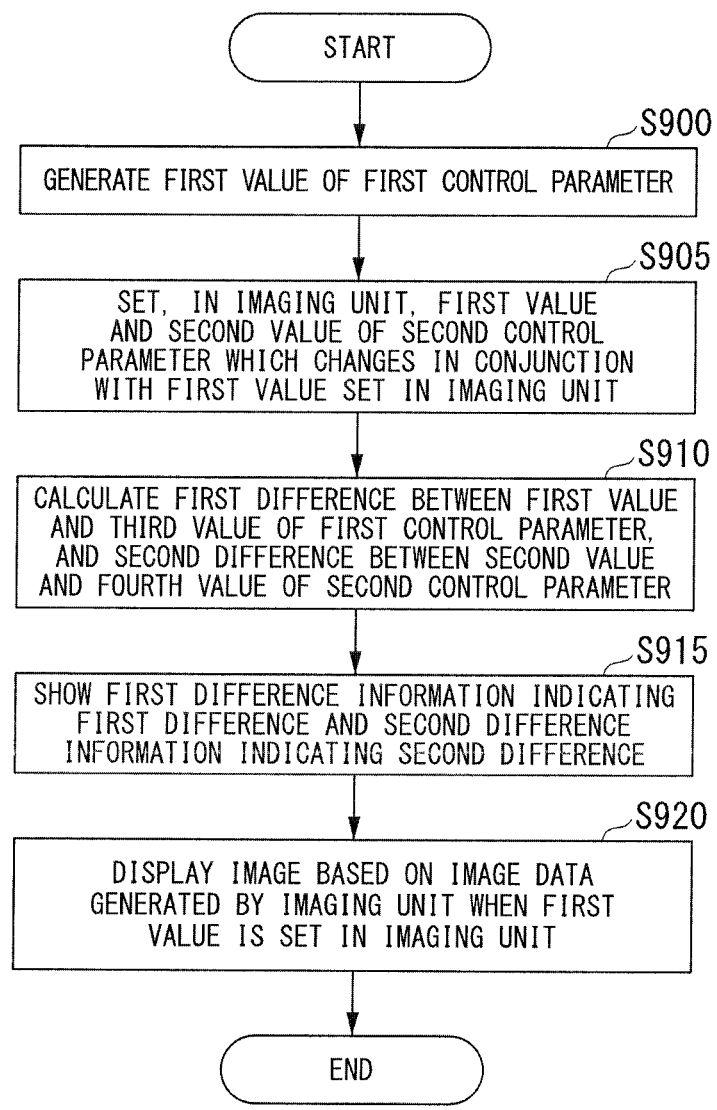
FIG. 28 is a flowchart showing a procedure of an operation of the imaging device according to the second embodiment of the present invention.

Next, an operation of the imaging device 30 will be described with reference to FIG. 28. FIG. 28 shows a procedure of an operation of the imaging device 30 regarding a setting of control parameters.

When the operation regarding a setting of control parameters is started, the generation unit 301 generates a first value of a first control parameter among a plurality of control parameters for controlling imaging (step S900).

After the first value is generated, the setting unit 302 sets, in the imaging unit 300, the first value generated by the generation unit 100 and a second value of a second control parameter different from the first control parameter among the plurality of control parameters, and the second value changes in accordance with the first value set in the imaging unit 300 (step S905).

After the first value and the second value are set in the imaging unit 300, the calculation unit 304 calculates a first difference between the first value and a third value of the first control parameter, and a second difference between the second value and a fourth value of the second control parameter (step S910). In step S910, the calculation unit 304 reads the third value and the fourth value from the storage unit 303. In step S910, the calculation unit 304 calculates the first difference and the second difference using the third value and the fourth value read from the storage unit 303 and the first value and the second value output from the setting unit 302.

After the first difference and the second difference are calculated, the display unit 305 shows first difference information indicating the first difference and second difference information indicating the second difference (step S915). After the first difference information and the second difference information are shown, the display unit 305 displays an image based on image data generated by the imaging unit 300 when the first value is set in the imaging unit 300 (step S920).

After the process of step S920 is performed, the process of step S915 may be performed.

The imaging device 30 may have the operation unit 106 in the imaging-setting device 11. Further, the generation unit 301, the storage unit 303, the calculation unit 304, and the display unit 305 may be the same as the generation unit 100, the storage unit 103, the calculation unit 104, and the display unit 105 in the imaging-setting device 11, respectively.

According to this embodiment, the imaging device 30 includes the imaging unit 300 that performs imaging and generates image data, the generation unit 301 that generates the first value of the first control parameter among the plurality of control parameters for controlling imaging, the setting unit 302 that sets, in the imaging unit 300, the first value and the second value of the second control parameter different from the first control parameter among the plurality of control parameters, and the second value changes in accordance with the first value set in the imaging unit 300, the storage unit 303 that stores the third value of the first control parameter and the fourth value of the second control parameter, the calculation unit 304 that calculates the first difference between the first value and the third value and the second difference between the second value and the fourth value, and the display unit 305 that shows the first difference information indicating the first difference and the second difference information indicating the second difference, and displays the image based on the image data generated by the imaging unit 300 when the first value is set in the imaging unit 300.

Further, according to this embodiment, the imaging-setting method includes a generation step (step S900) in which the generation unit 301 generates a first value of a first control parameter among a plurality of control parameters for controlling imaging, a setting step (step S905) in which the setting unit 302 sets, in the imaging unit 300, the first value and a second value of a second control parameter different from the first control parameter among the plurality of control parameters, and the second value changes in accordance with the first value set in the imaging unit 300, a calculation step (step S910) in which the calculation unit 304 calculates a first difference between the first value and a third value of the first control parameter and a second difference between the second value and a fourth value of the second control parameter, a first display step (step S915) in which the display unit 305 shows first difference information indicating the first difference and second difference information indicating the second difference, and a second display step (step S920) in which the display unit 305 displays an image based on image data generated by the imaging unit 300 when the first value is set in the imaging unit 300.

Further, according to this embodiment, a program causes a computer to execute a generation step (step S900) of generating a first value of a first control parameter among a plurality of control parameters for controlling imaging, a setting step (step S905) of setting, in the imaging unit 300, the first value and a second value of a second control parameter different from the first control parameter among the plurality of control parameters, and the second value changes in accordance with the first value set in the imaging unit 300, a calculation step (step S910) of calculating a first difference between the first value and a third value of the first control parameter and a second difference between the second value and a fourth value of the second control parameter, a first display step (step S915) of showing first difference information indicating the first difference and second difference information indicating the second difference using the display unit 305, and a second display step (step S920) of displaying an image based on image data generated by the imaging unit 300 when the first value is set in the imaging unit 300 using the display unit 305.

In this embodiment, the first difference information of the first control parameter and the second difference information of the second control parameter in accordance with the first control parameter are displayed. This makes it possible to easily recognize the state of a plurality of control parameters that are in accordance with each other. The user can easily recognize the control parameters that are in accordance with each other.

Third Embodiment

Figure 29:
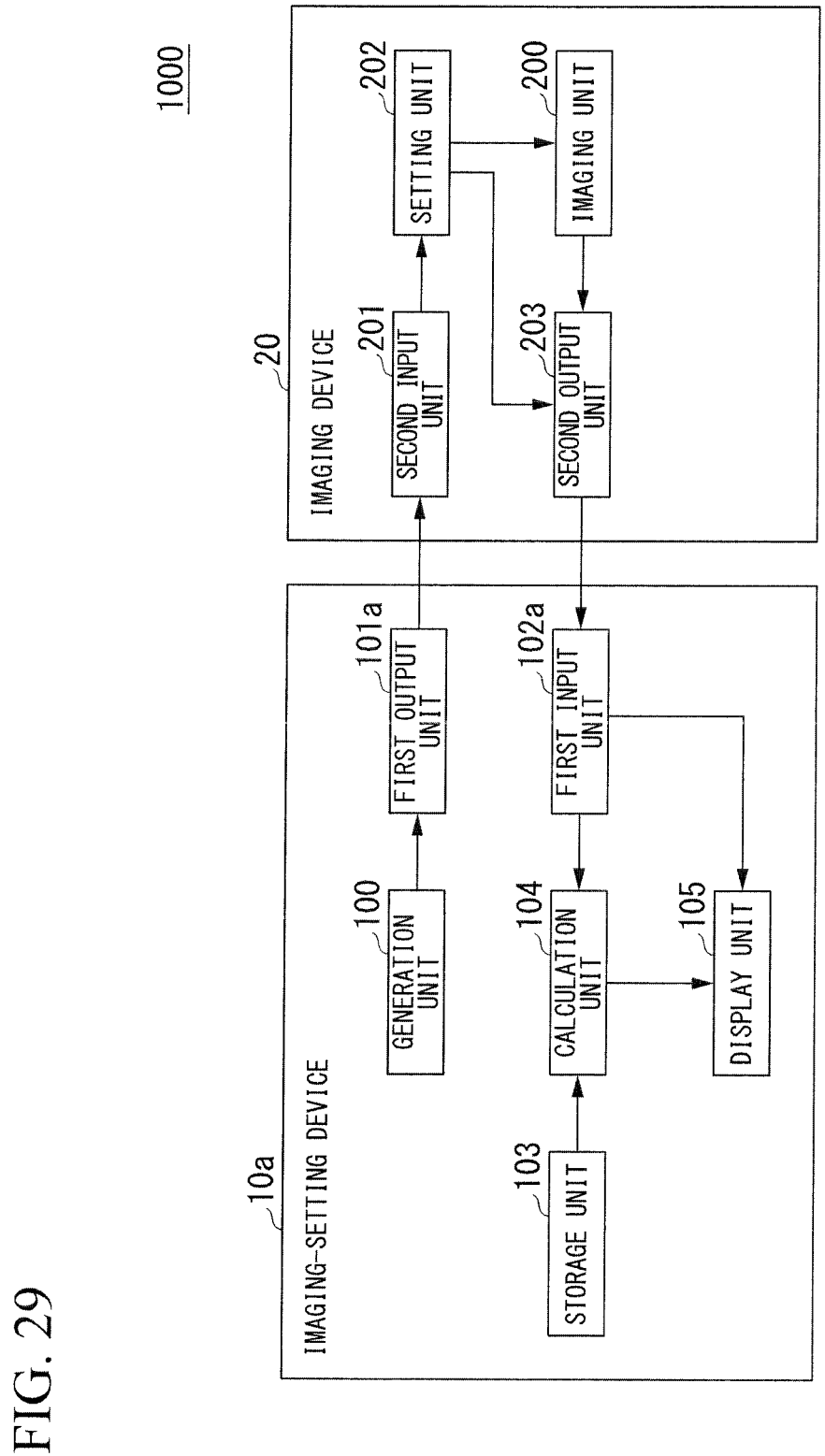
FIG. 29 is a block diagram showing a configuration of an imaging system according to a third embodiment of the present invention.

Next, a third embodiment of the present invention will be described. FIG. 29 shows a configuration of an imaging system 1000 according to this embodiment. As shown in FIG. 29, the imaging system 1000 includes an imaging-setting device 10a and an imaging device 20.

The imaging-setting device 10a includes a generation unit 100, a first output unit 101a, a first input unit 102a, a storage unit 103, a calculation unit 104, and a display unit 105. Each of the generation unit 100, the storage unit 103, the calculation unit 104, and the display unit 105 is the same as each configuration in the imaging-setting device 10 shown in FIG. 1. The first output unit 101a is the same as the output unit 101 in the imaging-setting device 10 shown in FIG. 1. The first input unit 102a is the same as the input unit 102 in the imaging-setting device 10 shown in FIG. 1.

The imaging device 20 includes an imaging device 200, a second input unit 201, a setting unit 202, and a second output unit 203. The imaging device 200 performs imaging and generates image data. The second input unit 201 inputs a first value of a first control parameter from the first imaging-setting device 10a.

The setting unit 202 sets, in the imaging device 200, the first value and a second value of a second control parameter different from the first control parameter among the plurality of control parameters, and the second value changes in accordance with the first value set in the imaging device 200. The setting unit 202 may output the set second value. Further, the setting unit 202 may output any one of the first value, a third value of the first control parameter, and a fourth value of the second control parameter, if necessary.

The second output unit 203 outputs the second value output from the setting unit 202 and the image data generated by the imaging device 200 when the first value is set in the imaging device 200 to the imaging-setting device 10a.

The imaging-setting device 10a may be the same as the imaging-setting device 11 shown in FIG. 3.

According to this embodiment, the imaging system 1000 includes the imaging-setting device 10a and the imaging device 20. The imaging-setting device 10a includes the generation unit 100, the first output unit 101a, the first input unit 102a, the storage unit 103, the calculation unit 104, and the display unit 105. The imaging device 20 includes the imaging device 200 that performs imaging and generates the image data, the second input unit 201 that inputs a first value from the imaging-setting device 10a, the setting unit 202 that sets the first value and a second value in the imaging device 200, and the second output unit 203 that outputs the second value and the image data to the imaging-setting device 10a.

In this embodiment, first difference information of the first control parameter and second difference information of the second control parameter in accordance with the first control parameter are displayed. This makes it possible to easily recognize the state of a plurality of control parameters that are in accordance with each other. The user can easily recognize the control parameters that are in accordance with each other.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging-setting device, comprising:
a processor configured to generate a first value of a first control parameter and calculate a first difference between the first value and a third value and a second difference between a second value and a fourth value, wherein the first value and the third value are defined as values of the first control parameter, the second value and the fourth value are defined as values of a second control parameter, and both the first control parameter and the second control parameter are included in a plurality of control parameters for controlling imaging;
an output configured to send the first value to an imaging device;
an input configured to receive the second value and first image data generated by the imaging device when the first value is set in the imaging device, the second control parameter being different from the first control parameter, and the second value being changed in accordance with the first value set in the imaging device;
a storage configured to store the third value and the fourth value;
and
a display configured to show first difference information indicating the first difference and second difference information indicating the second difference, and display an image based on the first image data,
wherein the fourth value being stored by the storage is a recommended value of the second control parameter or a set value of the second control parameter set in the imaging device before the second value is set in the imaging device, and
wherein the display is configured to show the second difference information in a first display form when the fourth value is the recommended value, and show the second difference information in a second display form different from the first display form when the fourth value is the set value.

2. The imaging-setting device according to claim 1,
wherein the input is configured to receive the third value, which is a value of the first control parameter set in the imaging device before the first value is set in the imaging device, and the fourth value, which is a value of the second control parameter set in the imaging device before the second value is set in the imaging device, from the imaging device, and
the storage is configured to store the third value and the fourth value received by the input.

3. The imaging-setting device according to claim 2,
wherein the input is configured to further receive second image data from the imaging device, the second image data being generated by the imaging device when the third value is set in the imaging device, and the display is configured to further display an image based on the second image data.

4. The imaging-setting device according to claim 3,
wherein the input is configured to receive a plurality of second image data including a moving image or one item of second image data including a still image from the imaging device, and the display is configured to display the moving image based on the plurality of second image data or the still image based on the one item of second image data.

5. The imaging-setting device according to claim 1
wherein the input is configured to further receive the third value that is a recommended value of the first control parameter from the imaging device, and the storage unit is configured to store the third value received by the input and the fourth value.

6. The imaging-setting device according to claim 1,
wherein any one mode among a plurality of modes is set in the imaging device, and the one mode set in the imaging device is capable of being switched to another mode different from the one mode among the plurality of modes, and the plurality of modes has:
at least one of an aperture priority mode in which the first control parameter is an aperture and the second control parameter is shutter speed, and a shutter speed priority mode in which the first control parameter is the shutter speed and the second control parameter is the aperture, and a manual mode in which the first control parameter is the aperture and the shutter speed and the second control parameter is exposure, and the storage is configured to store the fourth value that is the recommended value when the mode of the imaging device is set to the manual mode.

7. The imaging-setting device according to claim 1, wherein the display is configured to show the first difference information in a first area, show the second difference information in a second area displayed in a first display form when the fourth value is the recommended value, the second are being different from the first area show the second difference information in the second area displayed in a second display form different from the first display form when the fourth value is the set value, and display the image.

8. The imaging-setting device according to claim 1, wherein the storage is configured to associate and store the first image data generated by the imaging device, the third value, and the fourth value, when the third value and the fourth value are set in the imaging device.

9. The imaging-setting device according to claim 8, wherein the display is configured to further display an image based on a second image data generated by the imaging device when the third value is set in the imaging device.

10. The imaging-setting device according to claim 1,
wherein the input is configured to receive the second value and a plurality of first image data including a moving image, which is generated by the imaging device when the first value is set in the imaging device, from the imaging device, and wherein the display is configured to show the first difference information and the second difference information, and display the moving image based on the plurality of first image data.

11. The imaging-setting device according to claim 1, wherein the display is configured to show the first difference information in a first area, show the second difference information in a second area having a different display form from the first area, and display the image.

12. The imaging-setting device according to claim 11, wherein the display is configured to further display the first area and the second area such that the first area is relatively more prominent than the second area.

13. The imaging-setting device according to claim 1, wherein the display is configured to show the first difference information in a first display form, show the second difference information in a second display form different from the first display form, and display the image.

14. The imaging-setting device according to claim 13, wherein the display is configured to further show the first difference information in the first display form and show the second difference information in the second display form so that the first difference information is relatively more prominent than the second difference information.

15. The imaging-setting device according to claim 1,
wherein the input is configured to receive the second value of each of a plurality of second control parameters and the first image data from the imaging device when the first value is set in the imaging device, wherein the storage is configured to further store the fourth value of each of the plurality of second control parameters, and wherein the display is configured to show the first difference information, show the second difference information of the second control parameters whose second difference is relatively greater in a first area, show second difference information of the second control parameters whose second difference is relatively smaller in a second area having a display form different from that of the first area, and display the image.

16. The imaging-setting device according to claim 15, wherein the display is configured to further highlight the first area with respect to the second area.

17. The imaging-setting device according to claim 1,
wherein the input is configured to receive the second value of each of a plurality of second control parameters and the first image data generated by the imaging device from the imaging device when the first value is set in the imaging device, wherein the storage is configured to further store the fourth value of each of the plurality of second control parameters, and wherein the display is configured to show the first difference information, show the second difference information of the second control parameters whose second difference is relatively greater in a first display form, show the second difference information of the second control parameters whose second difference is relatively smaller in a second display form different from the first display form, and display the image.

18. The imaging-setting device according to claim 17, wherein the display is configured to highlight the second difference information of the second control parameters whose second difference is relatively greater with respect to the second difference information of the second control parameters whose second difference is relatively smaller.

19. The imaging-setting device according to claim 1,
wherein the input is configured to further receive a fifth value of a third control parameter from the imaging device, the third control parameter being different from the first and second control parameters among the plurality of control parameters,
wherein the storage unit is configured to further store a sixth value of the third control parameter,
wherein the the processor is configured to further calculate a third difference between the fifth value and the sixth value, and
wherein the display is configured to show only the first difference information and the second difference information among the first difference information, the second difference information, and the fifth value when the third difference is 0, and display the image.

20. The imaging-setting device according to claim 19, wherein a mode among a plurality of modes is set in the imaging device, and the mode set in the imaging device can be switched to a different mode among the plurality of modes, and
wherein the third control parameter is determined corresponding to the mode set in the imaging device.

21. The imaging-setting device according to claim 20, wherein the plurality of modes includes:
at least one of an aperture priority mode in which the first control parameter is an aperture and the second control parameter is shutter speed, and a shutter speed priority mode in which the first control parameter is the shutter speed and the second control parameter is the aperture, and
a manual mode in which the first control parameter is the aperture and the shutter speed and the second control parameter is exposure.

22. The imaging-setting device according to claim 1, wherein the input is configured to further receive a fifth value of a third control parameter from the imaging device, the third control parameter being different from the first and second control parameters among the plurality of control parameters,
wherein the storage is configured to further store a sixth value of the third control parameter,
wherein the processor is configured to further calculate a third difference between the fifth value and the sixth value, and
wherein the display is configured to show the fifth value when the third difference is 0.

23. The imaging-setting device according to claim 22, wherein a mode among a plurality of modes is set in the imaging device, and the mode set in the imaging device can be switched to a different mode among the plurality of modes, and
wherein the third control parameter is determined corresponding to the mode set in the imaging device.

24. The imaging-setting device according to claim 23, wherein the plurality of modes includes:
at least one of an aperture priority mode in which the first control parameter is an aperture and the second control parameter is shutter speed, and a shutter speed priority mode in which the first control parameter is the shutter speed and the second control parameter is the aperture, and
a manual mode in which the first control parameter is the aperture and the shutter speed and the second control parameter is exposure.

25. The imaging-setting device according to claim 1, wherein a mode among a plurality of modes is set in the imaging device, and the mode set in the imaging device can be switched to a different mode among the plurality of modes, and
wherein the processor is configured to generate the first value of the first control parameter that is determined corresponding to the mode set in the imaging device.

26. The imaging-setting device according to claim 25, wherein the plurality of modes includes at least two of:
a manual mode in which the first control parameter is an aperture and shutter speed and the second control parameter is exposure;
an aperture priority mode in which the first control parameter is the aperture and the second control parameter is the shutter speed;
a shutter speed priority mode in which the first control parameter is the shutter speed and the second control parameter is the aperture; and
a program mode in which the first control parameter is the exposure and the second control parameter is the aperture and the shutter speed.

27. The imaging-setting device according to claim 1, wherein the input is configured to receive the second value of each of a plurality of second control parameters and the first image data from the imaging device,
wherein the storage is configured to further store the fourth value of each of the plurality of second control parameters, and
wherein the display is configured to show the first difference information, only show the second difference information of the second control parameters whose second difference exceeds a predetermined amount among the plurality of second control parameters, and display the image.

28. The imaging-setting device according to claim 1, wherein the display is configured to further fix a relative relationship between a position at which the first difference information is displayed and a position at which the second difference information is displayed.

29. The imaging-setting device according to claim 1, wherein the display is configured to further fix a relative relationship between positions at which the first difference information and the second difference information of the plurality of control parameters are displayed.

30. The imaging-setting device according to claim 1, wherein the input is configured to receive the second value of each of a plurality of second control parameters and the first image data from the imaging device,
wherein the storage is configured to further store the fourth value of each of the plurality of second control parameters, and
wherein the display is configured to fix a relative relationship between a position at which second difference information of the second control parameters whose second difference is relatively greater among the plurality of second control parameters is displayed and a position at which second difference information of the second control parameters whose second difference is relatively smaller among the plurality of second control parameters is displayed, and display the image.

31. The imaging-setting device according to claim 1, wherein the first control parameter is a parameter regarding exposure.

32. The imaging-setting device according to claim 1, wherein the display is configured to further display a numerical value indicating the first value or a numerical value indicating the second value.

33. An imaging device, comprising:
an image sensor configured to image and generate image data;

a processor configured to generate a first value of a first control parameter, calculate a first difference between the first value and a third value and a second difference between a second value and a fourth value, and set the first value and the second value in the image sensor,
wherein the first value and the third value are defined as values of the first control parameter, the second value and the fourth value are defined as values of a second control parameter, both the first control parameter and the second control parameter are included in a plurality of control parameters for controlling imaging, and the second value is changed in accordance with the first value set in the image sensor;

a storage configured to store the third value and the fourth value;

a display configured to show first difference information indicating the first difference and second difference information indicating the second difference, and display an image when the first value is set in the image sensor, the image being based on the image data generated by the image sensor when the first value is set in the image sensor, wherein the fourth value being stored by the storage is a recommended value of the second control parameter or a set value of the second control parameter set in the image sensor before the second value is set in the image sensor, and wherein the display is configured to show the second difference information in a first display form when the fourth value is the recommended value, and show the second difference information in a second display form different from the first display form when the fourth value is the set value.

34. An imaging system including an imaging-setting device and an imaging device,
wherein the imaging-setting device comprises:
a first processor configured to generate a first value of a first control parameter and calculate a first difference between the first value and a third value and a second difference between a second value and a fourth value,
wherein the first value and the third value are defined as values of the first control parameter, the second value and the fourth value are defined as values of a second control parameter, and both the first control parameter and the second control parameter are included in a plurality of control parameters for controlling imaging;
a first output configured to send the first value to the imaging device;
a first input configured to receive the second value and image data generated by an image sensor of the imaging device when the first value is set in the imaging device, the second control parameter being different from the first control parameter, and the second value being changed in accordance with the first value set in the imaging device;
a storage configured to store the third value and the fourth value;
a display configured to show first difference information indicating the first difference and second difference information indicating the second difference, and display an image based on the image data, and
the imaging device includes:
the image sensor configured to image and generate the image data;
a second input configured to receive the first value from the imaging-setting device;
a second processor configured to set the first value and the second value in the image sensor; and
a second output configured to send the second value and the image data to the imaging-setting device,
wherein the fourth value being stored by the storage is a recommended value of the second control parameter or a set value of the second control parameter set in the image sensor before the second value is set in the image sensor, and
wherein the display is configured to show the second difference information in a first display form when the fourth value is the recommended value, and show the second difference information in a second display form different from the first display form when the fourth value is the set value.

35. An imaging-setting method, comprising:
generating a first value of a first control parameter among a plurality of control parameters for controlling imaging;
outputting the first value to an imaging device;
inputting a second value of a second control parameter different from the first control parameter from the imaging device, wherein the second value changes in accordance with the first value set in an image sensor of the imaging device;
inputting image data generated by the image sensor when the first value is set in the image sensor;
calculating a first difference between the first value and a third value of the first control parameter and a second difference between the second value and a fourth value of the second control parameter, the fourth value being a recommended value of the second control parameter or a set value of the second control parameter set in the image sensor before the second value is set in the image sensor;
showing first difference information indicating the first difference;
showing second difference information indicating the second difference in a first display form when the fourth value is the recommended value, and showing the second difference information in a second display form different from the first display form when the fourth value is the set value, and
displaying an image based on the image data.

36. An imaging-setting method, comprising:
generating a first value of a first control parameter among a plurality of control parameters for controlling imaging;
setting the first value and a second value of a second control parameter in an image sensor configured to image and generate image data, the second control parameter being different from the first control parameter among the plurality of control parameters, and the second value being changed in accordance with the first value set in the image sensor;
calculating a first difference between the first value and a third value of the first control parameter and a second difference between the second value and a fourth value of the second control parameter, the fourth value being a recommended value of the second control parameter or a set value of the second control parameter set in the image sensor before the second value is set in the image sensor;
showing first difference information indicating the first difference;

showing second difference information indicating the second difference in a first display form when the fourth value is the recommended value, and showing the second difference information in a second display form different from the first display form when the fourth value is the set value; and displaying an image when the first value is set in the image sensor, the image being based on the image data generated by the image sensor when the first value is set in the image sensor.

37. A non-transitory computer readable recording medium storing a program for causing a computer to execute:

generating a first value of a first control parameter among a plurality of control parameters for controlling imaging;

outputting the first value to an imaging device;

inputting a second value of a second control parameter different from the first control parameter from the imaging device, wherein the second value changes in accordance with the first value set in an image sensor of the imaging device;

inputting image data generated by the image sensor when the first value is set in the image sensor;

calculating a first difference between the first value and a third value of the first control parameter and a second difference between the second value and a fourth value of the second control parameter, the fourth value being a recommended value of the second control parameter or a set value of the second control parameter set in the image sensor before the second value is set in the image sensor;

showing first difference information indicating the first difference;

showing second difference information indicating the second difference in a first display form when the fourth value is the recommended value, and showing the second difference information in a second display form different from the first display form when the fourth value is the set value, and displaying an image based on the image data.

38. A non-transitory computer readable recording medium storing a program for causing a computer to execute:

generating a first value of a first control parameter among a plurality of control parameters for controlling imaging;

setting the first value and a second value of a second control parameter in an image sensor configured to image and generate image data, the second control parameter being different from the first control parameter among the plurality of control parameters, and the second value being changed in accordance with the first value set in the image sensor;

calculating a first difference between the first value and a third value of the first control parameter and a second difference between the second value and a fourth value of the second control parameter, the fourth value being a recommended value of the second control parameter or a set value of the second control parameter set in the image sensor before the second value is set in the image sensor;

showing first difference information indicating the first difference;

showing second difference information indicating the second difference in a first display form when the fourth value is the recommended value, and showing the second difference information in a second display form different from the first display form when the fourth value is the set value; and displaying an image when the first value is set in the image sensor, the image being based on the image data generated by the image sensor when the first value is set in the image sensor.

39. An imaging-setting device, comprising:

a processor configured to generate a first value of a first control parameter and calculate a first difference between the first value and a third value and a second difference between a second value and a fourth value, wherein the first value and the third value are defined as values of the first control parameter, the second value and the fourth value are defined as values of a second control parameter, and both the first control parameter and the second control parameter are included in a plurality of control parameters for controlling imaging;

an output configured to send the first value to an imaging device;

an input configured to receive the second value, the third value, first image data generated by the imaging device when the first value is set in the imaging device, and second image data generated by the imaging device when the third value is set in the imaging device, wherein the second control parameter is different from the first control parameter, the third value is set in the imaging device before the first value is set in the imaging device, and the second value is changed in accordance with the first value set in the imaging device;

a storage configured to store the third value and the fourth value; and a display configured to show first difference information indicating the first difference and second difference information indicating the second difference, and display a first image based on the first image data and a second image based on the second image data, wherein the storage is configured to associate and store the first image data generated by the imaging device, the third value, and the fourth value, when the third value and the fourth value are set in the imaging device, and wherein the first image data and the second image data are simultaneously received such that the first image and the second image are simultaneously displayed, or the first image data and the second image data are alternately received such that the first image and the second image is alternately displayed.

* * * * *